United States Patent [19]

Masumoto et al.

[11] Patent Number: 5,719,706

[45] Date of Patent: Feb. 17, 1998

[54] ILLUMINATING APPARATUS, PROJECTION LENS, AND DISPLAY APPARATUS INCLUDING THE ILLUMINATION APPARATUS AND THE PROJECTION LENS

[75] Inventors: Yoshihiro Masumoto, Kobe; Mitsuhiro Wada, Kyoto, both of Japan

[73] Assignee: Matsushita Electric Industrial Co., Ltd., Kadoma, Japan

[21] Appl. No.: 614,281

[22] Filed: Mar. 12, 1996

[30] Foreign Application Priority Data

| Mar. 15, 1995 | [JP] | Japan | 7-056020 |
| Jun. 7, 1995 | [JP] | Japan | 7-140233 |
| Dec. 27, 1995 | [JP] | Japan | 7-340212 |

[51] Int. Cl.$^6$ .................. G02B 27/10; G02B 27/14
[52] U.S. Cl. .................. 359/622; 359/621; 359/634
[58] Field of Search .................. 359/622, 621, 359/619, 625, 626, 634, 457; 353/38

[56] References Cited

U.S. PATENT DOCUMENTS

| Re. 28,702 | 1/1976 | Macovski | 358/47 |
| 3,592,529 | 7/1971 | Juhlin, Jr. et al. | 350/160 R |
| 4,277,138 | 7/1981 | Damminn | 350/162 R |
| 4,305,099 | 12/1981 | True et al. | 358/231 |
| 5,056,912 | 10/1991 | Hamada et al. | 353/58 |
| 5,098,184 | 3/1992 | van den Brandt | 353/102 |
| 5,302,989 | 4/1994 | Taguchi et al. | 354/112 |
| 5,418,583 | 5/1995 | Masumoto | 353/38 |
| 5,467,206 | 11/1995 | Loiseaux et al. | 359/40 |
| 5,548,349 | 8/1996 | Mizuguchi et al. | 348/766 |
| 5,557,432 | 9/1996 | Yokota | 359/40 |
| 5,602,658 | 2/1997 | Ezra et al. | 349/95 |

FOREIGN PATENT DOCUMENTS

| 602916 | 1/1985 | Japan . |
| 60-165621 | 8/1985 | Japan . |
| 63-15220 | 1/1988 | Japan . |
| 356922 | 3/1991 | Japan . |
| 460538 | 2/1992 | Japan . |
| 435048 | 6/1992 | Japan . |
| 5346557 | 12/1993 | Japan . |
| 6-75200 | 3/1994 | Japan . |
| 6235884 | 8/1994 | Japan . |
| 645935 | 11/1994 | Japan . |
| 7-176708 | 7/1995 | Japan . |
| 8-237583 | 9/1996 | Japan . |

Primary Examiner—David C. Nelms
Assistant Examiner—Ricky Mack
Attorney, Agent, or Firm—Renner,Otto, Boisselle, Sklar

[57] ABSTRACT

An illumination apparatus includes a light source for emitting light including three primary color components; a condensing device for condensing light emitted by the light source; a luminous surface formation device for converging the light from the condensing device and dividing the converged light into color light rays respectively of the three primary colors to form color luminous surfaces respectively of the three primary colors; relay lenses respectively provided in the vicinity of the color luminous surfaces to receive the color light rays from the luminous surface formation device; a field lens for receiving the color light rays from the relay lenses; a first microlens array for receiving the color light rays from the field lens; and a second microlens array for receiving the color light rays from the first microlens array. The first microlens array includes a plurality of first microlenses arranged two-dimensionally. The second microlens array includes a plurality of second microlenses two-dimensionally in the same quantity as the first microlenses in correspondence therewith. The first microlenses array arranges actual images of the color luminous surfaces two-dimensionally. The second microlenses respectively provided in the vicinity of the actual images of the color luminous surfaces cause the color light rays from the corresponding first microlenses to travel substantially parallel to one another. Thus, color microscopic luminous surfaces respectively of the three primary colors are formed separately and periodically in accordance with a prescribed arrangement.

29 Claims, 51 Drawing Sheets

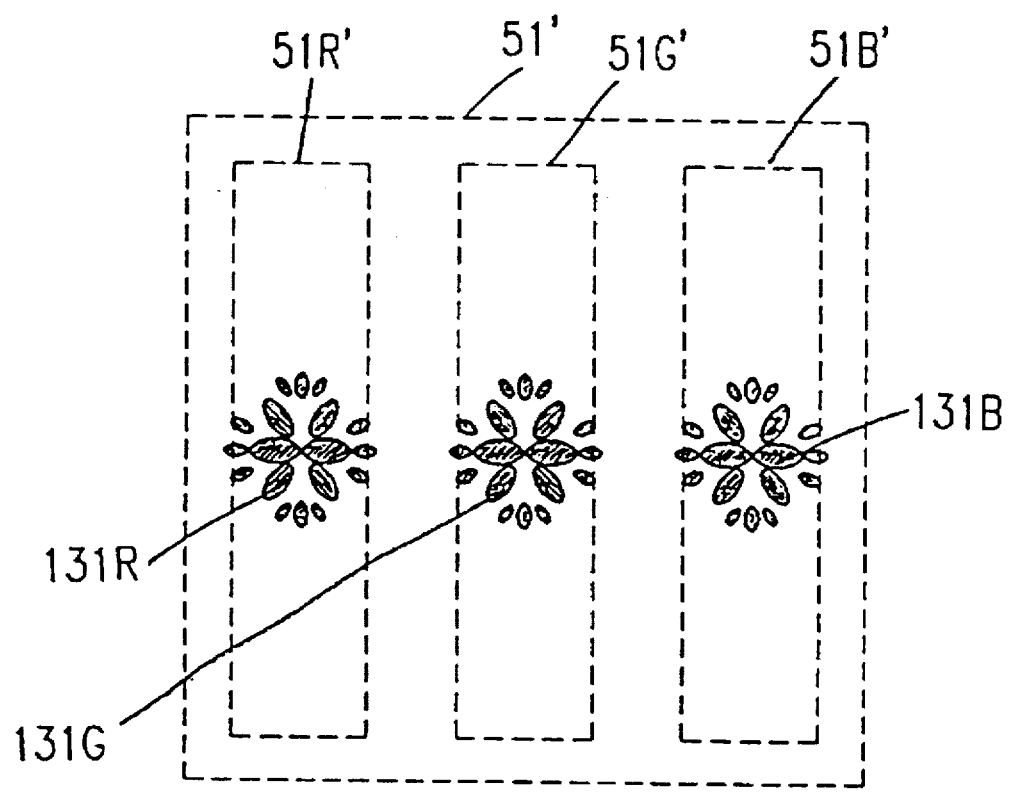

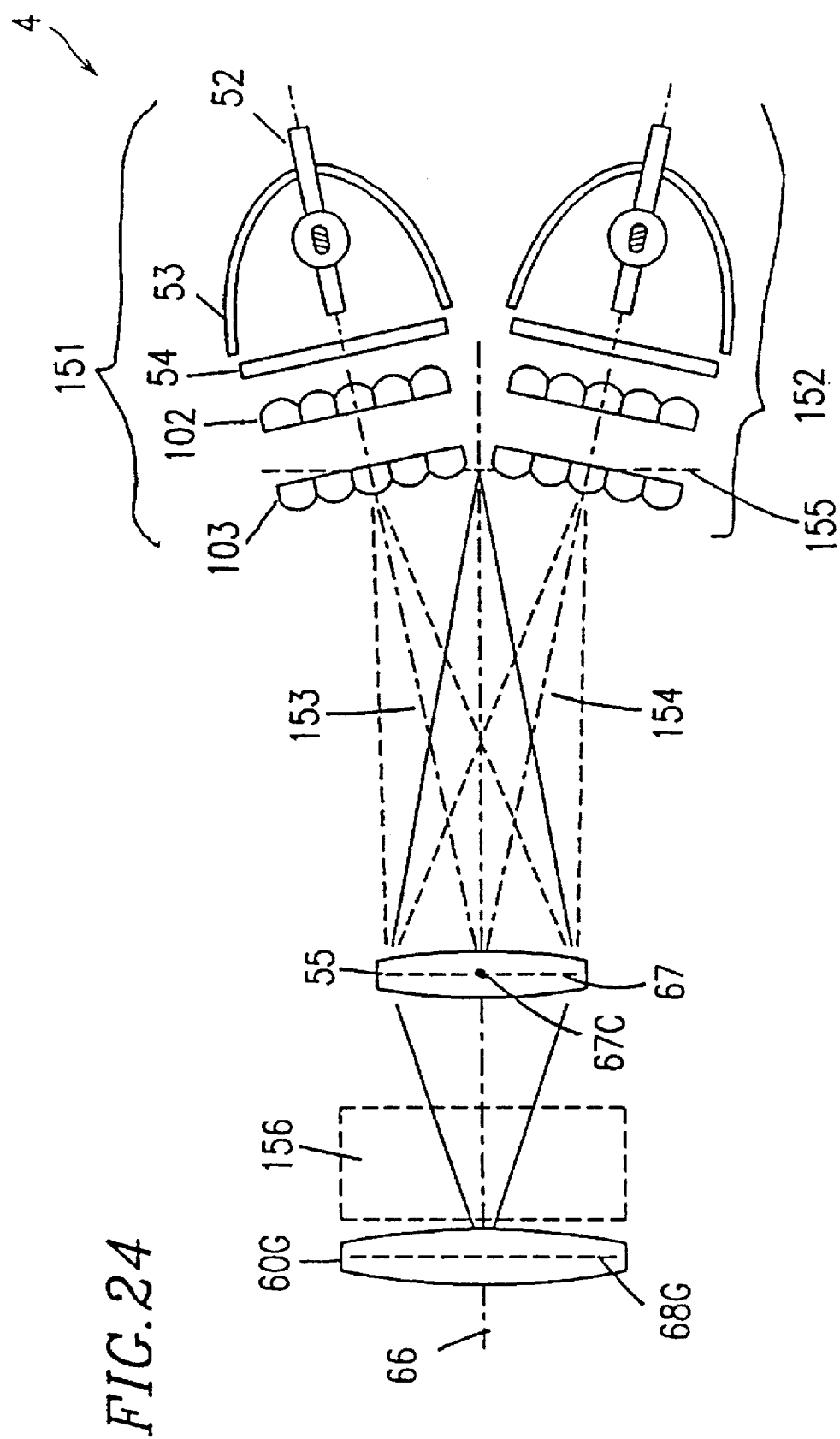

N = 4

N = 4

N=6

N=7

FIG.32A
FIG.32B
N=9
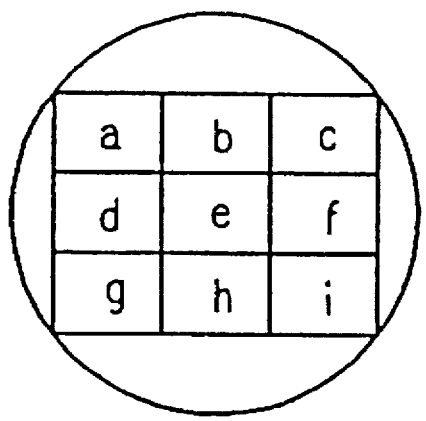
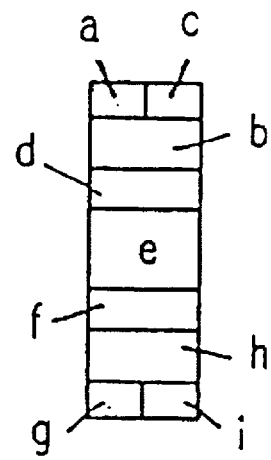
FIG.33A
FIG.33B
N=10
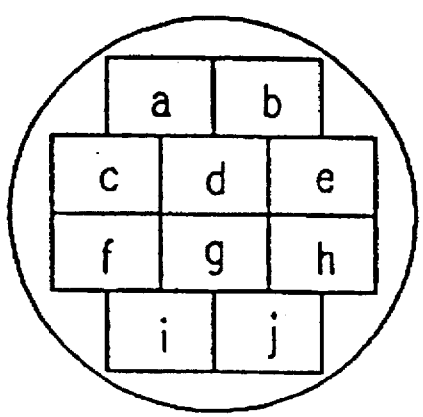
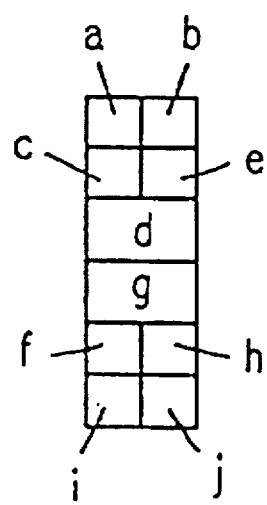

N=14

N=16

N=16

N=18

N=4

N=6

N=6

N=9

N=10

N=12

N=14

N=16

N= 17

N= 22

ILLUMINATING APPARATUS, PROJECTION LENS, AND DISPLAY APPARATUS INCLUDING THE ILLUMINATION APPARATUS AND THE PROJECTION LENS

BACKGROUND OF THE INVENTION

1. Field of the Invention

The present invention relates to an illumination apparatus for illuminating a light valve, a projection lens for projecting an optical image formed on the light valve, and a display apparatus including such a light valve.

2. Description of the Related Art

Conventionally, projection display apparatuses including a light valve are known for displaying a video image to be shown on a large screen. Recently, projection display apparatuses including a liquid crystal panel have been put into practical use.

Such projection display apparatuses can be roughly classified in two systems: one system uses a single color-display liquid crystal panel, and the other system uses three monochrome-display liquid crystal panels to display images of the three primary colors (red, green and blue), respectively. Various structures have been proposed for an optical system used in the above-mentioned two systems of the projection display apparatuses. Such structures are disclosed in, for example, Japanese Laid-Open Patent Publication No. 60-2916 and Japanese Patent Publication No. 4-35048.

FIG. 60 shows an exemplary structure of a projection display apparatus 500 using a single color-display liquid crystal panel.

An illumination optical system 501 illuminates a liquid crystal panel 502, and light transmitted through the liquid crystal panel 502 is incident on a projection lens 503. An optical image is formed on the liquid crystal panel 502 and is projected onto a screen (not shown) in a magnified state.

The illumination optical system 501 includes, for example, a lamp 504, a concave mirror 505, a UV-IR cut filter 506, and a field lens 507. The lamp 504 is formed of, for example, a metal halide lamp, a halogen lamp, or a xenon lamp. The concave mirror 505 condenses light emitted by the lamp 504 to form light rays for illuminating the liquid crystal panel 502. The concave mirror 505 is formed of a parabolic mirror or an ellipsoidal mirror. The UV-IR cut filter 506 is used for cutting infrared radiation and ultraviolet radiation from the illuminating light. The field lens 507 is used for causing the light illuminating the liquid crystal panel 502 to be incident on the projection lens 503.

A structure of the liquid crystal panel 502 will be described with reference to FIG. 61. FIG. 61 is a cross sectional view of the liquid crystal panel 502.

A twisted nematic (TN) liquid crystal layer 513 is interposed between two transparent glass plates 511 and 512, and liquid crystal molecules included in the liquid crystal layer 513 are aligned in a prescribed direction by alignment layers 514 and 515. The glass plate 512 has a plurality of pixel electrodes 518 arranged two-dimensionally on a surface thereof which is opposed to the liquid crystal layer 513 with the alignment layer 515 interposed therebetween.

The glass plate 511 has a counter electrode 519 formed on a surface which is to be opposed to the liquid crystal layer 513 with the alignment layer 514 interposed therebetween. Each pixel electrode 518 forms a pixel together with an area of the liquid crystal layer 513 and an area of the counter electrode 519 both corresponding to the pixel electrode 518.

The pixel electrodes 518 and the counter electrode 519 are transparent. An electric field is formed by supplying a driving voltage between the electrodes 518 and 519, namely, to the liquid crystal layer 513. Generally, thin film transistors 520 as switching devices for maintaining the electric field applied between the electrodes 518 and 519 for a certain period of time are provided respectively for the pixel electrodes 518. Thus, the level of the electric field applied to the liquid crystal layer 513 is changed to control the alignment of the liquid crystal molecules.

The above-described layer structure is interposed between polarizing plates 516 and 517. Naturally polarized light is incident on the polarizing plates 516 to be linearly polarized and is incident on the liquid crystal layer 513. The polarization direction of the light incident on the liquid crystal layer 513 is changed by the alignment state of the liquid crystal molecules, thereby controlling the intensity of the light transmitted through the polarizing plate 517. Such light modulation is performed for each pixel, thereby forming an optical image. A black matrix 521 is provided on the counter electrode 519 to prevent light from being incident on the thin film transistors 520. Thus, a high quality video image having a satisfactory level of black and white contrast is displayed. The broken lines in FIG. 61 are phantom lines provided for clearly illustrating the pixel structure.

In order to form a color image using a single liquid crystal panel, a plurality of color pixel units are arranged two-dimensionally. Each color pixel unit includes three pixels respectively acting as red, green and blue pixels. The red, green and blue pixels are arranged periodically. The electrode of each red pixel is supplied with a signal corresponding to a red optical image. Similarly, the electrode of each green pixel is supplied with a signal corresponding to a green optical image; and the electrode of each blue pixel is supplied with a signal corresponding to a blue optical image. Further, red light needs to be incident on red pixels. Similarly, green light needs to be incident on green pixels; and blue light needs to be incident on blue pixels. For this purpose, a red filter 522A, a green filter 522B and a blue filter 522C are provided in periodical openings of the black matrix 521, to control the wavelength range of the light incident on the liquid crystal panel 502. The red filter 522A allows a part of the white light substantially having a wavelength corresponding to a red component of the light to transmit therethrough. The green and blue filters 522B and 522C act in the same manner.

In such a structure, light incident on the black matrix 521 is reflected or absorbed by the black matrix 521, thereby being invalidated. A color image is formed by the light transmitted through the red, green and blue filters 522A, 522B and 522C. The red filter 522A absorbs blue and green components of the light incident thereon to invalidate such components of the light. The green and blue filters 522B and 522C act in the same manner. Accordingly, approximately ⅔ of the light incident on the three types of filters 522A, 522B and 522C is lost.

A projection display apparatus including three monochrome liquid crystal panels will be described. Each liquid crystal panel used in such a projection display apparatus has the same structure as shown in FIG. 61 except that the color filters are eliminated. Three such monochrome liquid crystal panels are respectively supplied with video signals corresponding to red, green and blue images and thus form images of the respective colors. In other words, light components of these three colors illuminate the respective liquid crystal panels to be modulated. Such modulated light components are composed to form a full-color image.

In detail, white light emitted by the light source is decomposed by dichroic mirrors into red, green and blue light components, which illuminate the respective liquid crystal panels to form optical images thereon. The light components modulated by the liquid crystal panels are composed by dichroic mirrors. Thus, optical images on the three liquid crystal panels are superimposed to form and display a full-color image onto the screen by a single projection lens. In another known system, three projection lenses are used respectively for three liquid crystal panels to superimpose the red, green and blue optical images on the screen.

Generally, a display apparatus including a light valve such as a liquid crystal panel can improve a luminous output thereof when the power consumption of the light source is increased to enhance the intensity of light for illuminating the light valve. However, such an apparatus involves the problems, for example, in that the heat generation of the light source increases, that the power consumption of the entire display apparatus increases to enlarge the total size of the apparatus, and that the heat generation of the light valve increases to cause an operation error of the light valve. In order to avoid such problems, the optical system of the display apparatus desirably has no optical loss and a sufficiently high level of light utilization efficiency. Especially, an illumination device used in the optical system needs to utilize the light emitted by the light source at a high efficiency to form bright light for illuminating the light valve suitable for the pixel structure of the light valve.

A projection display apparatus including a single color-display liquid crystal panel has an advantage of simple structure with a small number of parts. However, such an apparatus has a problem in that light components of the white incident light which do not correspond to the filter of a particular color are absorbed, resulting in a significant optical loss. The light utilization efficiency is approximately ⅓ of the efficiency of a display apparatus including three monochrome liquid crystal panels.

A projection display apparatus including three monochrome liquid crystal panels has an advantage of a relatively high light utilization efficiency, which facilitates formation and projection of a bright image. However, such an apparatus has a problem in that a large number of parts and a complicated structure result in relatively high production cost. For example, a plurality of dichroic mirrors and a plurality of flat mirrors are required both on the light-incoming side and on the light-outgoing side of the liquid crystal panel.

In the case where such a projection display apparatus includes a single projection lens, a space is required on an optical path from the liquid crystal panel to the projection lens for providing the dichroic mirrors for composing the light components. Thus, the projection lens needs to have a long back focus. Such a projection lens for which various aberrations are difficult to restrict, is not easy to produce and is expensive.

In either type of the above-described display apparatuses, a black matrix for reflecting or absorbing the light is a main cause of optical loss. Generally, the aperture ratio (the total area of openings of the black matrix+the total effective display area) of a liquid crystal panel is approximately 50% at the maximum. The aperture ratio decreases as the number of pixels increases in order to realize more precise display. Accordingly, a projection display apparatus including such a liquid crystal panel with a large number of pixels has a problem in that the image projected on the screen is dark.

In order to alleviate the optical loss caused by the black matrix, a display apparatus including a microlens array on the optical path of the light to be incident on the liquid crystal panel is disclosed in, for example, Japanese Laid-Open Patent Publication No. 60-165621. The microlens array includes a plurality of microlenses arranged two-dimensionally, which are provided in correspondence with the pixels, respectively. In such a structure, the light incident on each of the pixels is converged onto the opening of the black matrix to allow the light to be transmitted through the liquid crystal panel efficiently. However, such a display apparatus has the following problems in obtaining practical effects:

The cross section of the light rays in the state of being converged needs to be smaller than the corresponding opening. Since if the cross section is larger than the opening, a part of the light outside the opening is lost, which impairs the effect of the microlens array. On the other hand, the cross section has preferably a maximum possible size for the purpose of increasing the intensity of the light transmitted through the opening. In order to fulfill these two conditions, the cross section of the light in the converged state is preferably inscribed to the opening of the black matrix.

When light emitted from a light source is condensed by a known concave mirror or a condensing lens and caused to be incident on the microlens array, the obtained illumination spot has a substantially circular cross section. Accordingly, the aperture of each pixel needs to be circular or substantially circular in order to alleviate the optical loss. In practice, however, the aperture of the pixel, which is determined by the size of the display area of the liquid crystal panel, the aspect ratio, and the numbers of pixels in the vertical direction (X direction) and the horizontal direction (Y direction), is formed in various shapes.

For example, color pixel units in most color-display liquid crystal panels are each divided vertically into three areas so that each area acts as a color pixel for the respective color. In such a case, the aperture of each color pixel has, for example, a generally rectangular shape having a vertical side three times longer than the horizontal side. Microlenses provided in correspondence with such generally rectangular color pixels do not realize a projection display apparatus having a large luminous output for the above-mentioned reason. Even if a circular illumination spot having a sufficiently small cross section to transmit through the generally rectangular aperture to alleviate the optical loss, it is difficult to increase the intensity of the light transmitted through the black matrix.

Projection display apparatuses including a single color-display liquid crystal panel for alleviating the optical loss caused by the color filters are disclosed in, for example, the U.S. Pat. No. 4,277,138, and Japanese Laid-Open Patent Publication Nos. 3-56922 and 4-60538.

Microlenses are provided on the optical path of the light to be incident on the liquid crystal panel and respectively corresponding to color pixel units. The color pixel units each include three pixels corresponding to red, green and blue images. Red, green and blue light rays obtained by decomposing the white light are incident on each microlens at different incident angles. By appropriately selecting the incident angle, the focal distance of the microlenses and the arrangement of the three pixels in each color pixel unit, an illumination spot of each color can be formed in the opening of the black matrix corresponding to the respective color. Thus, red light rays reach only red pixels, green light rays reach only green pixels, and blue light rays reach only blue pixels. In such a structure, the color filters can be eliminated. Accordingly, the optical loss can be alleviated, thus improving the light utilization efficiency.

Such an apparatus has the following problems.

(1) As is described above, the light rays of the three primary colors transmitted through the microlenses travel at different angles from one another, not in parallel, to reach a point in the vicinity of the aperture of the pixel. Such light rays are difficult to utilize in a projection display apparatus.

For example, in the case where an optical image on the liquid crystal panel is projected using a projection lens, the light rays are converged at different positions in the entrance pupil of the projection lens. In other words, red, green and blue luminous surfaces expanded as prescribed are formed at different positions of the entrance pupil. In order to project an optical image based on such luminous surfaces, the projection lens needs to have a smaller F-number, namely, a larger diameter when compared with the case where white luminous surfaces expanded to the same degree as above are formed at the same position in the entrance pupil. For such a projection lens, various aberrations are difficult to restrict. Thus, production of such a projection lens is difficult and costly.

(2) Generally, light for illuminating the liquid crystal panel is not uniform in brightness. As the light emitted by the light source is condensed more efficiently to produce a display apparatus having a larger luminous output, the degree of non-uniformity in brightness of the light increases. For example, in the case where a concave mirror is used for condensing the light from the light source, the optical surface to be illuminated is brighter in the vicinity of the optical axis than in an area far from the optical axis. The brightness of the optical surface is substantially determined by the illuminating angle, which is larger in the vicinity of the optical axis than in an area far from the optical axis.

When the liquid crystal panel is illuminated through the microlens array by light which is non-uniform in brightness, the shape and size of the cross section of the light ray converged in the openings of the black matrix in the liquid crystal panel is different area by area. As a result, a light ray which needs to reach, for example, the green pixel is partially on the pixel of another color, resulting in non-uniform colors. Further, the cross section of the light ray converged in a dark area is small. Accordingly, the light ray is offset with respect to the aperture of the respective pixel by a slight displacement or a slight difference in performance of the elements of the optical system. In such a case, the corresponding area in the image is darker than the rest of the image or completely black, thus deteriorating the image quality.

(3) In order to form a sufficiently bright image on a screen, the entire optical system from the luminous element to the image on the screen needs to have a high level of light utilization efficiency. In the apparatuses disclosed in the U.S. Pat. No. 4,277,138, and Japanese Laid-Open Patent Publication Nos. 3-56922 and 4-60538, only the optical loss caused by the light valve is alleviated, but a sufficiently high level of light unitization efficiency is not realized in the entire optical system including the light valve and other elements such as a light source and a projection lens. Accordingly, the effect of alleviating the optical loss caused by the light valve does not sufficiently contribute to improvement in the brightness of the image displayed on the screen by projection.

In any of the above-described projection display apparatuses, the liquid crystal panel needs to be illuminated by light having a highly uniform brightness in order to obtain an image having a highly uniform brightness by projection. This requires an illumination system for forming light having a highly uniform brightness by condensing the light emitted by the luminous element at a high efficiency. Such an illumination system including two lens arrays is disclosed in, for example, the U.S. Pat. No. 5,098,184 and Japanese Laid-Open Patent Publication No. 5-346557.

At least two lens arrays, for example, a first lens array and a second lens array are provided on the optical path from the light source to the liquid crystal panel. The first lens array includes a plurality of first lenses arranged two-dimensionally; and the second lens array includes a plurality of second lenses arranged two-dimensionally. The first lenses and the second lenses are provided in the same quantity to correspond to each other. The first lens array divides a light ray having a high level of non-uniformity in brightness into a plurality of partial light rays each having a lower level of non-uniformity in brightness. The partial light rays transmitted through the first lenses are guided to the apertures of the respective second lenses. The second lenses each magnify the partial light ray incident thereon by an appropriate ratio so as to allow the light ray to illuminate the entire display area of the liquid crystal panel in state where the partial light rays are superimposed on one another on the liquid crystal panel. In this manner, light having a highly uniform brightness can be formed at a high efficiency.

The above-described types of projection display apparatuses include a projection lens for projecting the optical image on the light valve onto a screen. Such a projection lens needs to fulfill the conditions of, for example, a high level of characteristic of telecentric, a long back focus, a small effective F-number, a high resolution due to satisfactory restriction of various aberrations, a sufficiently low level of distortion in a peripheral area of the image projected, and a small size and low cost.

In a completely telecentric projection lens, a chief ray, or principal ray, representative of light effectively incident on the projection lens through the liquid crystal panel is parallel to the optical axis regardless of the position on the liquid crystal panel at which the chief ray is transmitted through the liquid crystal panel. Generally, the contrast ratio of a liquid crystal panel changes in accordance with the direction in which the light is incident thereon. Thus, when the projection lens has a low level of characteristic of telecentric, the contrast ratio is different area by area in the same image, resulting in the projected image having different contrast ratios area by area.

A small F-number refers to a large converging angle of the projection lens. In order to prevent optical loss, a projection lens having a converging angle corresponding to the expansion of light coming out of the liquid crystal panel needs to be used. Accordingly, as the effective F-number of the projection lens is smaller, the light for illuminating the liquid crystal panel is brighter, resulting in a brighter image. However, as the effective F-number of the projection lens is smaller, the diameter of the lens is larger and more expensive.

A projection display apparatus including a projection lens divided into a principal lens group and an assisting converging lens is disclosed in, for example, Japanese Laid-Open Patent Publication No. 63-15220. The assisting converging lens is provided in the vicinity of the liquid crystal panel on the light-outgoing side to converge the light coming out of the liquid crystal panel. The principal lens group is provided in the vicinity of the focal point of the assisting converging lens. In such a structure, lenses in the principal lens group need not have the same diameter as the display area of the liquid crystal panel. Thus, the projection lens can be reduced in size. The provision of the assisting converging lens enhances the characteristic of telecentric of the projection lens.

Japanese Laid-Open Patent Publication No. 6-235884 discloses a structure including a fresnel lens as an assisting converging lens. Such a projection lens including a fresnel lens in the vicinity of the light valve is suitable for projecting a large optical image on the light valve on a screen because a small principal lens group can be used. However, since stray light is generated at steps (non-lens areas) between the ring-shaped lens areas of the fresnel lens and reaches the screen. As a result, a ghost image is formed on the screen to significantly reduce the quality of the image formed on the screen by projection.

In order to avoid such a problem, Japanese Utility Model Publication No. 6-45935 discloses a device for shielding or scattering light at the steps between thin ring-shaped lens areas of the fresnel lens. In practice, however, the steps are microscopic in size and it is very difficult to provide an absorbing layer formed of, for example, black coat in a satisfactory manner. It is also difficult to process the steps so as to scatter the light. Accordingly, such a fresnel lens having such a structure cannot be easily produced with a high yield at low cost.

In the case where the fresnel lens is located close to the light valve, the periodical structure of the fresnel lens and the periodical structure of the pixels of the light valve interfere each other to form moiré fringes on the image formed on the screen by projection. Such moiré fringes significantly impair the quality of the image on the screen.

SUMMARY OF THE INVENTION

In one aspect of the present invention, an illumination apparatus for illuminating a light valve including a plurality of color pixel units arranged two-dimensionally, each having pixels respectively for the three primary colors, the illumination apparatus includes a light source for emitting light including components of the three primary colors; a condensing device for condensing light emitted by the light source; a luminous surface formation device for converging the light from the condensing means and dividing the converged light into color light rays respectively of the three primary colors to form color luminous surfaces respectively of the three primary colors; relay lenses respectively provided in the vicinity of the color luminous surfaces to receive the color light rays from the luminous surface formation means; a field lens for receiving the color light rays from the relay lenses; a first microlens array for receiving the color light rays from the field lens; and a second microlens array for receiving the color light rays from the first microlens array. The first microlens array includes a plurality of first microlenses arranged two-dimensionally. The second microlens array includes a plurality of second microlenses two-dimensionally in the same quantity as the first microlenses in correspondence therewith. The first microlenses array arranges actual images of the color luminous surfaces two-dimensionally. The second microlenses respectively provided in the vicinity of the actual images of the color luminous surfaces cause the color light rays from the corresponding first microlenses to travel substantially parallel to one another. Thus, color microscopic luminous surfaces respectively of the three primary colors are formed separately and periodically in accordance with a prescribed arrangement.

In another aspect of the present invention, a display apparatus includes an illumination device; a light valve to be illuminated by the illumination means; and an image formation device for forming an image using the light spatially modulated by the light valve. The light valve includes a plurality of color pixel units each having pixels respectively for the three primary colors to form an optical image. The illumination means includes a light source for emitting light including components of the three primary colors; a condensing device for condensing light emitted by the light source; a luminous surface formation device for converging the light from the condensing means and dividing the converged light into color light rays respectively of the three primary colors to form color luminous surfaces respectively of the three primary colors; relay lenses respectively provided in the vicinity of the color luminous surfaces to receive the color light rays from the luminous surface formation means; a field lens for receiving the color light rays from the relay lenses; a first microlens array for receiving the color light rays from the field lens; and a second microlens array for receiving the color light rays from the first microlens array. The first microlens array includes a plurality of first microlenses arranged two-dimensionally. The second microlens array includes a plurality of second microlenses two-dimensionally provided in the same quantity as the first microlenses in correspondence therewith. The first microlens array arranges actual images of the color luminous surfaces two-dimensionally. The second microlenses respectively provided in the vicinity of the actual images of the color luminous surfaces cause the color light rays from the corresponding first microlenses to travel substantially parallel to one another. Thus, color microscopic luminous surfaces respectively of the three primary colors are formed separately and periodically in accordance with a prescribed arrangement in correspondence with the pixels for the three primary colors.

In still another aspect of the present invention, an illumination apparatus for illuminating a light valve including a plurality of pixels arranged two-dimensionally, the illumination apparatus includes a light source; a condensing device for condensing light emitted by the light source; a first lens array for receiving the light from the condensing device; a second lens array for receiving the light from the first lens array; and a microlens array for receiving the light from the second lens array. The first lens array includes a plurality of first lenses for dividing the light from the condensing means into a plurality of light parts. The second lens array includes a plurality of second lenses provided in the same quantity as the first lenses in correspondence therewith. The microlens array includes a plurality of microlenses arranged two-dimensionally. The first lenses each converge the light parts transmitting therethrough onto an aperture of the corresponding second lens. The second lenses respectively magnify the light parts at such magnification ratios as to illuminate an effective area of the microlens array in a superimposed state. The microlens array arranges actual images of an object in the vicinity of the second lens array two-dimensionally. Thus, microscopic luminous surfaces having an effective shape corresponding to an effective aperture of the second lens array are formed periodically in accordance with a prescribed arrangement.

In still another aspect of the present invention, a display apparatus includes an illumination device; a light valve to be illuminated by the illumination means; and an image formation device for forming an image using the light spatially modulated by the light valve. The light valve includes a pixel structure for forming an optical image. The illumination means includes a light source; a condensing device for condensing light emitted by the light source; a first lens array for receiving the light from the condensing device; a second lens array for receiving the light from the first lens array; and a microlens array for receiving the light from the second lens array. The first lens array includes a plurality of first lenses for dividing the light from the condensing means into a plurality of light parts. The second lens array includes a plurality of second lenses provided in the same quantity as the first lenses in correspondence therewith. The microlens array includes a plurality of microlenses arranged two-dimensionally. The first lenses each converge the light parts transmitting therethrough onto an aperture of the corresponding second lens. The second lenses respectively magnify the light parts at such magnification ratios as to illuminate an effective area of the microlens array in a superimposed state. The microlens array arranges actual images of an object in the vicinity of the second lens array two-dimensionally and forms microscopic luminous surfaces having an effective shape corresponding to an effective aperture of the second lens array periodically in accordance with a prescribed arrangement. The effective aperture of the second lens array is proximate in shape to pixels of the pixel structure, and the microscopic luminous surfaces are formed in correspondence with the pixels.

In still another aspect of the present invention, an illumination apparatus for illuminating a light valve including a plurality of color pixel units arranged two-dimensionally, each having pixels respectively for the three primary colors, the illumination apparatus includes a light source for emitting light including components of the three primary colors; a condensing device for condensing the light emitted by the light source; a color separation device for dividing the light from the condensing means into color light rays respectively of the three primary colors; a microlens array on which the color light rays are incident at different angles; and a plurality of relay optical means respectively provided on optical paths of the color light rays from the condensing means to the microlens array. The plurality of relay optical means each converge the color light ray transmitting therethrough to form a color luminous surface for illuminating the microlens array. The optical paths of the color light rays from the condensing means to the color luminous surfaces of the three primary colors are substantially equal to one another, and the optical paths of the color light rays from the color luminous surfaces to the microlens array are substantially equal to one another. The microlens array arranges actual images of the color luminous surfaces two-dimensionally. Thus, color microscopic luminous surfaces respectively of the three primary colors are formed separately and periodically in accordance with a prescribed arrangement.

In still another aspect of the present invention, a display apparatus includes an illumination device; a light valve to be illuminated by the illumination means; and an image formation device for forming an image using the light spatially modulated by the light valve. The light valve includes a plurality of color pixel units each having pixels respectively for the three primary colors to form an optical image. The illumination means includes a light source for emitting light including components of the three primary colors; a condensing device for condensing the light emitted by the light source; a color separation device for dividing the light from the condensing means into color light rays respectively of the three primary colors; a microlens array on which the color light rays are incident at different angles; and a plurality of relay optical means respectively provided on optical paths of the color light rays from the condensing means to the microlens array. The plurality of relay optical means each converge the color light ray transmitting therethrough to form a color luminous surface for illuminating the microlens array. The optical paths of the color light rays from the condensing means to the color luminous surfaces of the three primary colors are substantially equal to one another, and the optical paths of the color light rays from the color luminous surfaces to the microlens array are substantially equal to one another. The microlens array arranges actual images of the color luminous surfaces two-dimensionally. Thus, color microscopic luminous surfaces respectively of the three primary colors are formed separately and periodically in accordance with a prescribed arrangement in correspondence with the pixels of the three primary colors.

In still another aspect of the present invention, a projection lens for projecting an optical image on a light valve onto a screen, the projection lens includes a principal lens, and a fresnel lens provided in the vicinity of an object to be projected, the fresnel lens having microscopic ring-shaped lens surfaces periodically formed on a light-incoming surface of a plate, the fresnel lens fulfilling $0 < \phi \leq \eta$ where $\phi$ is the angle of inclination of a non-lens surface interposed between two adjacent lens surfaces in the direction of an optical axis of the fresnel lens with respect to the optical axis, and $\eta$ is the angle of the direction of a chief ray incident on the lens surface in the vicinity of the non-lens surface travelling in the fresnel lens after being refracted by the lens surface with respect to the optical axis.

In still another aspect of the present invention, a projection display apparatus for projecting an image onto a screen, the apparatus includes an illumination device; a light valve to be illuminated by the illumination means; and a projection lens for projecting an image on the light valve. The projection lens includes a fresnel lens provided in the vicinity of the light-outgoing side of the light valve and a principal lens group. The light valve has pixels arranged periodically at a pitch PL, the fresnel lens includes microscopic lens surfaces arranged periodically at a pitch PF, and the projection lens fulfills $N+0.25 < PL/PF < N+0.75$ where N is a positive integer.

Thus, the invention described herein makes possible the advantages of (1) providing an illumination apparatus for illuminating a light valve having a pixel structure at a high level of light utilization efficiency; (2) providing a display apparatus including such an illumination apparatus and such a light valve for forming a bright and high quality image; and (3) providing a projection lens suitable for a projection display apparatus including a light valve.

These and other advantages of the present invention will become apparent to those skilled in the art upon reading and understanding the following detailed description with reference to the accompanying figures.

BRIEF DESCRIPTION OF THE DRAWINGS

FIG. 23 is a schematic view illustrating still another example of actual images of luminous surfaces formed in the vicinity of apertures of pixels by an illumination apparatus according to the present invention;

FIG. 24 is a schematic view of an illumination apparatus in a fourth example according to the present invention;

FIGS. 28A through 47B are views illustrating exemplary apertures of the first lens array and the second lens array in the illumination apparatus shown in FIG. 26;

DESCRIPTION OF THE PREFERRED EMBODIMENTS

Hereinafter, the present invention will be described by way of illustrative examples with reference to the accompanying drawings.

EXAMPLE 1

Figure 1:
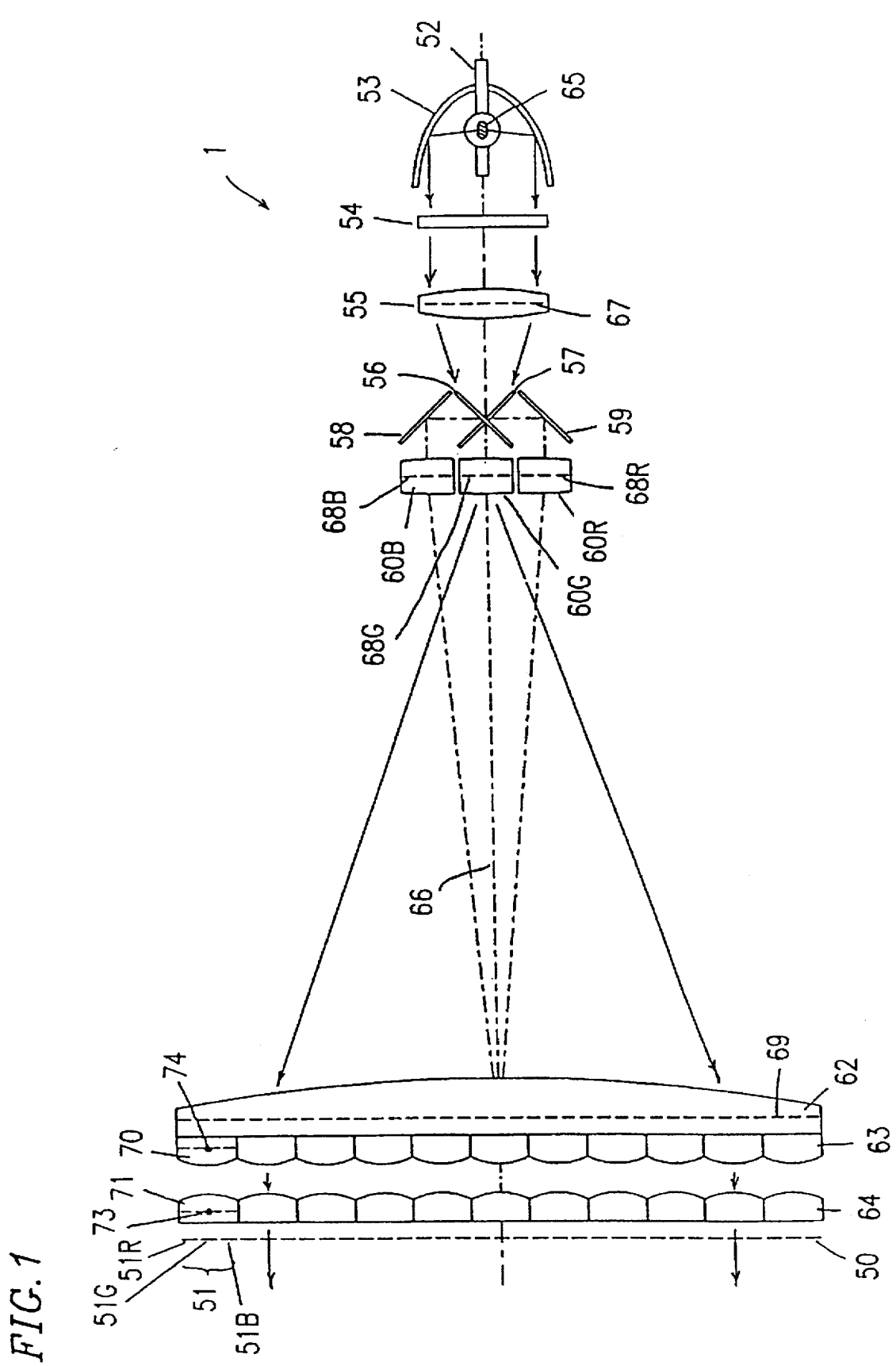
FIG. 1 is a schematic structural view of an illumination apparatus in a first example according to the present invention.

An illumination apparatus in a first example according to the present invention will be described with reference to FIG. 1. FIG. 1 is a schematic view illustrating an illumination apparatus 1 in the first example. The illumination apparatus 1 is used for illuminating a light valve including color pixel units each having three pixels respectively for the three primary colors. As such a light valve, a transmission liquid crystal panel having pixels respectively corresponding to the three primary colors located two-dimensionally can be used.

Figure 2:
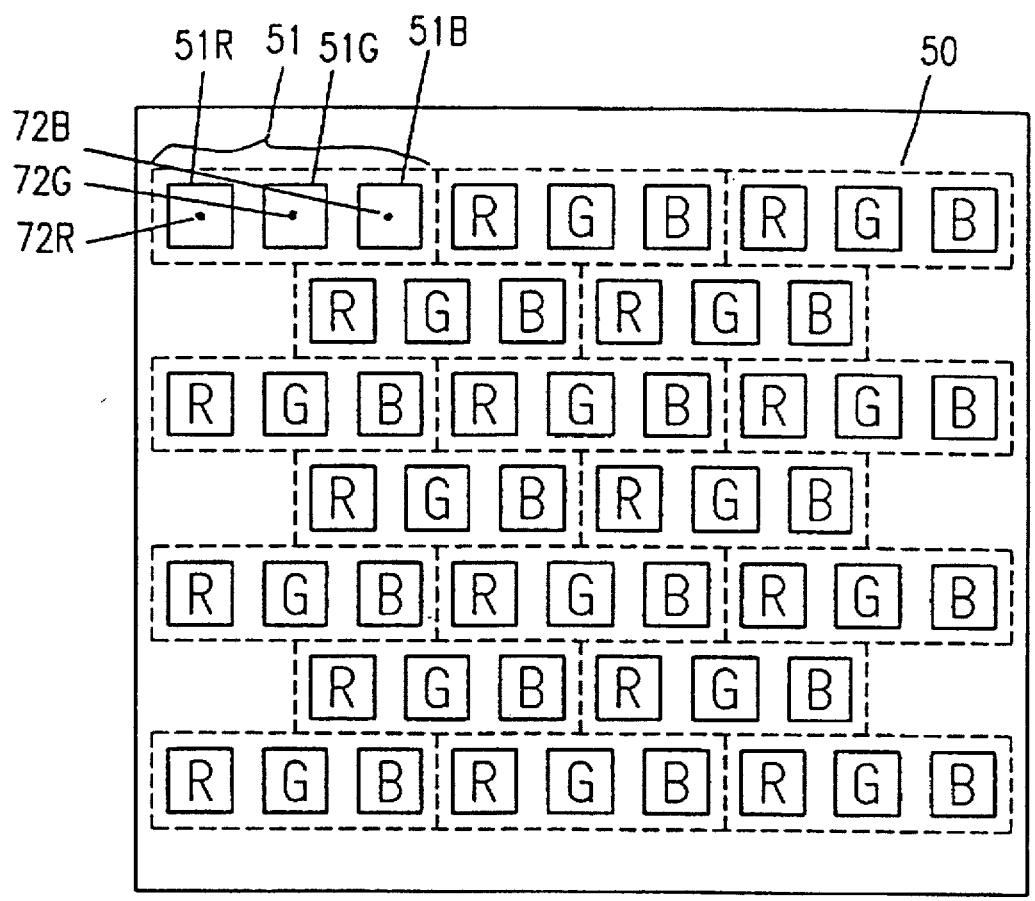
FIG. 2 is a schematic view illustrating a pixel structure of a liquid crystal panel illuminated by an illumination apparatus according to the present invention.
Figure 61:
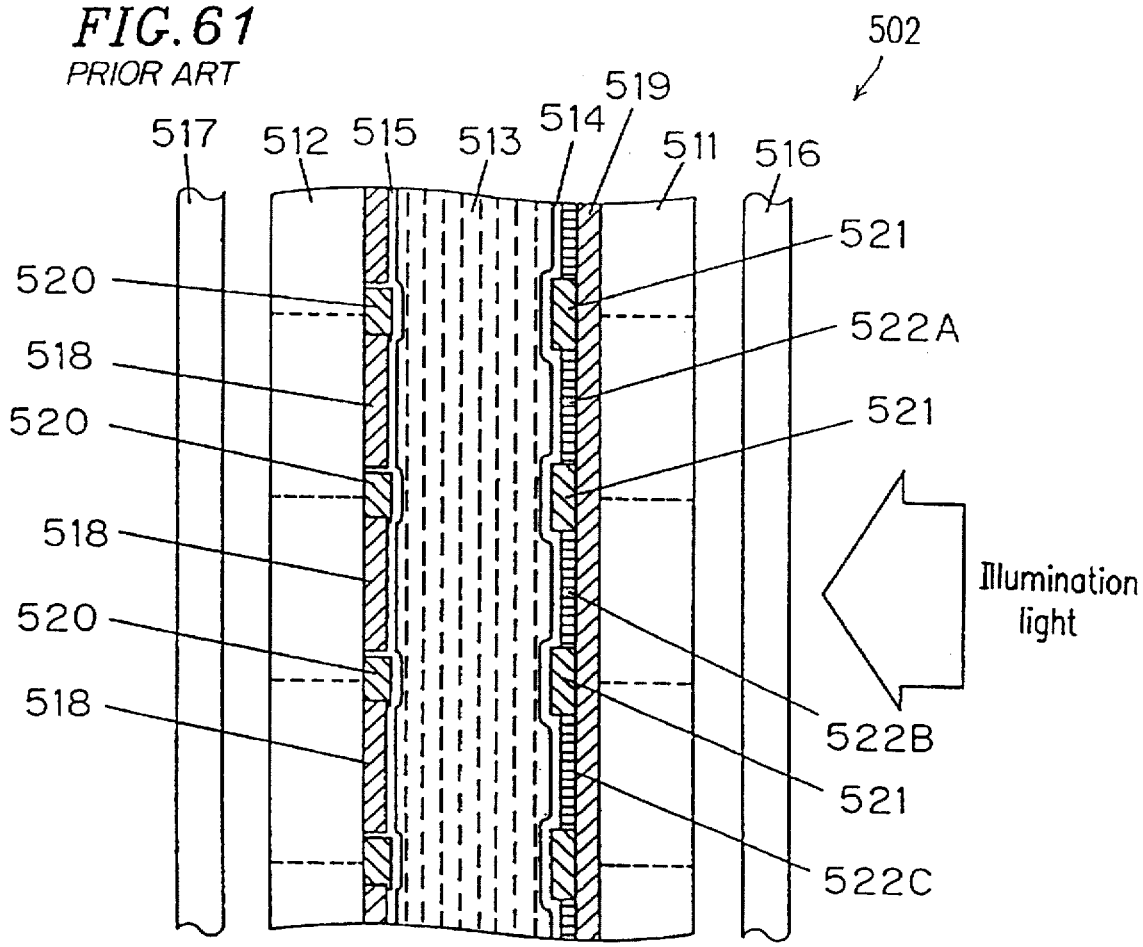
FIG. 61 is a cross sectional view of a liquid crystal panel used in the projection display apparatus shown in FIG. 60.

In FIG. 1, reference numeral 50 denotes an optical surface of, for example, a light valve to be illuminated by the illumination apparatus 1. The optical surface 50 has color pixel units 51 provided two-dimensionally, each including three areas for the three primary colors. FIG. 2 shows an arrangement of the color pixel units 51 in the optical surface 50 of a transmission liquid crystal panel used as a light valve, which has the same structure as the liquid crystal panel 502 shown in FIG. 61.

Each color pixel unit 51 includes a pixel which is to be supplied with a video signal corresponding to a red optical image (hereinafter, referred to as a "red pixel"), a pixel which is to be supplied with a video signal corresponding to a green optical image (hereinafter, referred to as a "green pixel"), and a pixel which is to be supplied with a video signal corresponding to a blue optical image (hereinafter, referred to as a "blue pixel"). Reference numeral 51R denotes an aperture of a red pixel, reference numeral 51G denotes an aperture of a green pixel, and reference numeral 51B denotes an aperture of a blue pixel. Hereinafter, the apertures 51R, 51G and 51B will be referred to also as "red, green and blue pixel apertures 51R, 51G and 51B", respectively. A red filter can be formed in the red pixel aperture 51R, a green filter can be formed in the green pixel aperture 51G, and a blue filter can be formed in the blue pixel aperture 51B. On the rest of the optical surface 50, a black matrix is formed acting as a light shielding layer for prohibiting light from illuminating thin film transistors and the wires used for sending signals.

FIG. 2 shows the pixels in a magnified state in order to clearly illustrate the arrangement but does not reflect the size or the number of the actual pixels. The broken lines are phantom lines used to clearly show the borders among the color pixel units 51.

Referring again to FIG. 1, the illumination apparatus 1 includes a metal halide lamp 52, a parabolic mirror 53, a UV-IR cut filter 54, a luminous surface forming lens 55, a dichroic mirror 56 for reflecting red light, a dichroic mirror 57 for reflecting blue light, flat mirrors 58 and 59, relay lenses 60R, 60G and 60B, a field lens 62, a first microlens array 63, and a second microlens array 64. The dichroic mirror 57 for reflecting blue light is divided into two pieces, and the dichroic mirror 56 for reflecting red light is interposed between the two pieces in the shape of letter "X".

The metal halide lamp 52 includes a luminous element 65, which emits light having red, green and blue light components. The parabolic mirror 53 has a sufficiently large solid angle with respect to the luminous element 65 and thus condenses most of the light emitted by the luminous element 65 to cause the light to travel substantially parallel to an optical axis 66 thereof. The optical axis 66 runs through the center of gravity of the optical surface 50 in the normal direction with respect to the optical surface 50. The optical axes of the luminous surface forming lens 55, the relay lens 60G and the field lens 62 match the optical axis 66.

The light emitted by the parabolic mirror 53 has unnecessary infrared radiation and ultraviolet radiation. Such infrared radiation and ultraviolet radiation are cut from the light by the UV-IR cut filter 54, and then the light illuminates a principal plane 67 of the luminous surface forming lens 55. Since the principal plane 67 and the optical surface 50 are conjugate with each other in the illumination apparatus 1, the brightness distribution of the principal plane 67 is reflected to the brightness distribution of the optical surface 50. Thus, the principal plane 67 will hereinafter be referred to as the "prestage surface 67".

The luminous surface forming lens 55 converges the light transmitted through the prestage optical surface 67 to form a luminous surface for illuminating the optical surface 50. The dichroic mirror 56 reflects only red light rays and the dichroic mirror 57 reflects only blue light rays. The optical paths of the red and blue rays are respectively bent by the flat mirrors 58 and 59. Only the green light rays transmit through the dichroic mirrors 56 and 57. As a result, red, green and blue luminous surfaces 68R, 68G and 68B are formed. By appropriately selecting the power of the luminous surface forming lens 55, and the sizes and positions of the dichroic mirrors 56 and 57 and the flat mirrors 58 and 59, the red, green and blue light rays can be converged separately in the vicinity of principal planes of the relay lenses 60R, 60G and 60B. Thus, luminous surfaces 68R, 68G and 68B are formed on substantially the same plane.

The luminous surfaces 68R, 68G and 68B are similar in shape to and located in correspondence with the pixel apertures 51R, 51G and 51B. In detail, the luminous surfaces 68R, 68G and 68B are located so that the light rays respectively having the three primary colors from the center of gravity thereof transmit through points in the vicinity of centers of gravity 72R, 72G and 72B of the pixel apertures 51R, 51G and 51B. The sizes of the luminous surfaces 68R, 68G and 68B are determined so as to cause the effective expansion of the actual images of the luminous surfaces 68R, 68G and 68B formed in the pixel apertures 51R, 51G and 51B to substantially be inscribed in the respective pixel apertures 51R, 51G and 51B.

The relay lenses 60R, 60G and 60B cause the prestage optical surface 67 and a principal plane 69 of the field lens 62 to have a substantially conjugate relationship. The optical path from the field lens 62 to the optical surface 50 is significantly shorter than the other optical paths, and thus the prestage optical surface 67 is substantially conjugate with the optical surface 50. Accordingly, white light transmitted through the prestage optical surface 67 is decomposed into light rays respectively having the three primary colors, which illuminate the optical surface 50 in a superimposed state by the relay lenses 60R, 60G and 60B.

In detail, the red light and blue light rays travelling along the optical axis 66 and bent by the dichroic mirrors 56 and 57 need to cross the green light rays travelling along the optical axis 66 in the vicinity of the intersection of the optical surface 50 and the optical axis 66. In order to realize such a state, the orientation of the flat mirrors 58 and 59 is appropriately set, and the relay lenses 60R and 60B are appropriately decentered. The structure and the power of the relay lenses 60R, 60G and 60B are appropriately set so as to uniformize the size of the cross sections of the light rays respectively having the three primary colors on the optical surface 50.

In the above-described structure, the light emitted by the luminous element 65 is mostly reflected by the parabolic mirror 53. The light reflected by the parabolic mirror 53 reaches the principal planes of the relay lenses 60R, 60G and 60B through the prestage optical surface 67, and then reaches the principal plane 69 of the field lens 62. Since the field lens 62 is positioned close to the optical surface 50 with the microlens arrays 63 and 64 interposed therebetween, the light emitted by the luminous element 65 is mostly utilized for illuminating the optical surface 50. Accordingly, the illumination apparatus 1 can enjoy a significantly high level of light utilization efficiency.

The field lens 62 is a planoconvex lens, and light is incident on a convex surface thereof. The first microlens array 63 is provided close to a flat surface of the field lens 62. The focal point of the field lens 62 on the light-incoming side is in the vicinity of the principal point of the relay lens 60G on the light-outgoing side, and thus the light emitted from the center of gravity of the green luminous surface 68G runs parallel to the optical axis 66. The light from the field lens 62 is incident on the first microlens array 63.

The first microlens array 63 includes a plurality of first microlenses 70 arranged two-dimensionally. The second microlens array 64 located opposed to the first microlens array 63 includes a plurality of second microlenses 71 arranged two-dimensionally. The first microlenses 70 correspond to and provided in the same quantity as the color pixel units 51. The second microlenses 71 also correspond to and provided in the same quantity as the color pixel units 51. The corresponding first and second microlenses 70 and 71 have the same optical axis to each other, and such optical axis is parallel to the optical axis 66 and transmit through a point in the vicinity of the center of gravity of the effective area of the respective color pixel unit 51.

Figure 3:
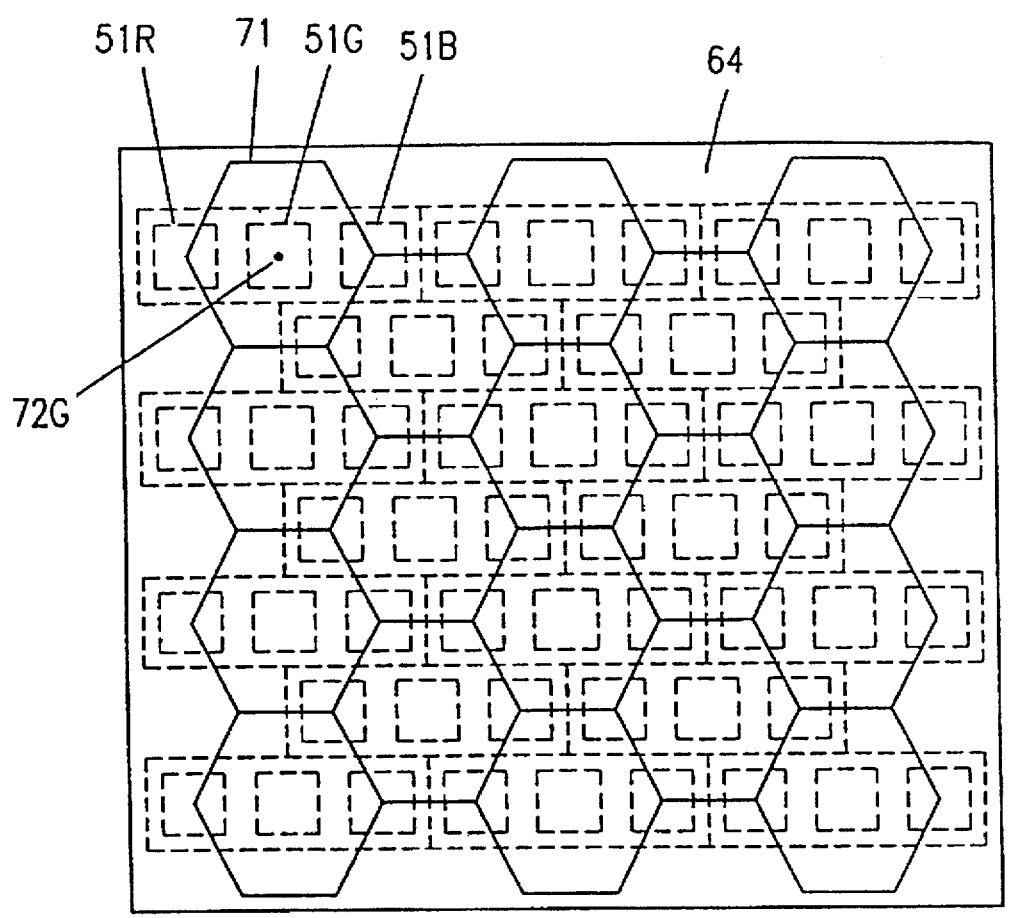
FIG. 3 is a schematic view illustrating a structure of a second microlens array in an illumination apparatus according to the present invention.

FIG. 3 illustrates the second microlens array 64 in detail. In FIG. 3, the shape and arrangement of the second microlenses 71 are shown in correspondence with the structure of the optical surface 50 shown in FIG. 2, and broken lines indicate the pixel apertures 51R, 51G and 51B.

As is illustrated in FIG. 3, each second microlens 71 has a hexagonal aperture and corresponds to the color pixel unit 51 including the pixel apertures 51R, 51G and 51B. The optical axis transmits through the center of gravity of the color pixel unit 51, namely, the center of gravity 72G of the green pixel aperture 51G.

The first microlenses 70 have apertures of the same shape as that of the second microlenses 71 and are arranged in the same manner as the second microlenses 71.

Figure 4:
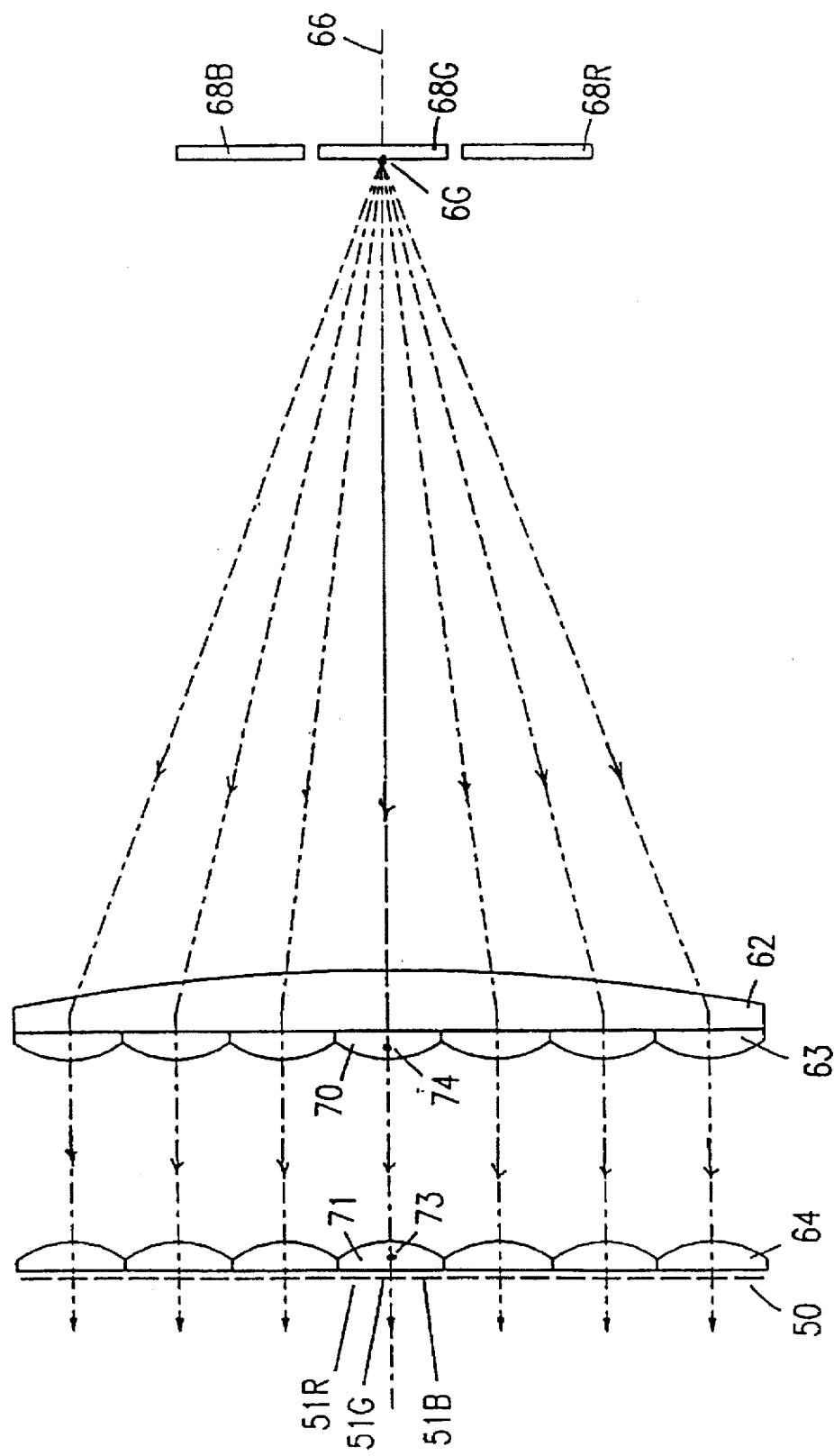
FIG. 4 is a schematic view illustrating the operation of the illumination apparatus shown in FIG. 1.
Figure 5:
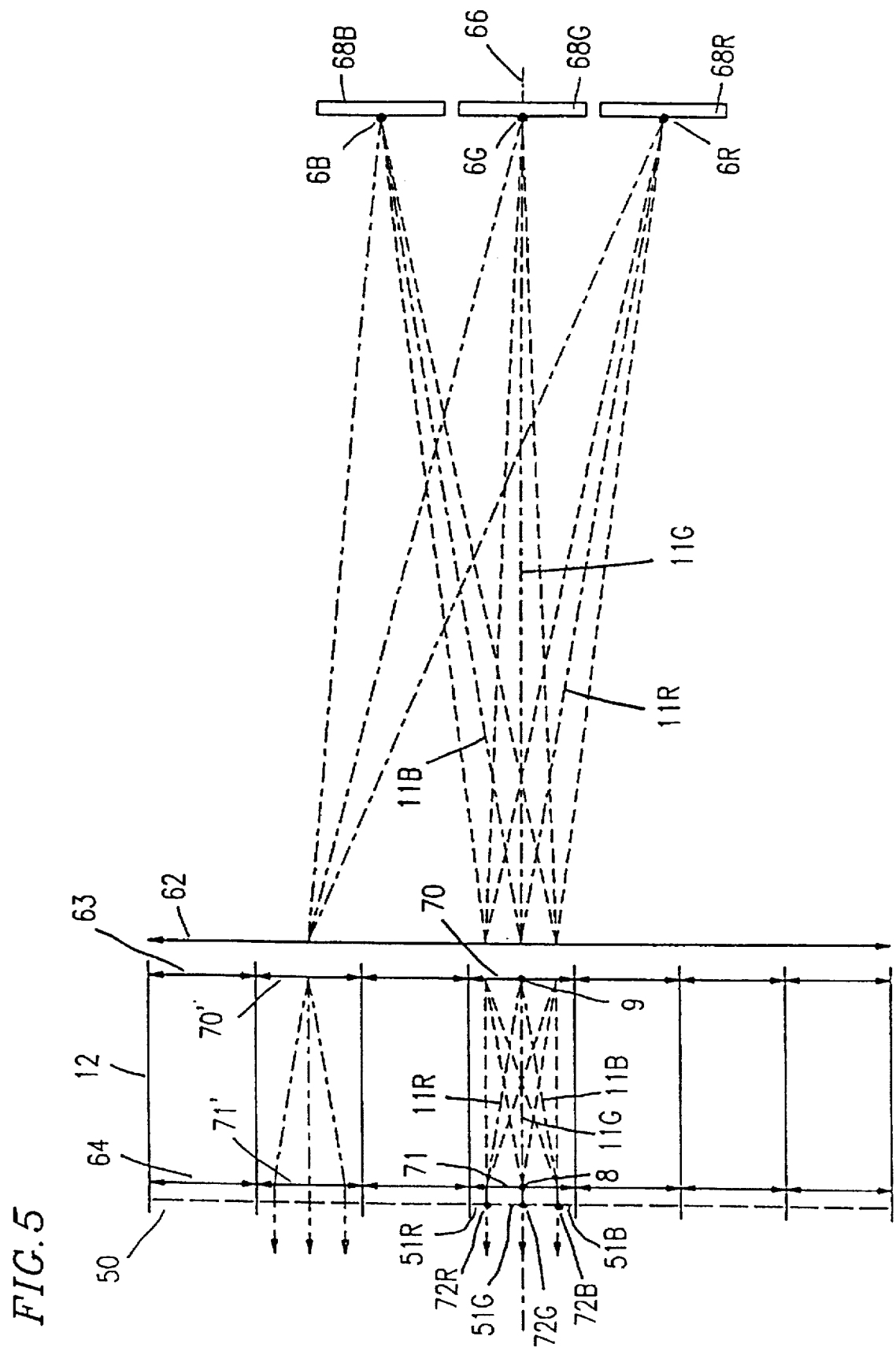
FIG. 5 is another schematic view illustrating the operation of the illumination apparatus shown in FIG. 1.

With reference to FIGS. 4 and 5, the optical system from the luminous surfaces 68R, 68G and 68B to the optical surface 50 operates in the following manner. FIG. 4 shows only the luminous surfaces 68R, 68G and 68B, the field lens 62, the first microlens array 63, the second microlens array 64, and the optical surface 50 of the illumination apparatus 1 shown in FIG. 1.

The illumination apparatus 1 is structured so that the focal point of the field lens 62 on the light-incoming side matches a center of gravity 6G of the luminous surface 68G, and a green light ray from the center of gravity 6G transmits through the field lens 62 and then travels parallel to the optical axis 66. In the case where the optical surface 50 is smaller than the focal distance of the field lens 62, influence of various aberrations can be ignored even if the field lens 62 is a planoconvex lens having a spheric surface. In the case where the field lens 62 is an aspheric convex lens or a fresnel lens having an aspheric surface as a base curved surface, the spheric aberration can be sufficiently small to allow the light from the center of gravity 6G to travel substantially parallel to the optical axis 66.

The focal point of each first microlens 70 on the light-outgoing side is in the vicinity of a principal point 73 of the corresponding second microlens 71. Thus, the light which travels parallel to the optical axis 66 and is incident on the first microlens 70 is converged in the vicinity of the principal point 73. For example, the green light ray from the center of gravity 6G of the luminous surface 68G is converged by the respective first microlens 70 and reaches a point in the vicinity of the principal point 73 of the corresponding second microlens 71. The focal point of each second microlens 71 on the light-incoming side is in the vicinity of a principal point 74 of the corresponding first microlens 70. Thus, the light transmitting through the principal point 74 transmits through the second microlens 71 parallel to the optical axis 66.

FIG. 5 also illustrates the optical system shown in FIG. 4, although each of the field lens 62, the first microlens array 63 and the second microlens array 64 is indicated by a straight line. Since the field lens 62 and the first microlens array 63 are close to each other, the light incident on the field lens 62 is considered to go out of the first microlens 70 maintaining the height thereof. Since the second microlens array 64 and the optical surface 50 are close to each other, the distance therebetween can be ignored when compared with the focal distance of the second microlens 71. Lines 12 are used to clearly indicate the positional relationship between second microlenses 71 and color pixel units 51.

In the above-described structure, the field lens 62 and the first microlens 70 cause the luminous surfaces 68R, 68G and 68B and the principal plane of the corresponding second microlens 71 to be conjugate with each other. The luminous surfaces 68R, 68G and 68B are similar in shape to and located in correspondence with the pixel apertures 51R, 51G and 51B and the magnification ratio of the optical system is appropriate. Accordingly, the red light rays from the red luminous surface 68R reach the red pixel aperture 51R, the green light rays from the green luminous surface 68G reach the green pixel aperture 51G, and the blue light rays from the blue luminous surface 68B reach the blue pixel aperture 51B.

In detail, a light ray 11R coming from a center of gravity 6R of the red luminous surface 68R and transmitting through a principal point 9 of the first microlens 70 is collimated to travel parallel to the optical axis 66 by the second microlens 71 and reaches the center of gravity 72R of the red pixel aperture 51R. In the same manner, a light ray 11G coming from the center of gravity 6G of the green luminous surface 68G and transmitting through the principal point 9 of the first microlens 70 reaches the center of gravity 72G of the green pixel aperture 51G; and a light ray 11B coming from a center of gravity 6B of the blue luminous surface 68B and transmitting through the principal point 9 of the first microlens 70 reaches the center of gravity 72B of the blue pixel aperture 51B. The other light rays from the center of gravities 6R, 6G and 6B to be incident on the first microlens 70 cross the light rays 11R, 11G and 11B on the principal plane of the second microlens 71. Since the second microlenses 71 and the optical surface 50 are close to each other, all of these light rays can be considered to reach points in the vicinity of the center of gravities 72R, 72G and 72B of the corresponding pixel apertures 51R, 51G and 51B.

The above description is done regarding the microlenses and the color pixels on the optical axis 66. The microlenses and the color pixels on other optical axes, for example, the first microlens 70', the second microlens 71' and the color pixels corresponding thereto act in the same manner. All the luminous surfaces 68R, 68G and 68B can be sufficiently conjugate with the color pixel units 51 regardless of the height of the color pixel unit from the optical axis 66, as long as the aperture of the field lens 62 is sufficiently small with respect to the focal distance thereof to satisfactorily restrict the spherical aberrations. The luminous surfaces can be regarded as being sufficiently conjugate with the color pixel units when the light rays from the luminous surfaces reach points in the vicinity of the pixel apertures of the respective colors.

In the illumination apparatus 1 having the above-described structure, white light emitted by the light source is decomposed into light rays respectively having the three primary colors, and each light ray reaches the pixel aperture of the corresponding color. Such an illumination apparatus can show a sufficiently high level of light utilization efficiency for illuminating a single color-display light valve.

Further, the illumination apparatus 1 has the following effects realized by the second microlenses 71. The light rays 11R, 11G and 11B shown in FIG. 5 can be considered to be representative of all the light rays of the corresponding colors from the luminous surfaces 68R, 68G and 68B. Thus, the light rays 11R, 11G and 11B will be referred to as "chief rays" of the light transmitting through the pixel apertures 51R, 51G and 51B. The illumination apparatus 1, in which the chief rays 11R, 11G and 11B transmit through the optical surface 50 in the state of being parallel to the optical axis 66, is advantageous when being used in a display apparatus for displaying an image by light transmitted through the optical surface 50 acting as a surface of a light valve having color pixels. Hereinafter, examples of such display apparatuses will be described.

(Display apparatus: example 1)

Figure 6:
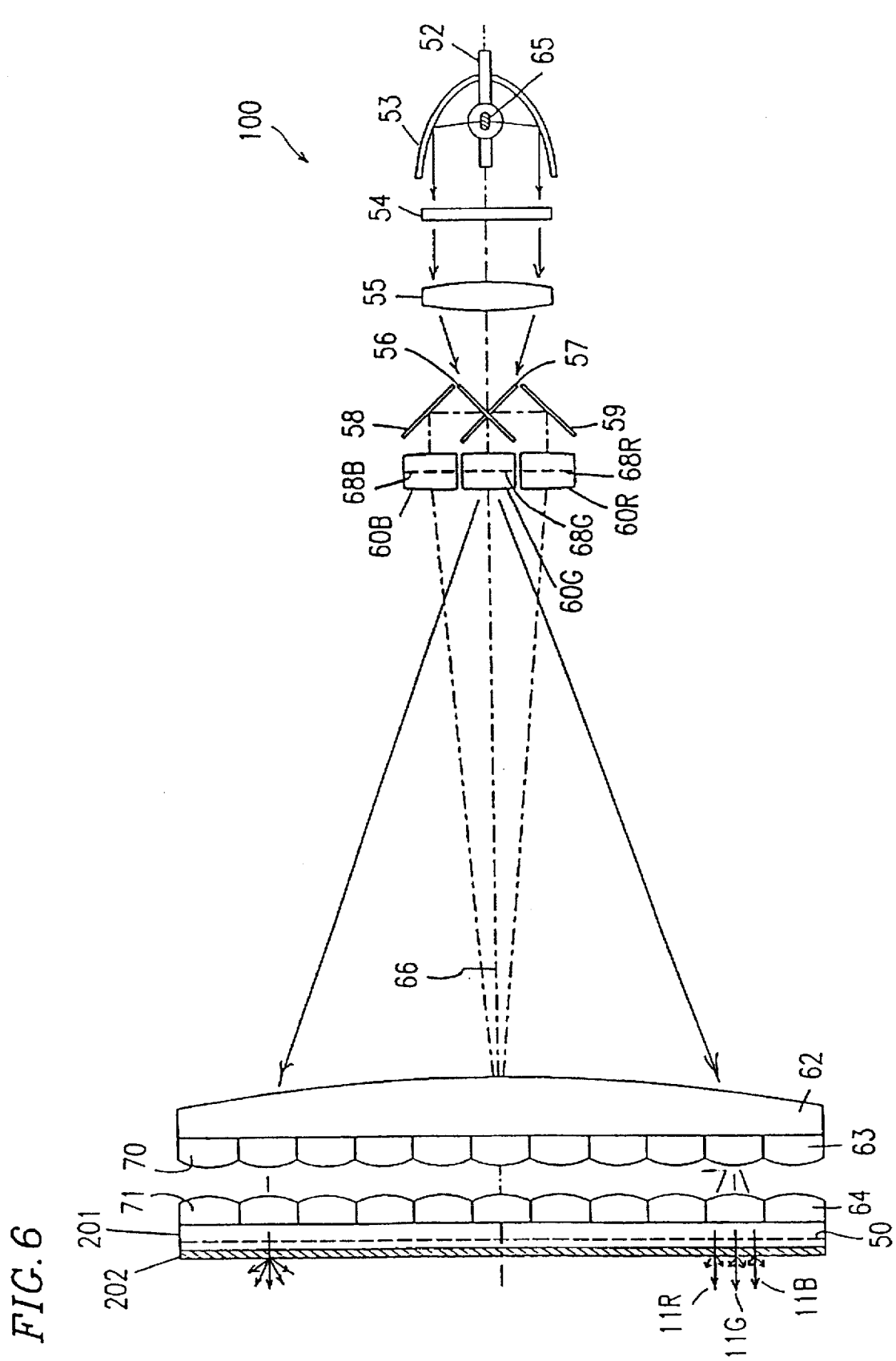
FIG. 6 is a schematic view of a display apparatus according to the present invention.

FIG. 6 is a schematic view of a display apparatus 100 including the illumination apparatus 1. In the display apparatus 100, a liquid crystal panel 201 has the optical surface 50. The liquid crystal panel 201 includes the color pixel units as shown in FIG. 2. The liquid crystal panel 201 includes a light scattering layer 202 on the light-outgoing side. Light incident on the light scattering layer 202 is scattered forward. A viewer recognizes an optical image formed on the liquid crystal panel 201 by recognizing the light scattered by the light scattering layer 202.

In the display apparatus 100, light emitted by the luminous element 65 is mostly transmitted to the liquid crystal panel 201 and then reaches the light scattering layer 202 through the pixel apertures for the three primary colors. Due to such a high level of light utilization efficiency, a brighter image can be displayed at lower power consumption. Further, the image displayed by the display apparatus 100 is of a sufficiently high quality for the following reason.

A luminous surface formed of the light scattering layer 202 preferably has an apparent brightness distribution which is brightest when being seen in the normal direction with respect to a surface of the light scattering layer 202 and has substantial rotation symmetry with the normal direction as the axis of symmetry when being seen in a direction having an angle with respect to the normal direction. The luminous surfaces respectively of the three primary colors preferably have the uniform apparent brightness distribution. If the apparent brightness distribution is different color by color, the color of the image changes in accordance with the viewing angle.

When the second microlens array 64 is not provided, the light rays of different colors are incident on the light scattering layer 202 at different angles. Since the apparent brightness distribution of the luminous surface from the light scattering layer 202 is different color by color, the color of the image changes in accordance with the viewing angle.

In the display apparatus 100, the chief rays 11R, 11G and 11B (FIG. 5) are incident on the light scattering layer 202 through the liquid crystal panel 201 in the state of being parallel to the optical axis 66. Accordingly, the apparent bright distribution of the luminous surfaces on the light scattering layer 202 is uniform for the three primary colors, resulting in a high quality image.

(Display apparatus: example 2)

Figure 7:
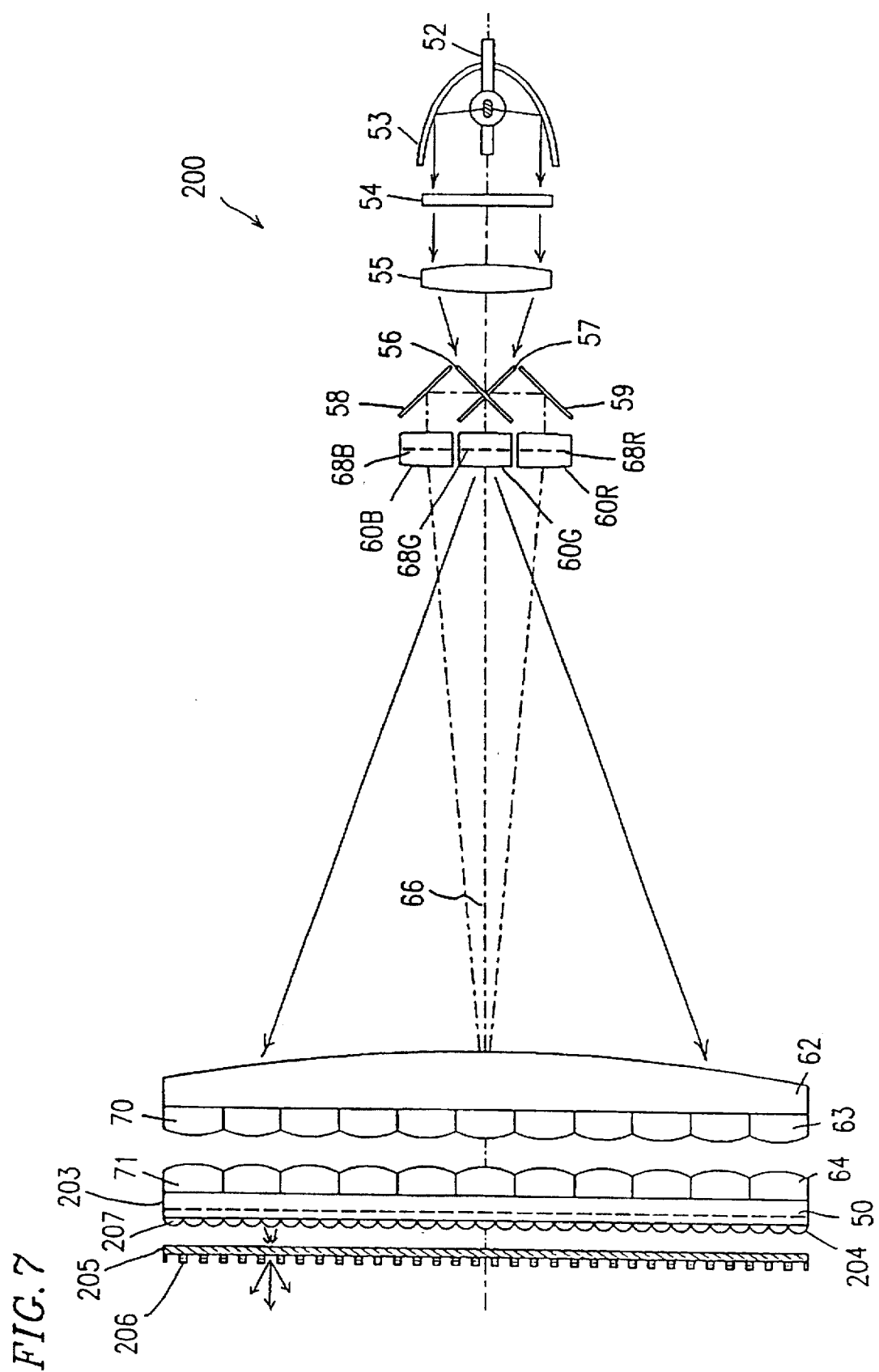
FIG. 7 is a schematic view of another display apparatus according to the present invention.

FIG. 7 is a schematic view of a display apparatus 200 including the illumination apparatus 1. In the display apparatus 200, a liquid crystal panel 203 has the optical surface 50. The liquid crystal panel 203 includes a third microlens array 204 and a light scattering layer 205 on the light-outgoing side thereof. The third microlens array 204 includes a plurality of third microlenses 207 arranged two-dimensionally. The third microlenses 207 correspond to and provided in the same quantity as the pixel apertures 51R, 51G and 51B included in each color pixel unit 51. The focal point of each third microlens 207 on the light-outgoing side is on the light scattering layer 205.

In such a structure, the light rays transmitted through the pixel apertures 51R, 51G and 51B are respectively incident on the third microlenses 207 and then converged on the light scattering layer 205. The light scattering layer 205 scatters such light rays mainly forward. A viewer recognizes an optical image formed on the liquid crystal panel 203 by recognizing the light scattered by the light scattering layer 205.

In the above-described structure, the light rays respectively of the three primary colors from the third microlenses 207 preferably travel parallel to the optical axis 66. If the light rays of different colors travel in different directions, the light rays transmitted through the pixel apertures are mixed together. As a result, the image on the light scattering layer 205 has a lower level of resolution.

In the display apparatus 200, the chief rays respectively of the three primary colors transmitted through the pixel apertures of the liquid crystal panel 203 travel parallel to the optical axis 66. Accordingly, the chief rays are not mixed together, resulting in an image having a sufficiently high resolution.

A light absorbing layer 206 can be provided on the light-outgoing side of light scattering layer 205 in order to further improve the quality of the image. The light absorbing layer 206 is formed in a similar matrix to that of the black matrix of the liquid crystal panel 203. The light absorbing layer 206 is provided so that openings thereof positionally correspond to areas of the light scattering layer 205 to which the light rays are converged. In such a structure, the light rays respectively of the three primary colors which are incident on the light scattering layer 205 scatter forward through the openings of the light absorbing layer 206. Accordingly, the light absorbing layer 206 does not cause significant optical loss, and thus reduction in brightness of the displayed image is avoided.

In general, when external light is incident on the light scattering layer 205 from the side of the viewer, the black level of the displayed image is raised, so that the contrast of the image is reduced. The light absorbing layer 206, which absorbs the external light without significantly affecting light for forming an image, prevents such reduction in the black level. Thus, the black/white contrast of the image can be improved by providing the light absorbing layer 206 on the light-outgoing side of the light scattering layer 205.

As is described above, the display apparatuses 100 and 200 shown in FIGS. 6 and 7, each including the illumination apparatus 1, have an advantage of providing a brighter image with a higher level of light utilization efficiency, when compared with a structure in which the liquid crystal panel is illuminated from the back by scattered light with little collimation and an optical image modulated by a pixel structure of the liquid crystal panel is directly visually recognized. Moreover, since the light scattered by the light scattering layer is viewed in the display apparatuses 100 and 200, the quality of the image is sufficiently high over a wide range of viewing angles.

(Display apparatus: example 3)

Figure 8:
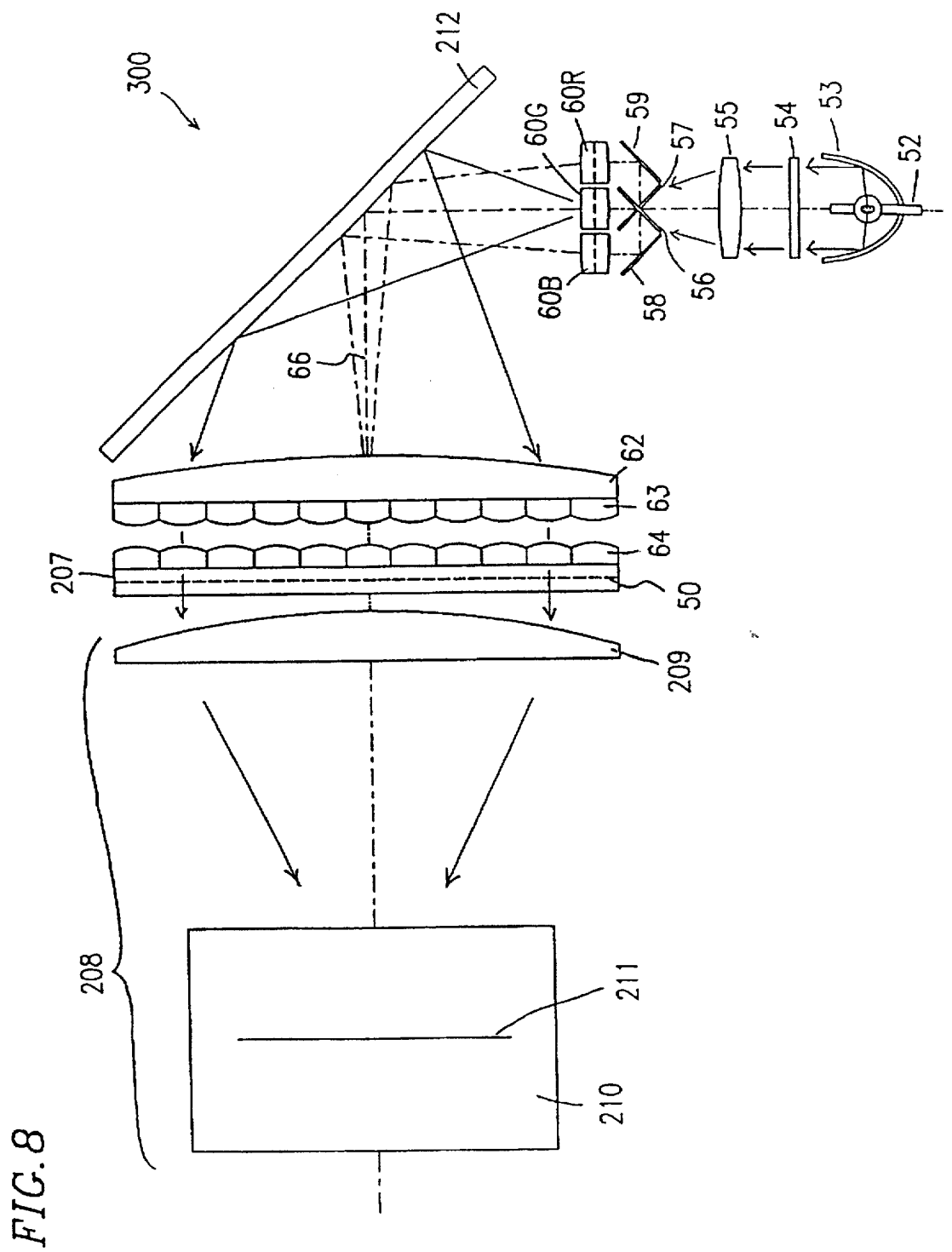
FIG. 8 is a schematic view of still another display apparatus according to the present invention.

FIG. 8 is a schematic view of a display apparatus 300 including the illumination apparatus 1. Identical elements as those in example 2 will bear identical reference numerals therewith and descriptions thereof will be omitted. In the display apparatus 300, a liquid crystal panel 207 has the optical surface 50. The light from the liquid crystal panel 207 is incident on a projection lens 208, and an optical image on the liquid crystal panel 207 is projected onto a screen (not shown) by the projection lens 208 in a magnified state. A flat mirror 212 is used to bend the optical path of the light from the metal halide lamp 52.

The liquid crystal panel 207 includes the color pixel units as shown in FIG. 2. The projection lens 208 includes a principal lens 210 and an assisting lens 209. Since the light ray from the liquid crystal panel 207 is substantially parallel to the optical axis 66, the projection lens 208 is preferably telecentric. The assisting lens 209 converges the light from the liquid crystal panel 207 and guides the light to the principal lens 210. The principal lens 210 compensates for various aberrations and projects the image on the screen by a prescribed magnification ratio.

In the above-described structure, the light incident on the projection lens 208 is converged on an entrance pupil 211. In the display apparatus 300, the light rays respectively of the three primary colors from the liquid crystal panel 207 travel in the same direction. Thus, the light rays respectively of the three primary colors are superimposed in the entrance pupil 211 to form a white luminous surface. If the second microlens array 64 is not provided, the light rays respectively of the three primary colors from the liquid crystal panel 207 travel in different directions from one another. Thus, luminous surfaces respectively of the three primary colors are formed discretely in the entrance pupil 211. The display apparatus 300 in which the light rays respectively of the three primary colors are superimposed can allow for use of a projection lens having a smaller converging angle than an apparatus without the second microlens array 64 in order to obtain an image having the same brightness by projection. Accordingly, a projection lens having a relatively large F-number can be used in the display apparatus 300. Such a projection lens can restrict various aberrations relatively easily and has a smaller diameter, and thus is compact in size and can be produced at lower cost.

Further, in the display apparatus 300, the light emitted by the luminous element mostly reaches the projection lens 208 as in the display apparatuses 100 and 200. As is apparent from this, the display apparatus 300 also enjoys a high level of light utilization efficiency and displays a bright image on the screen.

(Modifications of the illumination apparatus 1 and the display apparatuses 100 through 300)

The following modifications are applicable to the illumination apparatus 1 and the display apparatuses 100 through 300 shown in FIGS. 6 through 8.

As is described above, in the illumination apparatus 1 shown in FIG. 1, the light emitted by the luminous element 65 is mostly utilized to form the luminous surfaces 68R, 68G and 68B, which illuminate the optical surface 50. The light rays respectively of the three primary colors respectively reach the areas of the optical surface 50 corresponding to the red, green and blue pixel apertures 51R, 51G and 51B by the first microlenses 70 and the second microlenses 71. Further, the chief rays respectively of the three primary colors passing through the respective pixel apertures 51R, and 51B travel parallel to the optical axis 66. The illumination apparatus 1 operating in such a manner, when used in a display apparatus, contributes to display of a bright image on the screen at a high level of light utilization efficiency. Moreover, the light modulated by the pixel structure of the liquid crystal panel can be easily utilized.

Figure 9:
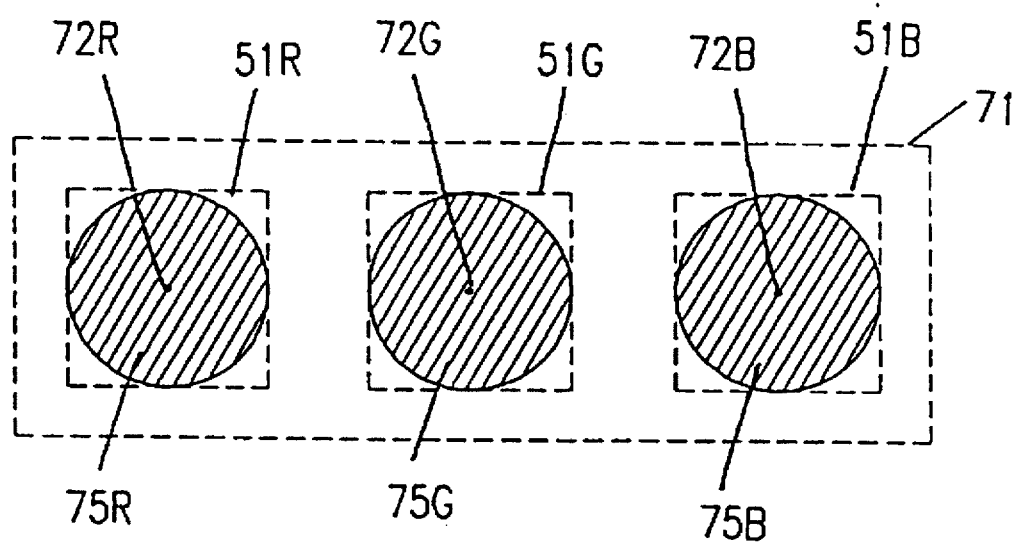
FIG. 9 is a schematic view illustrating an example of actual images of luminous surfaces formed in the vicinity of apertures of pixels by an illumination apparatus according to the present invention.

FIG. 9 schematically shows an example of actual images 75R, 75G and 75B of the luminous surfaces 68R, 68G and 68B formed on the principal plane of the second microlens 71. The actual images 75R, 75G and 75B will also be referred respectively to red, green and blue actual images 75R, 75G and 75B. Since the optical surface 50 and the principal plane of the second microlens 71 are close to each other, the actual images 75R, 75G and 75B can be considered to be formed in the pixel apertures 51R, 51G and 51B. In FIG. 9, the actual image 75R of the red luminous surface 68R is formed on the center of gravity 72R of the red pixel aperture 51R. By selecting an appropriate size of the luminous surface 68R and an appropriate magnification ratio of the optical path from the red luminous surface 68R to the red actual image 75R so as to allow most of the light forming the red actual image 75R to pass through the pixel aperture 51R, the optical loss can be significantly reduced. In order to realize such a state, the effective expansion of the actual image 75R is adjusted to substantially inscribed in the pixel aperture 51R. The luminous surfaces 68G and 68B, the actual images 75G and 75B, and the pixel apertures 51G and 51B are caused to have the same relationship.

In this manner, the luminous flux passing through the pixel apertures 51R, 51G and 51B increases, resulting in a brighter image displayed on the screen by projection.

In the case of the structure shown in FIG. 9, the liquid crystal panel acting as a light valve does not have to include color filters. Since the light rays respectively of the three primary colors are caused to reach the respective pixel apertures, a color optical image can be formed even without color filters. In the case where no color filter is provided, the transmittance of the light passing through the pixel apertures rises to enhance the light utilization efficiency.

Needless to say, the liquid crystal panel can include color filters. When color filters are provided, even if a light ray of one color reaches a pixel aperture of a different color by a positioning error of the optical system or the like, the reduction in the color purity of the light passing through the pixel aperture can be restricted. When the light ray of each color is caused to pass through the filter of the same color, the color purity increases although the light utilization efficiency lowers. The resultant image has a better characteristic of color reproduction.

In the illumination apparatus 1, the first microlens array 63 and the second microlens array 64 can be each formed of a flat microlens array produced by an ion exchange method. Such a flat microlens array includes a plurality of microscopic lens areas formed in a glass plate two-dimensionally to have a different refractive index from the rest of the glass plate. In detail, the flat microlens array is formed in the following manner. First, a mask having prescribed openings is formed on a surface of a glass plate, and the glass plate is immersed in a fused salt, for example, fused alkaline. Through the openings, ions in the glass plate and different types of ions contained in the fused alkaline are exchanged. As a result, areas in positional correspondence with the mask pattern (or the pattern of the openings) have a different refractive index from the rest of the glass plate.

Figure 10:
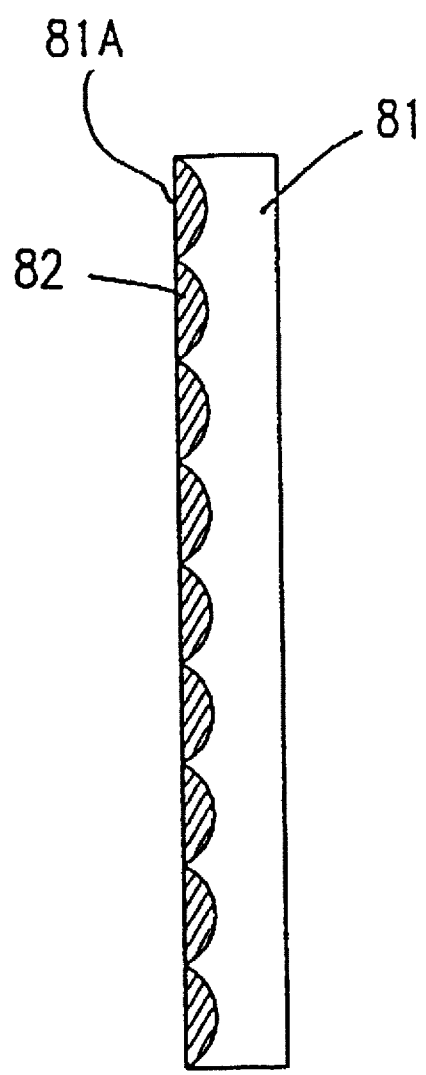
FIG. 10 is a schematic cross sectional view of a flat microlens array.

FIG. 10 schematically shows a cross section of such a flat microlens array. As is shown in FIG. 10, a glass plate 81 has microscopic areas 82 having a different refractive index. Characteristically, a top surface 81A of the glass plate 81 in which the microscopic areas 82 are formed is flat. Such a flat microlens array can be in pressure contact with the surface of an optical element such as a liquid crystal panel.

Figure 11:
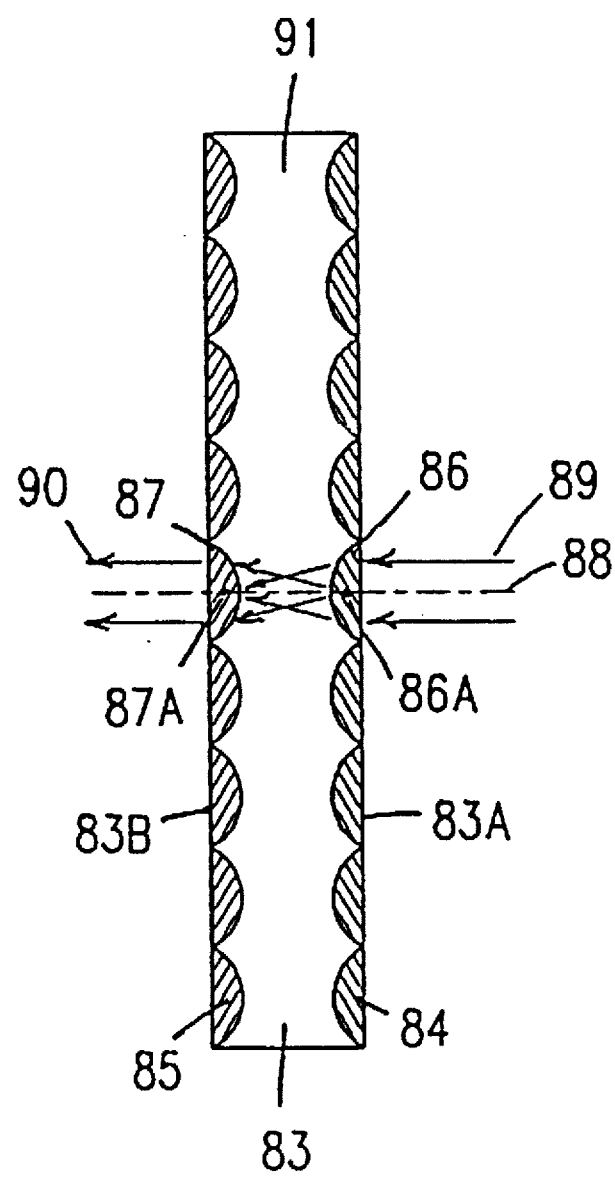
FIG. 11 is a schematic cross sectional view of another flat microlens array.

FIG. 11 schematically shows a cross section of a flat microlens array 91 acting as the first microlens array 63 and the second microlens array 64. The flat microlens array 91 includes a glass plate 83. Immediately inside two surfaces of the glass plate 83, areas 84 and 85 having different refractive indexes from the rest of the glass plate 83 are formed two-dimensionally. The areas 84 and 85 act as first microlenses 86 (corresponding to the first microlenses 70) and second microlenses 87 (corresponding to the second microlenses 71), respectively. Each first microlens 86 and the second microlens 87 opposed thereto have a common optical axis 88.

The flat microlens array 91 operates in the following manner. For simplicity, the operation will be described regarding one first microlens 86 and the corresponding second microlens 87.

The first microlens 86 converges a light ray 89 incident thereon parallel to the optical axis 88 onto a point in the vicinity of a principal point 87A of the corresponding second microlens 87. The second microlens 87 allows light passing through a principal point 86A of the corresponding first microlens 86 to pass therethrough as a light ray 90 travelling parallel to the optical axis 88. The size of each microlens and the arrangement pitch are determined in correspondence with the size and the arrangement pitch of the pixels in the liquid crystal panel to be illuminated by the optical system. By forming the areas 84 and 85 having an appropriate refractive index, the first and second microlenses 86 and 87 can operate in the above-described manner.

The flat microlens array 91 can be used in the illumination apparatus 1 shown in FIG. 1. For example, the flat microlens array 91 is provided so that a flat surface 83A thereof is closely opposed to a flat surface of the field lens 62 on the light-outgoing side, and a flat surface 83B is closely opposed to the optical surface 50, namely, the light-incoming surface of the liquid crystal panel. In this manner, the flat microlens array 91 can be used in lieu of both the first and second microlens arrays 63 and 64.

The positional relationship of the first microlenses 70 and the second microlenses 71 with respect to each other and also with respect to the other elements defined in terms of the focal distance in the description of the illumination apparatus 1 does not limit the present invention. For example, the second microlenses 71 can be located on the light-outgoing side of the color pixel units 51 instead of the light-incoming side.

A liquid crystal panel generally used in the illumination apparatus 1 includes a glass plate having a thickness of, for example, 0.7 mm on the light-incoming side of the black matrix which defines the pixel apertures. The thickness of 0.7 mm is an example of the thickness of a relatively thinner glass plate. When forming a structure in which the second microlens array 64 is located on the light-incoming side of the glass plate, it is difficult to reduce the distance between the second microlenses 71 and the color pixel units 51 to less than 0.7 mm due to the glass plate. Such an inconvenience is solved when the optical path between the first microlens 70 and the corresponding second microlens 71 is twice or more the thickness of the glass plate to provide an appropriately different relationship in the focal distances of the first microlens 70 and the second microlens 71 from the one described in the first example. Accordingly, the actual images 75R, 75G and 75B of the luminous surfaces 68R, 68G and 68B are formed in the vicinity of the pixel apertures 51R, 51G and 51B, and further the chief rays 11R, 11G and 11B travel more parallel to the optical axis 66 than in the case where no second microlens array is provided.

Figure 12:
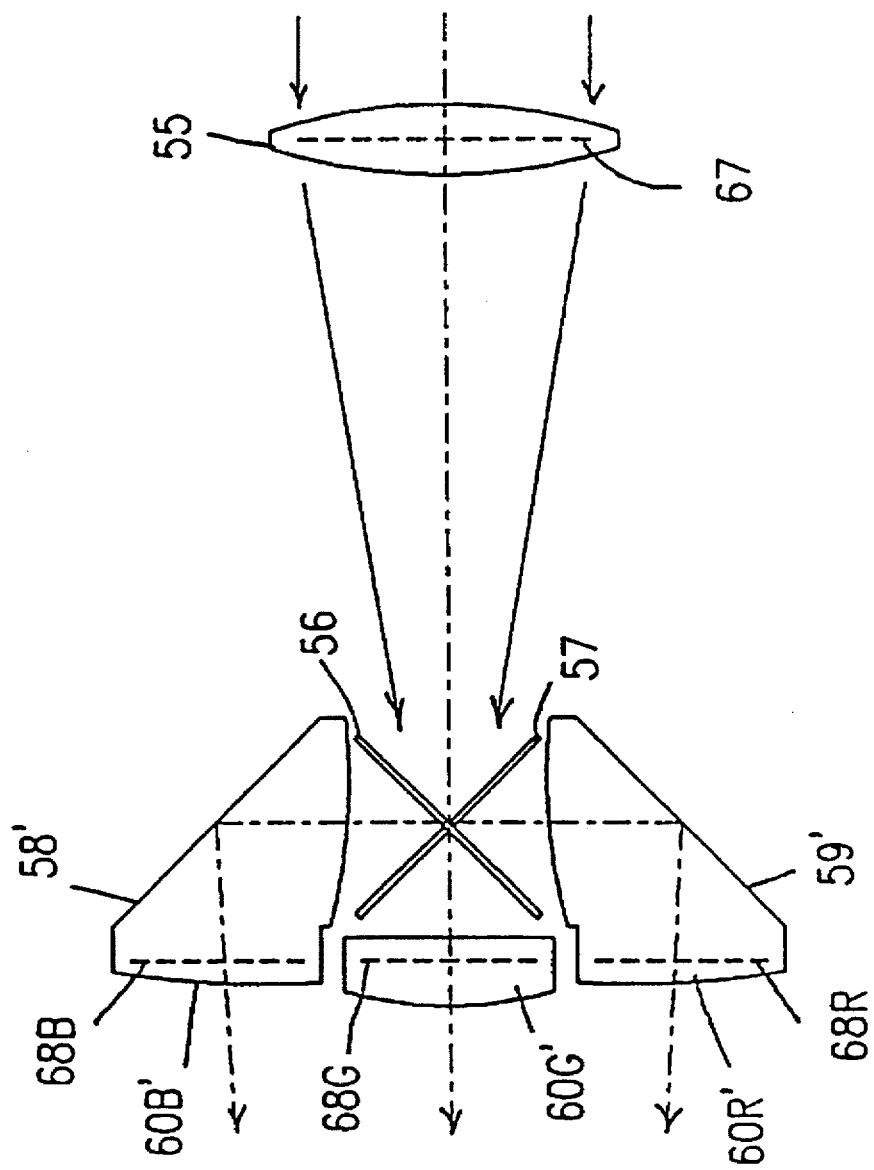
FIG. 12 is a schematic view of a modification of the illumination apparatus shown in FIG. 1.

In the illumination apparatus 1, the luminous surfaces 68R, 68G and 68B are preferably formed in a structure shown in FIG. 12 from the luminous surface forming lens 55 to relay lenses.

In FIG. 12, a relay lens 60R' located on the optical path of a red light ray includes a triangular prism and two convex lenses respectively formed on a light-incoming surface and a light-outgoing surface of the triangular prism. A total reflection plane 59' of the triangular prism, which acts as the flat mirror 59 in FIG. 1, receives the red light ray reflected by the dichroic mirror 56 and bends the optical path thereof in a prescribed direction. The relay lens 60R' can be regarded as a biconvex lens having a built-in flat mirror 59'. Such a biconvex lens can be formed by molding a PMMA (polymethyl methacrylic acid) resin using a mold or by applying two planoconvex lenses respectively to a light-incoming flat surface and a light-outgoing flat surface of a triangular prism formed of general optical glass. The angle of the optical path bent by the flat mirror 59' and the optical axis of the convex lenses are appropriately determined so that the red light ray passing through the respective relay lens 60R' superimposes the green light ray on the optical surface 50. The same conditions are applied to a relay lens 60B' located on the optical path of a blue light ray.

The relay lenses 60R' and 60B' and a relay lens 60G' corresponding to a green light ray need to form actual images of the prestage optical surface 67 of the luminous surface forming lens 55 at a position in the vicinity of the optical surface 50 at a prescribed magnification ratio. In the structure shown in FIG. 1, the optical path from the prestage optical surface 67 to a principal point of each of the relay lenses 60R and 60B on the light-incoming side is longer than the optical path from the prestage optical surface 67 to a principal point of the relay lens 60G on the light-incoming side. By contrast, the optical paths from the principal point of the relay lenses 60R, 60G and 60B on the light-outgoing side to the optical surface 50 are equal to one another. This is not a serious problem when the magnification ratio of relay lenses is small. However, when the magnification ratio of the relay lenses is large, the side of the cross section of the green light ray is different from the size of the cross section of the red and blue light rays on the optical surface 50. In other words, the red and blue light rays do not expand on the optical surface 50 as much as the green light ray. Since the magnification ratio of the relay lenses is determined so that the red and blue light rays illuminate the optical surface 50 entirely, the green light ray is darker than the red and blue light rays.

The structure in FIG. 12 has two advantages over the structure shown in FIG. 1.

First, the light rays reflected by the dichroic mirrors 56 and 57 are immediately incident on the relay lenses 60R' and 60B'. Since the relay lenses 60R' and 60B' each have a higher refractive index than air, the difference between the optical paths of the red and blue light rays and the optical path of the green light ray can be smaller than that in FIG. 1.

Second, since the relay lenses 60R' and 60B' are both biconvex lenses, and a convex surface on the light-incoming side thereof is closer to the luminous surface forming lens 55 than in the structure of FIG. 1, the principal point of each of the relay lenses 60R' and 60B' on the light-incoming side can be closer to the prestage optical surface 67 of the luminous surface forming lens 55. In such an arrangement, the relay lenses 60R', 60G' and 60B' can have an equal magnification ratio with respect to the prestage optical surface 67 more easily than in the structure in FIG. 1.

For these two reasons, the structure shown in FIG. 12 provides a still brighter image.

EXAMPLE 2

An illumination apparatus in a second example according to the present invention will be described.

The shape of apertures of a light valve is determined based on, for example, the aspect ratio of the display area and the number of pixels in the vertical direction (X direction) and the horizontal direction (Y direction). Accordingly, apertures of a light valve are available in various shapes. The square shape shown in FIG. 2 is only one example. The illumination apparatus in this example contributes to formation of a bright image regardless of the shape of the apertures in the light valve.

Figure 13:
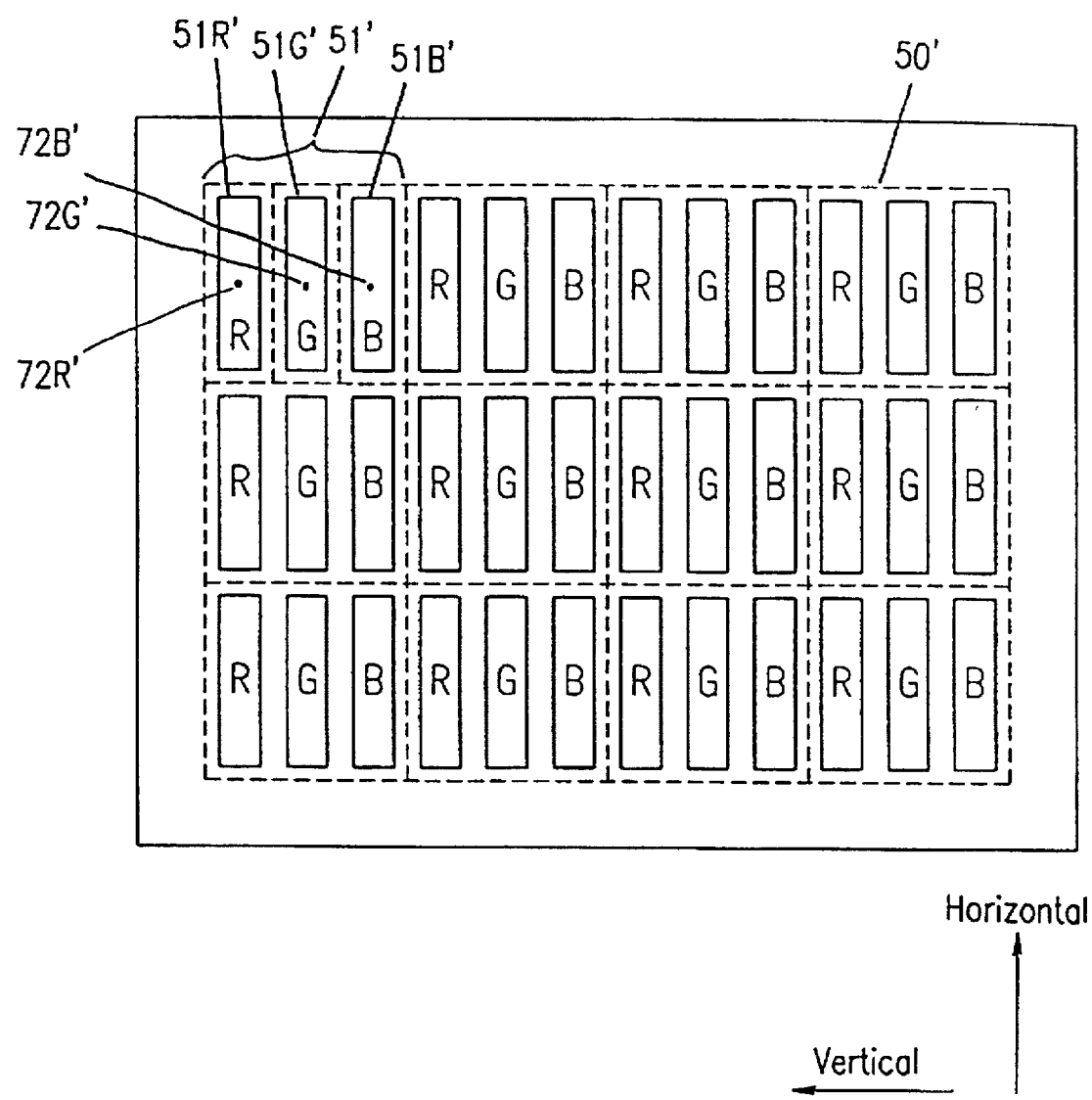
FIG. 13 is a schematic view illustrating another pixel structure of a liquid crystal panel illuminated by an illumination apparatus according to the present invention.

For a monitor of a personal computer, one white pixel area is defined as a square pixel area in general. In a direct-view color liquid crystal panel used in such a monitor, one square pixel area is divided equally into three generally rectangular areas, which are used respectively for red, green and blue. FIG. 13 shows such generally rectangular pixel areas. As is shown in FIG. 13, a color pixel unit 51' includes an aperture 51R' of a red pixel, an aperture 51G' of a green pixel, and an aperture 51B' of a blue pixel (referred to also as "red, green and blue pixel apertures 51R', 51G' and 51B'").

Figure 14:
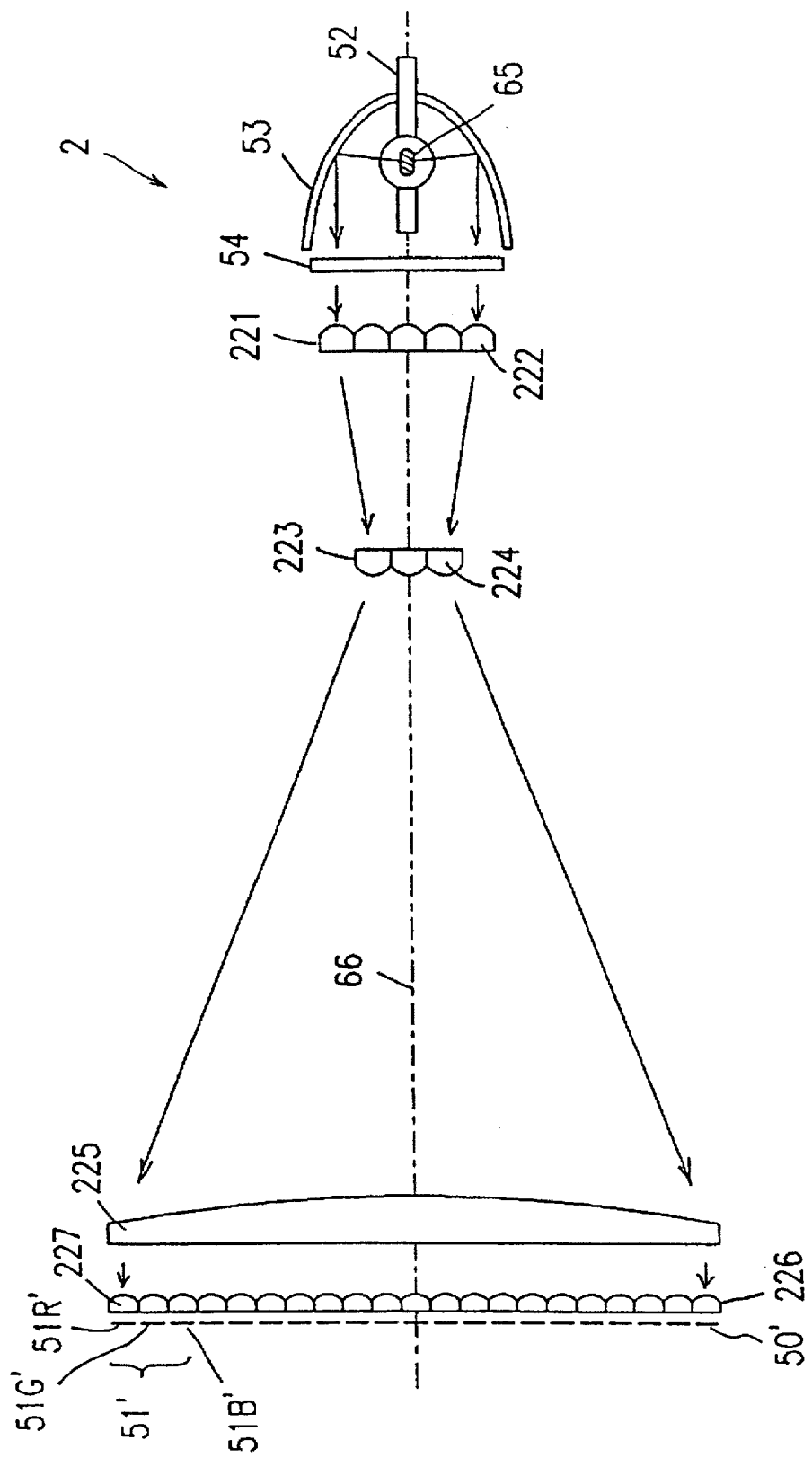
FIG. 14 is a schematic view of an illumination apparatus in a second example according to the present invention.

FIG. 14 is a schematic view of an illumination apparatus 2 in the second example according to the present invention. Identical elements as those in the first example will bear identical reference numerals therewith and descriptions thereof will be omitted. Similar elements as those in the first example will bear the same reference numerals with a prime. A light valve has an optical surface 50' having the pixel apertures 51R', 51G' and 51B' arranged as is shown in FIG. 13.

The metal halide lamp 52, the parabolic mirror 53, and the UV-IR cut filter 54 are identical with those in FIG. 1. Light emitted by the luminous element 65 is mostly condensed by the parabolic mirror 53 and travels parallel to the optical axis 66. The light then illuminates the optical surface 50' through a first lens array 221, a second lens array 223, a field lens 225, and a microlens array 226.

Figure 15:
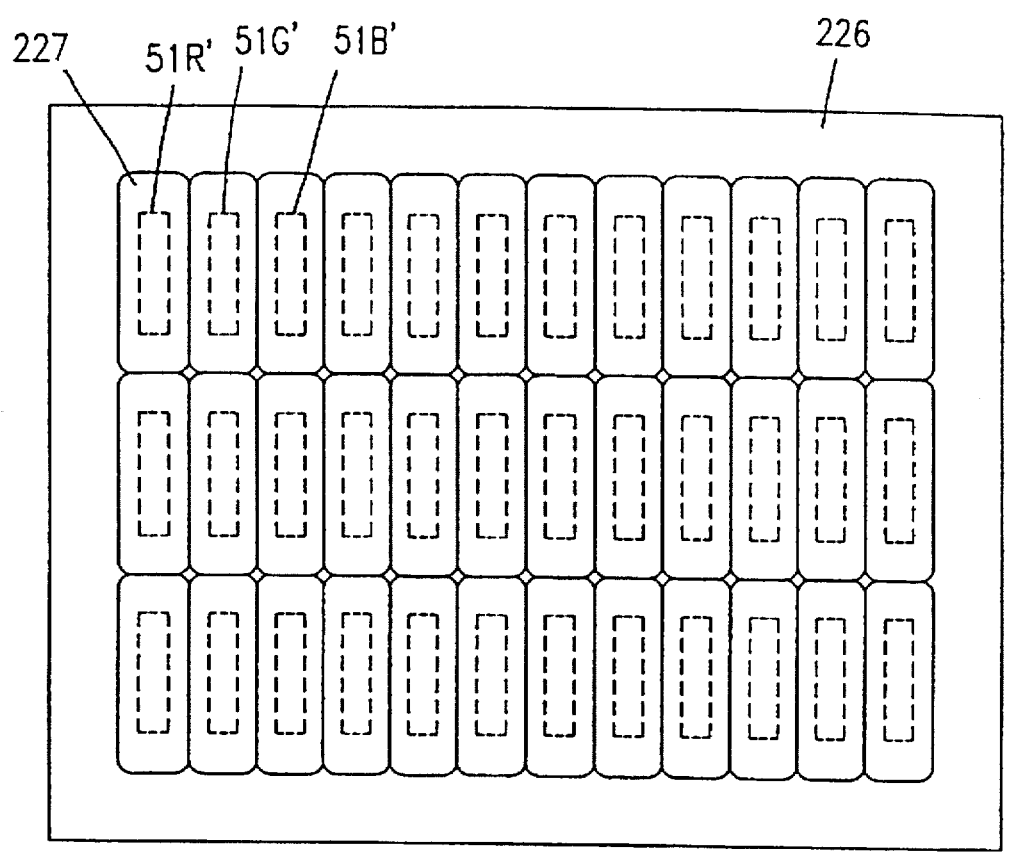
FIG. 15 is a schematic view illustrating a structure of a microlens array according to the present invention.

FIG. 15 shows an example of the microlens array 226. The microlens array 226 includes a plurality of microlenses 227 each having a lengthy rectangular aperture. The microlenses 227 are arranged two-dimensionally in correspondence with the pixel apertures of the light valve. The focal point of each of the microlenses 227 on the light-outgoing side is in the vicinity of the center of gravity of the corresponding pixel aperture.

Figure 16:
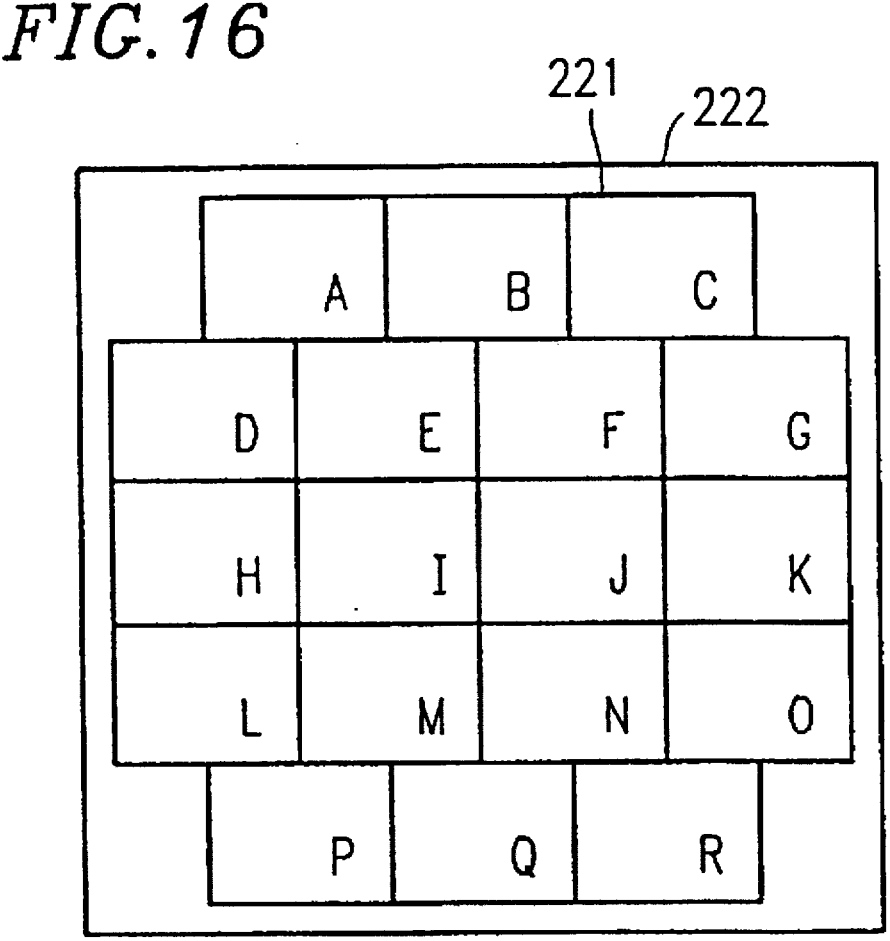
FIG. 16 is a schematic view illustrating a structure of a first lens array according to the present invention.

FIG. 16 shows an example of the first lens array 221 including a plurality of first lenses 222 arranged two-dimensionally.

Figure 17:
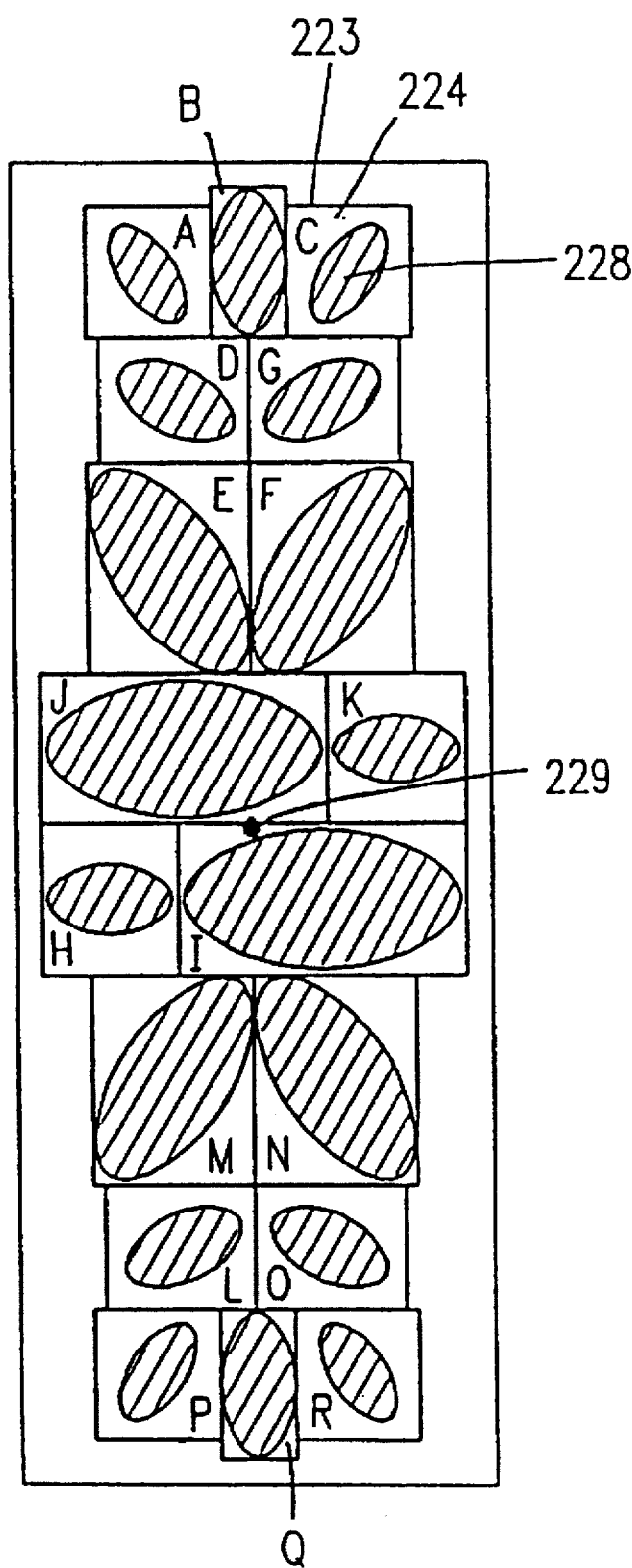
FIG. 17 is a schematic view illustrating a structure of a second lens array according to the present invention.

FIG. 17 shows an example of the second lens array 223 including second lenses 224 arranged two-dimensionally. The second lenses A through R correspond to the first lenses bearing the same letters in FIG. 16.

The first lens array 221 divides the light rays incident thereon into the same quantity of partial light rays as the quantity of the first lenses 222. Each first lens 222 converges the partial light ray passing therethrough onto an aperture of the corresponding second lens 224. The second lenses 224 each magnify the partial light ray incident thereon at an appropriate ratio so that the light rays are superimposed on the optical surface 50'. In other words, the second lenses 224 superimpose actual images of objects in the apertures of the first lenses 222 onto the optical surface 50' at an appropriate magnification ratio.

The field lens 225 causes the light rays from a point in the vicinity of the center of gravity of the aperture of each second lens 224 to travel parallel to the optical axis 66 to be incident on the microlens array 226. The microlenses 227 converge the light rays incident thereon to the pixel apertures 51R', 51G' and 51B'. Thus, an actual image of an object in the vicinity of the aperture of the second lens array 223 is formed in the pixel apertures 51R', 51G', and 51B'.

In order to allow the luminous flux passing through the pixel apertures 51R', 51G' and 51B' of the optical surface 50' to have a highest possible level, the first lens array 221 and the second lens array 223 are structured in the following manner.

The apertures of the first lenses 222 are conjugate with the optical surface 50' due to the second lens array 223. In the case where the optical surface 50' has a rectangular display plane having an aspect ratio of 4:3, the apertures of the first lenses 222 each have a rectangular shape having an aspect ratio of 4:3. In this structure, the cross section of the light ray illuminating the optical surface 50' can match the shape of the optical surface 50', thereby enhancing the light utilization efficiency. Further, since first lens array 221 receives the light rays having a circular cross section from the parabolic mirror 53, the first lenses 222 are arranged so as to be inscribed in such a circle. In such an arrangement, the light from the parabolic mirror 53 mostly passes through the aperture of the first lens array 221 and reaches the second lens array 223.

The second lens array 223 is conjugate with the pixel apertures 51R', 51G' and 51B' of the optical surface 50' due to the field lens 225 and the microlenses 227. Thus, the shape of the entire effective aperture of the second lens array 223 is the shape of the cross sections of the light rays reaching the pixel apertures 51R', 51G' and 51B'. The second lenses 224 are arranged so that the shape of the entire effective aperture of the second lens array 223 is proximate to the shape of the corresponding pixel apertures 51R', 51G' and 51B'.

In FIG. 17, the second lenses 224 are arranged to form together a rectangle having longer sides in the vertical direction than sides in the horizontal direction, which is proximate to the shape of the pixel apertures in this example. In order to form such a rectangular shape, the apertures of the second lenses 224 are provided in various shapes and sizes. In the apertures of the second lenses 224, actual images 228 (indicated by hatching) of the luminous element 65 are formed by the respective first lenses 222. The size of the actual images 228 in the second lenses 224 depends on the position of the respective first lenses 222. The second lenses 224 each have a sufficiently large aperture for the actual image 228.

In such an arrangement, the light ray having a circular cross section from the parabolic mirror 53 is divided into a plurality of partial light rays by the first lens array 221. The light rays are incident on the second lens array 223 in the state of being rearranged so that the shape of the cross section of the light ray from the entire effective aperture of the second lens array 223 substantially matches the shape of the pixel apertures. The second lens array 223 bends the optical paths of the partial light rays and magnifies the partial light lays at appropriate ratios to be superimposed on the optical surface 50'.

In order to facilitate the above-described travelling of the partial light rays, the first lenses 222 and the second lenses 224 are preferably decentered to adjust the direction of the optical axis 66 appropriately with respect to the apertures thereof. Since the light ray from each first lens 222 is converged to a point in the vicinity of the focal point thereof on the adjusted optical axis 66, the first lens 222 is decentered so that the focal point thereof substantially matches the center of the aperture of the corresponding second lens 224. The second lens 224 is decentered so that the light ray from the center of the aperture of the corresponding first lens 222 reaches a point in the vicinity of the center of gravity of the optical surface 50'.

The above-described structure of the first lens array 221 and the second lens array 223 increases the influence of the various aberrations and thus raises the optical loss when the first and second lenses 222 and 224 are decentered more than a relatively large extent. By forming at least one of the surfaces of each lens to be aspherical, generation of the various aberrations is restricted and thus the optical loss is reduced. Further, when the first and second lenses 222 and 224 are decentered more than a relatively large extent, the sag on the spherical surface increases to thicken the lens. Thus, the spherical surface becomes steeper. Such an inconvenience can be solved, namely, the above-described effect is achieved with a relatively thin lens array, by using as each lens, a fresnel lens using an aspheric surface as a base curved surface and decentering the fresnel lens with respect to the aperture thereof. A lens array formed of fresnel lenses is relatively easy to produce using a press molding or the like because the fresnel lens has a slowly curved spherical surface.

Figure 18:
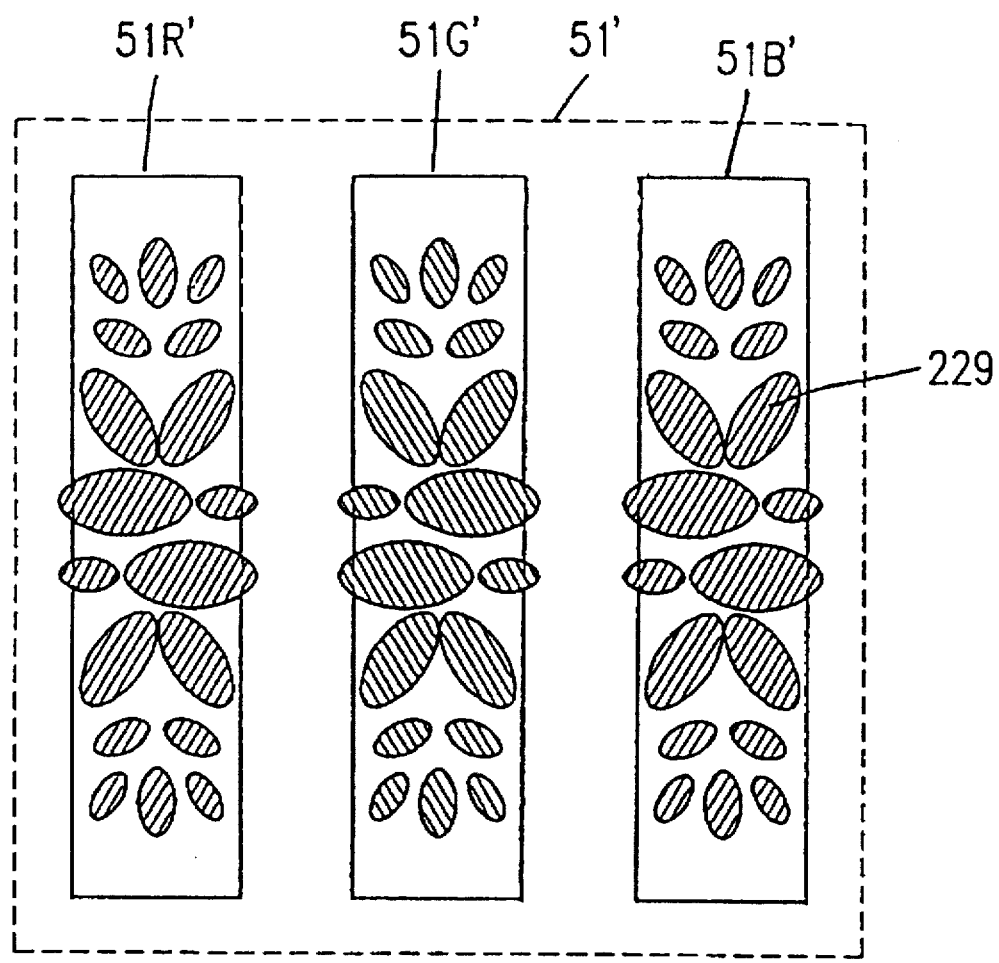
FIG. 18 is a schematic view illustrating another example of actual images of luminous surfaces formed in the vicinity of apertures of pixels by an illumination apparatus according to the present invention.

The actual images 228 shown in FIG. 17 act together as a luminous surface to illuminate the optical surface 50' entirely. Thus, as is shown in FIG. 18, actual images 229 of the luminous surface is formed in each of the pixel apertures 51R', 51G' and 51B'. The actual images 229 are substantially inscribed in the respective pixel apertures.

In the above-described structure of the illumination apparatus 2, the light is converged on the pixel aperture by the corresponding microlenses 227. Less light is shielded by the black matrix, resulting in improvement in the light utilization efficiency. Moreover, since the actual images of the luminous surface formed of the actual images 228 are inscribed in each of the pixel apertures regardless of the shape thereof, the luminous flux passing through the pixel apertures increases to enhance the brightness of the resultant image.

Even though the light ray emitted from the luminous element 65 is relatively non-uniform in brightness, such a light ray is divided by the first lens array 221 into a plurality of partial light rays each being relatively uniform in brightness and such partial light rays are magnified by the second lens array 223 to be superimposed on the optical surface 50'. Accordingly, the light illuminating the optical surface 50' is relatively uniform in brightness and color.

EXAMPLE 3

Figure 19:
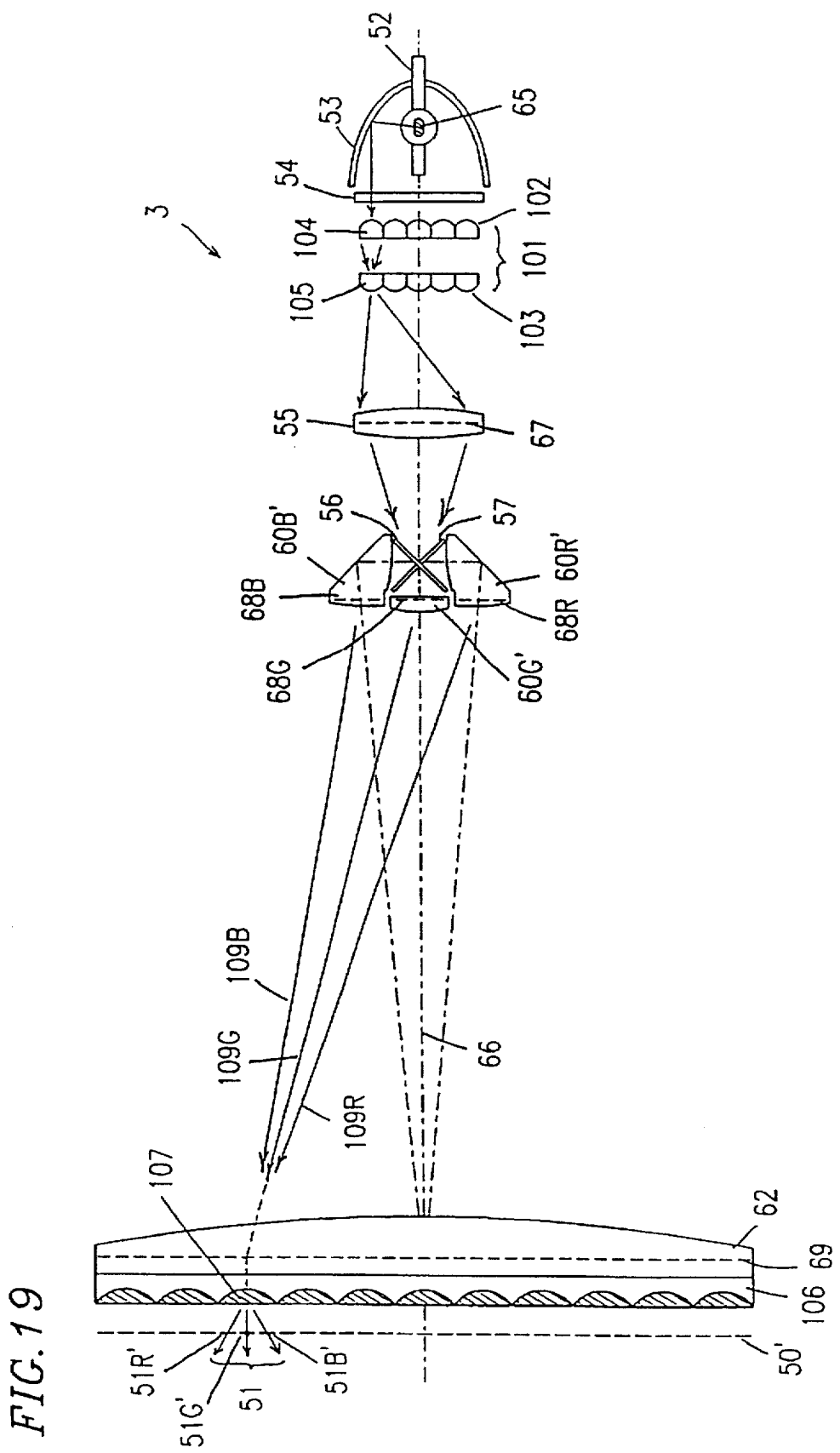
FIG. 19 is a schematic view of an illumination apparatus in a third example according to the present invention.

FIG. 19 is a schematic view of an illumination apparatus 3 in a third example according to the present invention. The illumination apparatus 3 is for illuminating the optical surface 50' with a still higher level of light utilization efficiency. Identical elements as those in the first and second examples will bear identical reference numerals therewith and descriptions thereof will be omitted. The illumination apparatus 3 includes a flat microlens array 106 having the same structure as shown in FIG. 10 in the vicinity of and on the light-incoming side of the optical surface 50'. The flat microlens array 106 acts in the same manner as the first microlens array 63 shown in FIG. 1 and has a structure shown in, for example, FIG. 20.

Figure 20:
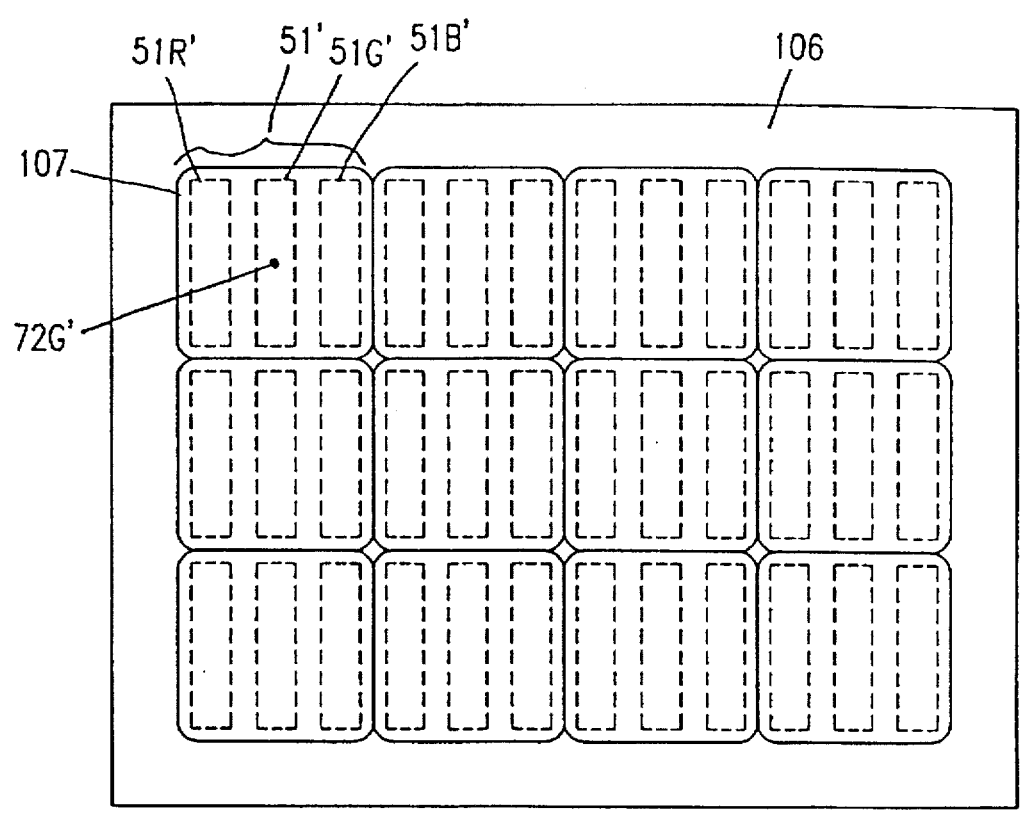
FIG. 20 is a schematic view illustrating a structure of another microlens array according to the present invention.

As is shown in FIG. 20, the flat microlens array 106 includes a plurality of microlenses 107. Each microlens 107 corresponds to one color pixel unit 51' and has a shape for covering a square area including the pixel apertures 51R', 51G' and 51B'. The optical axis of the microlens 107 passes through the center of gravity of the color pixel unit 51', which corresponds to the center of gravity 72G of the green pixel aperture 51G'.

Referring to FIG. 19, the metal halide lamp 52, the parabolic mirror 53, and the UV-IR cut filter 54 are identical with those in FIG. 1. The optical system from the luminous surface forming lens 55 to the microlens array 106 are identical to the optical system shown in FIG. 1 from the luminous surface forming lens 55 to the first microlens array 63.

The principal plane 67 of the luminous surface forming lens 55 acts as a prestage optical surface. The luminous surface forming lens 55 receives the light incident thereon and converges the light to form a luminous surface for illuminating the optical surface 50'. The dichroic mirrors 56 and 57 decompose the light (white light) incident thereon into light rays of red, green and blue to form red, green and blue luminous surfaces 68R, 68G and 68B. The relay lenses 60R', 60G' and 60B' are the same as in FIG. 12, and form actual images of the prestage optical surface 67 on the optical surface 50' at an appropriate magnification ratio.

The field lens 62 and the microlens array 106 form the actual images of the luminous surfaces 68R, 68G and 68B respectively of the three primary colors in the respective pixel apertures 51R', 51G' and 51B'. The elements in the optical system from the luminous surfaces 68R, 68G and 68B to the pixel apertures 51R', 51G' and 51B' are set to have appropriate magnification ratios and positioned appropriately for forming such actual images.

In the illumination apparatus 3 having the above-described structure, the white light emitted by the luminous element 65 is first decomposed into the light rays respectively of the three primary colors, and the light rays reach the respective pixel apertures 51R', 51G' and 51B'. Accordingly, the optical surface 50' need not have color filters and thus raises the light utilization efficiency.

Further, the illumination apparatus 3 includes a first lens array 102 and a second lens array 103 on the optical path from the parabolic mirror 53 to the prestage optical surface 67. The first lens array 102 and the second lens array 103 have a similar structure for the same purpose as the first and the second lens arrays 221 and 223 shown in FIG. 14.

Figure 21A:
FIGS. 21A, 21B and 21C are top, front and side views of another first lens array according to the present invention.
Figure 21B:
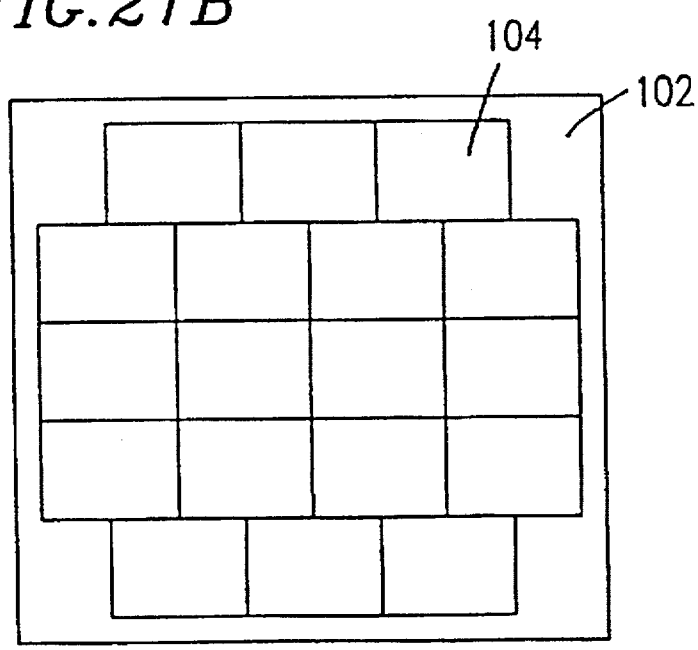
Figure 21C:
Figure 22A:
FIGS. 22A, 22B and 22C are top, front and side views of another second lens array according to the present invention.
Figure 22B:
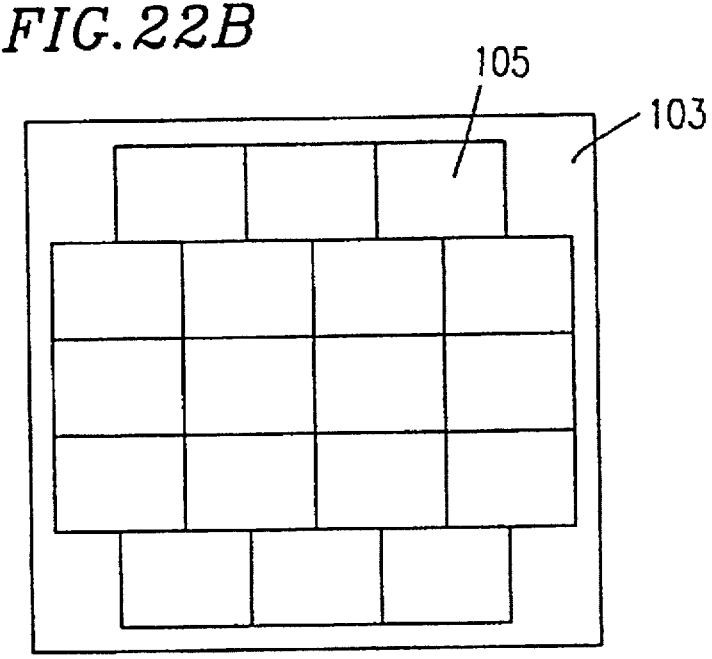
Figure 22C:

The first lens array 102 has a structure shown in, for example, FIGS. 21A, 21B and 21C. FIGS. 21A, 21B and 21C are a top view, a front view, and a side view of the first lens array 102, respectively. As is shown in FIGS. 21A, 21B and 21C, the first lens array 102 includes a plurality of first lenses 104 arranged two-dimensionally. Each first lens 104 has an aperture similar to the optical surface 50'. The second lens array 103 has a structure shown in, for example, FIGS. 22A, 22B and 22C. FIGS. 22A, 22B and 22C are a top view, a front view, and a side view of the second lens array 103, respectively. As is shown in FIGS. 22A, 22B and 22C, the second lens array 103 includes a plurality of second lenses 105 arranged two-dimensionally. Each second lens 105 has an aperture similar to the optical surface 50'. The second lenses 105 are provided in the same quantity as that of the first lenses 104 to correspond thereto, respectively. The first lens array 102 and the second lens array 103 illuminate the prestage optical surface 67 of the luminous surface forming lens 55, instead of the optical surface 50' as shown in FIG. 14. Since the prestage optical surface 67 and the optical surface 50' are conjugate with each other, the first and the second lens arrays 102 and 103 act in the same manner as those in FIG. 14.

The luminous surface forming lens 55 forms actual images of an object in the vicinity of the entire aperture of the second lens array 103 as the luminous surfaces 68R, 68G and 68B, and the microlenses 107 form actual images of the luminous surfaces 68R, 68G and 68B in the respective pixel apertures 51R', 51G' and 51B'. Thus, the illumination apparatus 3 in FIG. 19 has a function of decomposing white light into light rays respectively of the three primary colors and transmitting such light rays to the pixel apertures for the respective colors, in addition to the functions of the illumination apparatus 2 shown in FIG. 14. FIG. 23 shows an example of actual images 131R, 131G and 131B formed in the pixel apertures 51R', 51G' and 51B'.

In the case where the intensity of light from the luminous surfaces is sufficiently low to allow the actual images thereof to be substantially included in the respective pixel apertures, a sufficiently high level of light utilization efficiency can be provided even if the second lens array 103 has the aperture shown in FIG. 22B. If the pixel apertures are substantially square as shown in FIG. 2, the first and the second lens arrays 102 and 103 are suitable to form luminous surfaces having a shape proximate to the shape of the pixel apertures.

The first and the second lens arrays 102 and 103 can have the structures of the first and the second lens array 221 and 223 shown in FIG. 14. In other words, the second lens array 103 can have the entire aperture shown in FIG. 17 so that actual images of the luminous element 65 shown in FIG. 17 are formed. In such a structure, the actual images of the luminous element 65 as shown in FIG. 18 are formed in the respective pixel apertures 51R', 51G' and 51B' for the three primary colors as microscopic luminous surfaces. The actual images of different colors are clearly separated from one another. Further, due to the microlenses 107, the actual images can be formed to be substantially inscribed in the respective pixel apertures 51R', 51G' and 51B'. As a result, the luminous flux passing through the pixel apertures can increase to form a brighter image.

Referring to FIG. 19, the first lens array 102 and the second lens array 103 form a lens system 101. The lens system 101, which is used for decomposing, magnifying and superimposing light, uniformizes the brightness of the light illuminating the prestage optical surface 67. The uniformity in brightness is determined mainly by apparent expansion of the luminous surface seen from various points in a light receiving plane. In other words, when the brightness of the light illuminating the prestage optical surface 67 is significantly different area by area, the size of the actual images of the luminous surface formed by the microlens array 106 is significantly different in accordance with position of each microlens 107. When the uniformity in brightness of the light illuminating the prestage optical surface 67 is sufficiently high, the actual images on the microlenses 107 have the same size regardless of the position of the microlens 107.

As is described above, the illumination apparatus 3 increases the uniformity in brightness of the optical image on the prestage optical surface 67. Further, since the actual images respectively of the three primary colors are formed in the respective pixel apertures 51R', 51G' and 51B' by the microlenses 107, mixture of adjacent light rays can be restricted. Thus, the actual images respectively of the three primary colors formed in the equal-sized pixel apertures have the same size. Accordingly, all the pixels can be illuminated in a satisfactory manner with less influence of a positioning error of the optical system.

EXAMPLE 4

The optical system from the metal halide lamp 52 to the luminous surfaces 68R, 68G and 68B can be replaced by the structure shown in FIG. 24 to form an illumination apparatus 4 in a fourth example according to the present invention. In FIG. 24, the dichroic mirrors 56 and 57 are omitted although they exist in a space 156 enclosed by broken line. Among the three relay lenses, only the green relay lens 60G is shown. Identical elements as those in the third example will bear identical reference numerals therewith and descriptions thereof will be omitted. In FIG. 24, the direction of the longer side (X direction) of the pixels of the liquid crystal panel is parallel to the drawing paper and the direction of the shorter side (Y direction) of the pixels is perpendicular to the plane of the paper.

The illumination apparatus 4 includes light source units 151 and 152 for illuminating the prestage optical surface 67 of the luminous surface forming lens 55 in a superimposed state. Each of the light source units 151 and 152 includes a metal halide lamp 52, a parabolic mirror 53, a UV-IR cut filter 54, a first lens array 102, and a second lens array 103. The light source units 151 and 152 respectively have optical axes 153 and 154, which cross the optical axis 66 on the center of gravity 67C of the prestage optical surface 67.

In such a structure, two luminous surfaces are formed on a plane 155 proximate to the principal plane of the two second lens arrays 103. These two luminous surfaces are arranged linearly in the longer direction of the pixel apertures. The luminous surface forming lens 55 forms, for example, a green image of an actual image 68G of such luminous surfaces formed on the plane 155 in an aperture of the green relay lens 60G.

Figure 25:
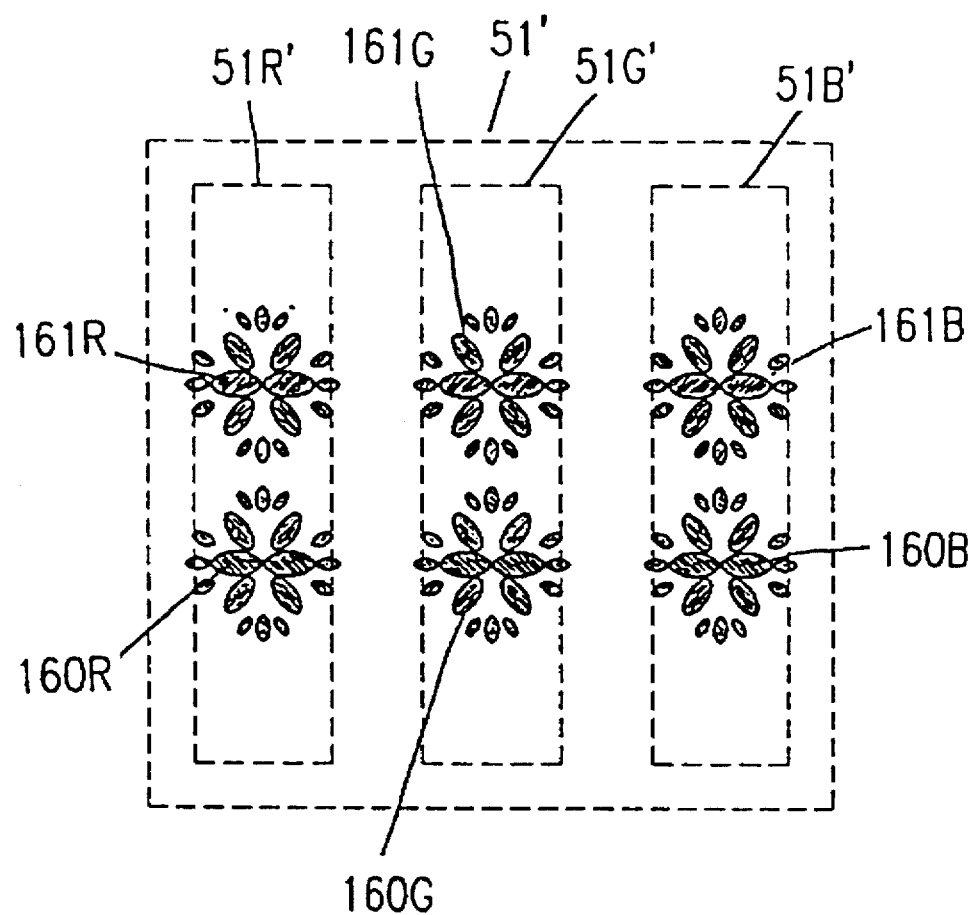
FIG. 25 is a schematic view illustrating still another example of actual images of luminous surfaces formed in the vicinity of apertures of pixels by an illumination apparatus according to the present invention.

FIG. 25 illustrates an example of actual images of the luminous surfaces formed in the pixel apertures 51R', 51G' and 51B' as microscopic luminous surfaces by the illumination apparatus 4. For example, red actual images 160R and 161R are formed in the red pixel aperture 51R' so as to form together a shape proximate to the generally rectangular red pixel aperture 51R'. Green and blue actual images 160G, 161G and 160B, 161B are formed in the same manner in the respective pixel apertures 51G' and 51B'.

In the illumination apparatus 4, two luminous surfaces are formed to be substantially inscribed in a rectangle having a longer side in the vertical direction. The light rays from such luminous surfaces pass through the pixel apertures 51R', 51G' and 51B' effectively. Thus, a high level of light utilization efficiency is realized to form a brighter image.

EXAMPLE 5

Figure 26:
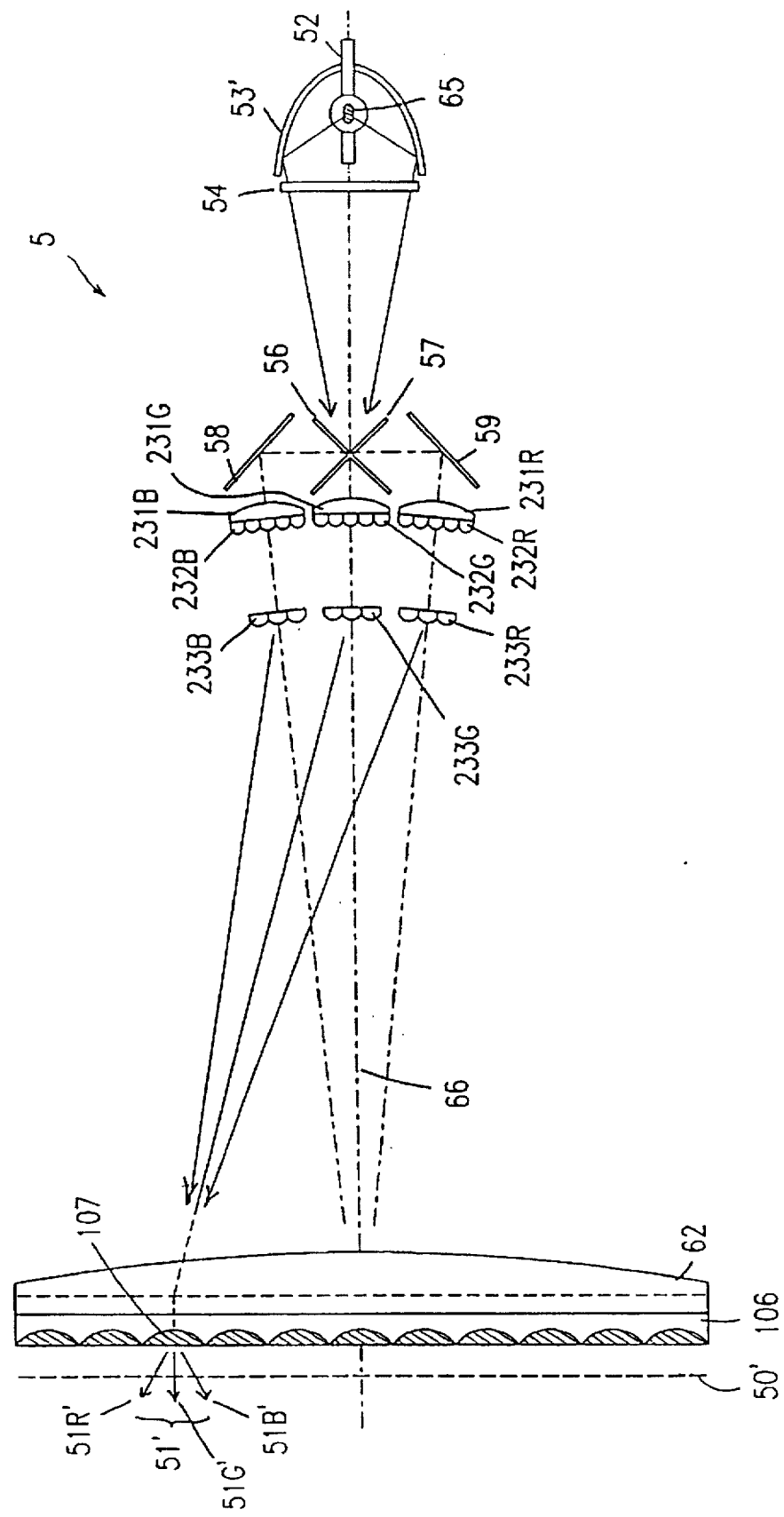
FIG. 26 is a schematic view of an illumination apparatus in a fifth example according to the present invention.

FIG. 26 is a schematic view of an illumination apparatus 5 in a fifth example according to the present invention. Identical elements as those in the previous examples will bear identical reference numerals therewith and descriptions thereof will be omitted. In FIG. 26, the field lens 62, the microlens array 106, the optical surface 50', and the color pixel unit 51' are the same as those shown in FIG. 19. The illumination apparatus 5 includes first lens array 232R, 232G and 232B and second lens array 233R, 233G and 233B. The white light emitted by the metal halide lamp 52 is decomposed into light rays respectively of the three primary colors by the dichroic mirrors 56 and 57. Each light ray transmits through the respective first lens array and the second lens array provided on the optical path thereof.

As an example, a green light ray is treated in the following manner. The light emitted by the luminous element 65 is mostly condensed by an ellipsoidal mirror 53' and converged to a point in the vicinity of the focal point of the ellipsoidal mirror 53' on the light-outgoing side. The first lens array 232G has the same structure as that of the first lens array 221 shown in FIG. 16 and located in the vicinity of the focal point of the ellipsoidal mirror 53' on the light-outgoing side. The light from the first lens array 232G reaches the second lens array 233G having the same structure as that of the second lens array 223 shown in FIG. 17. Actual images of the luminous element 65 formed in the vicinity of the second lens array 233G illuminate the optical surface 50' as a green luminous surface. The light rays from the second lens array 233G are treated in the same manner as described above referring to FIG. 19, thereby forming a green image on the pixel aperture 51G'.

A converging lens 231G is provided on the light-incoming side of the first lens array 232G. Converging lenses 231R and 231B are also provided on the light-incoming side of the first lens arrays 232R and 232B, respectively.

Figure 27:
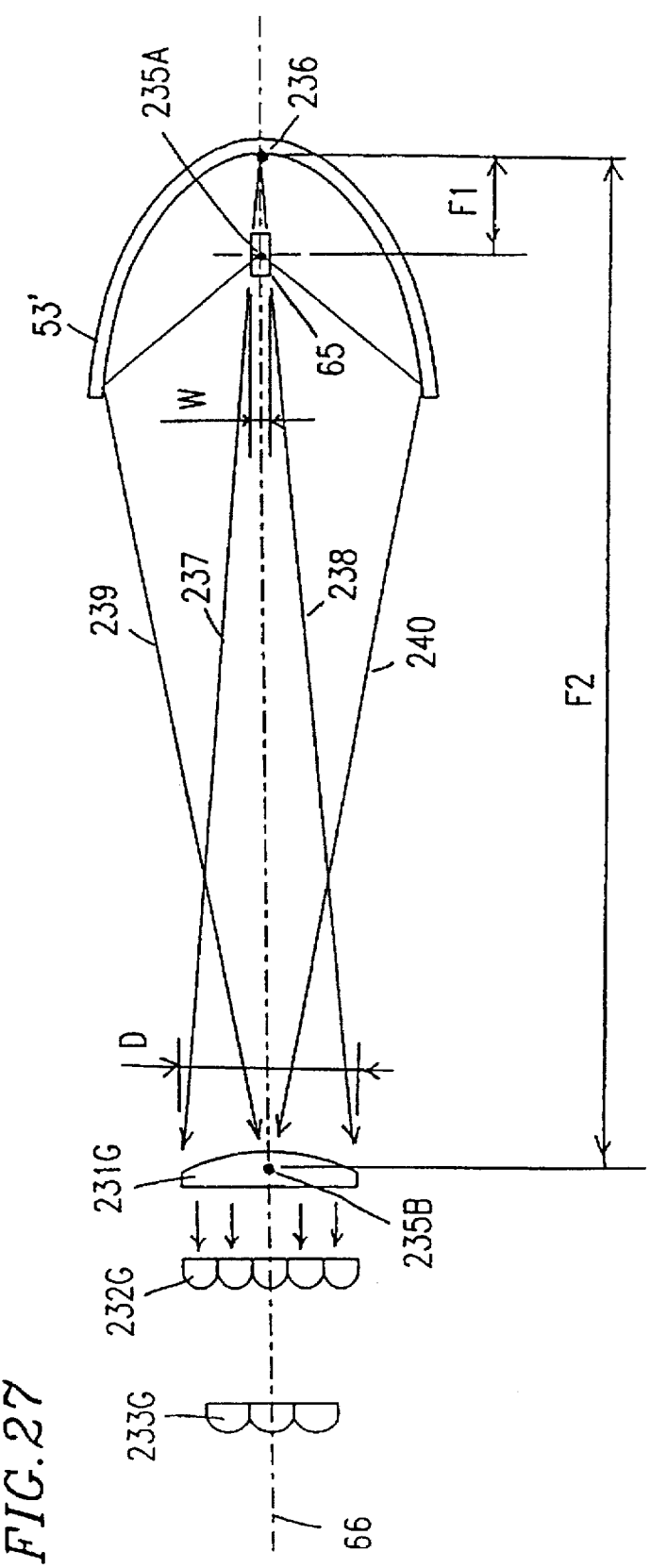
FIG. 27 is a schematic view illustrating the operation of the illumination apparatus shown in FIG. 26.
Figure 28A:
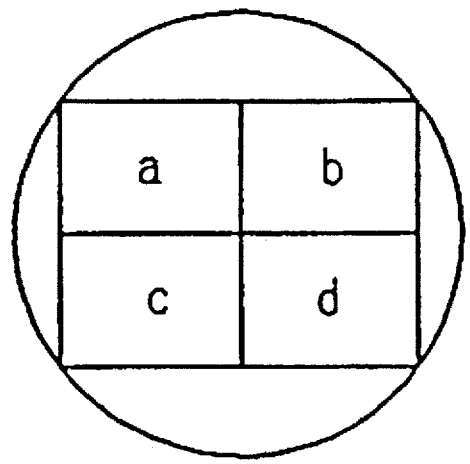
Figure 28B:
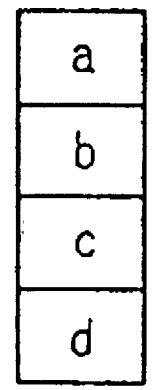
Figure 29A:
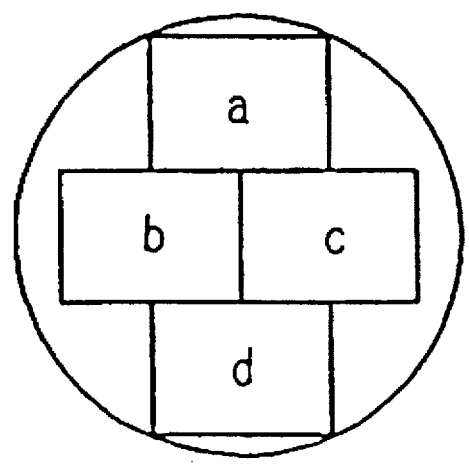
Figure 29B:
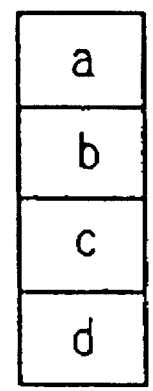
Figure 30A:
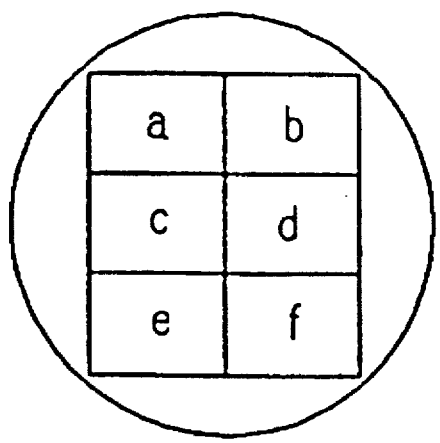
Figure 30B:
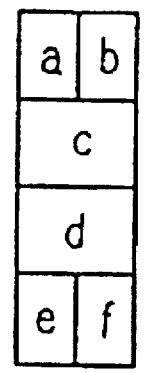
Figure 31A:
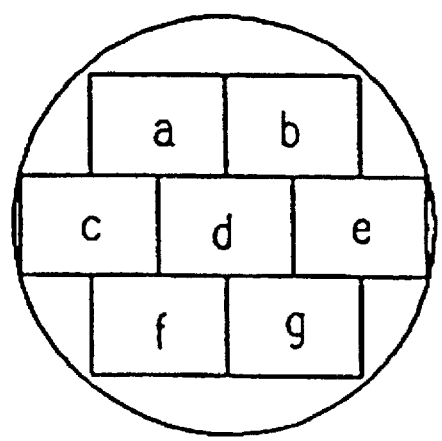
Figure 31B:
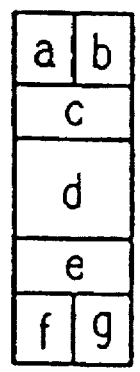
Figure 34A:
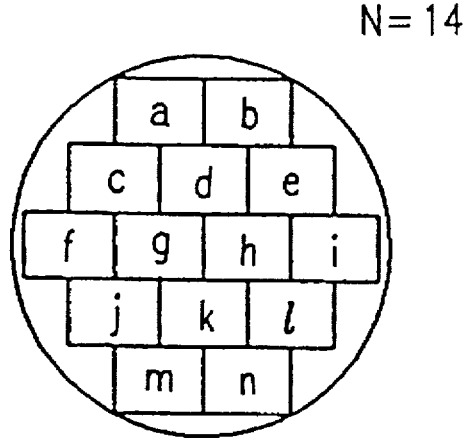
Figure 34B:
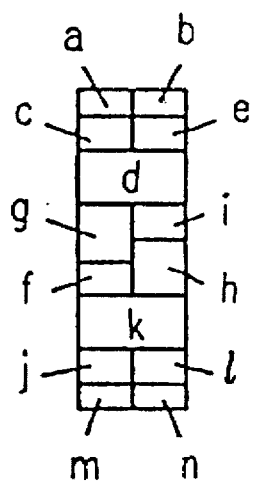
Figure 35A:
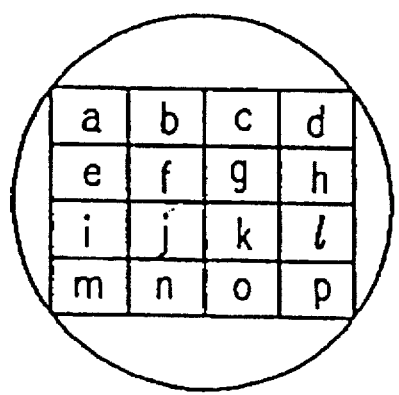
Figure 35B:
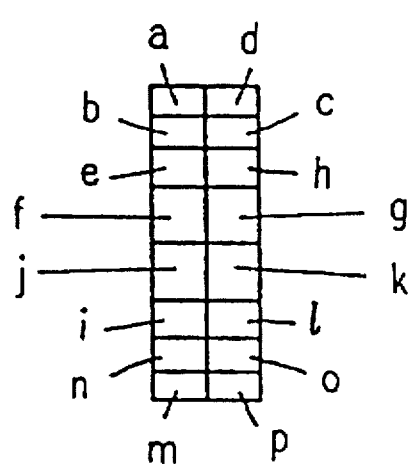
Figure 36A:
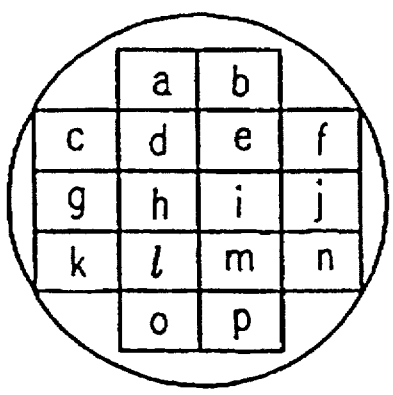
Figure 36B:
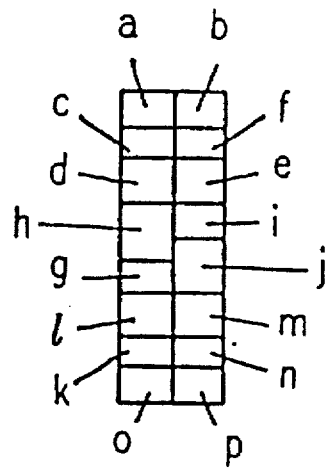
Figure 37A:
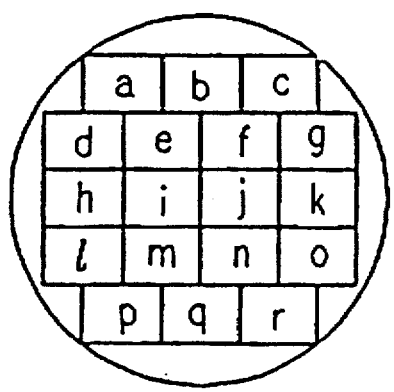
Figure 37B:
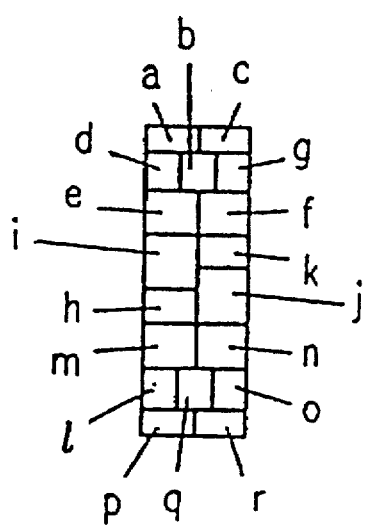
Figure 38A:
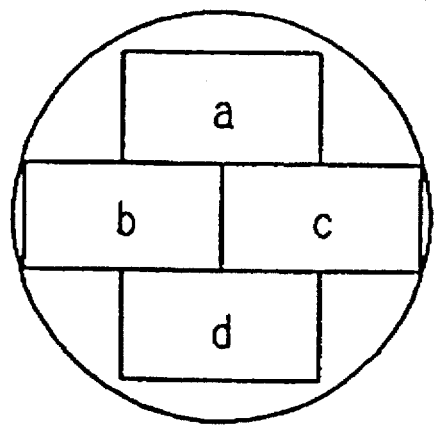
Figure 38B:
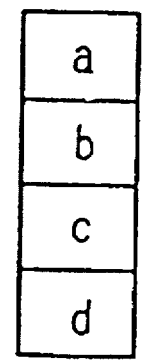
Figure 39A:
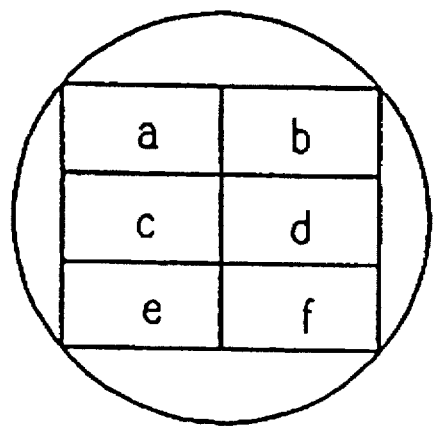
Figure 39B:
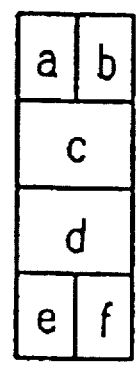
Figure 40A:
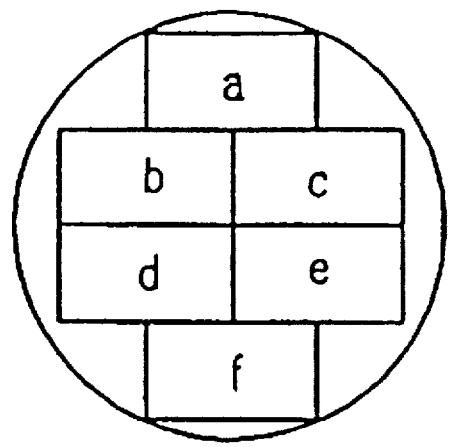
Figure 40B:
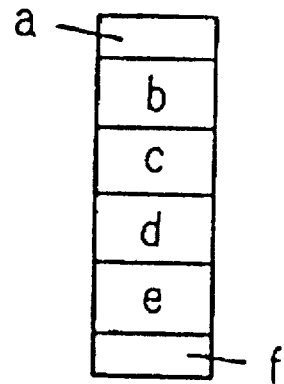
Figure 41A:
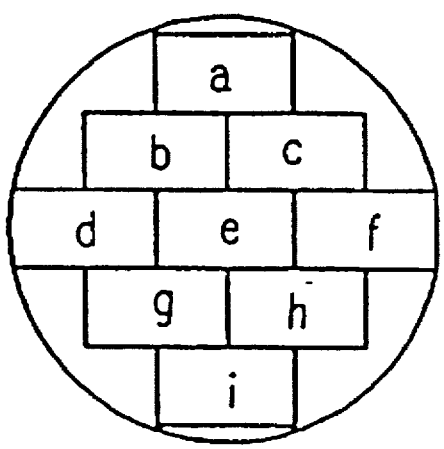
Figure 41B:
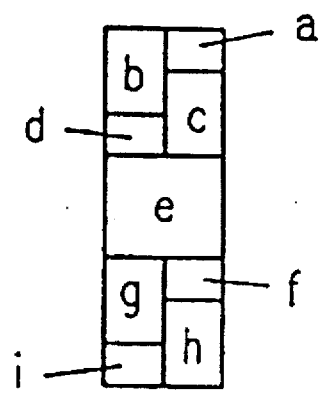
Figure 42A:
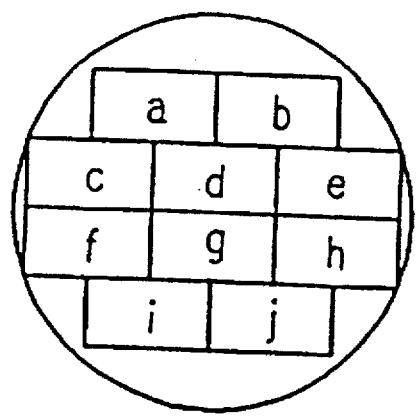
Figure 42B:
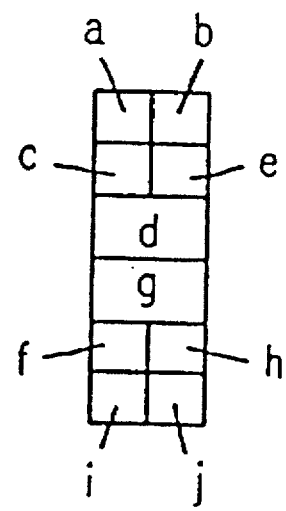
Figure 43A:
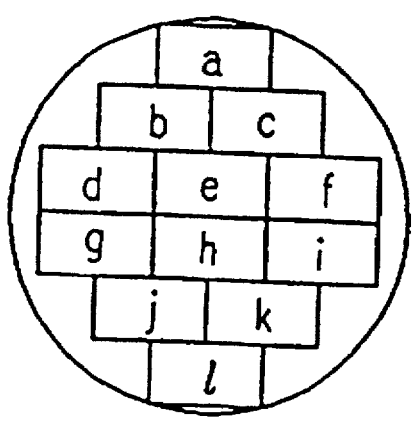
Figure 43B:
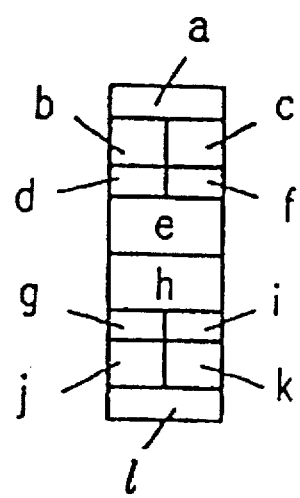
Figure 44A:
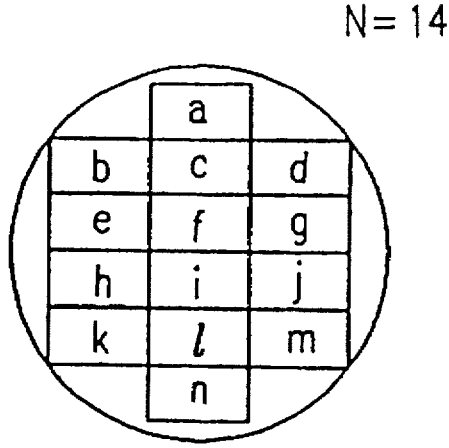
Figure 44B:
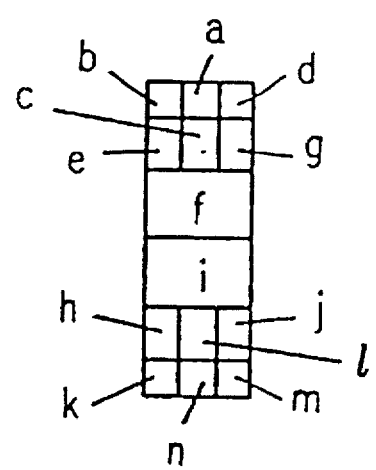
Figure 45A:
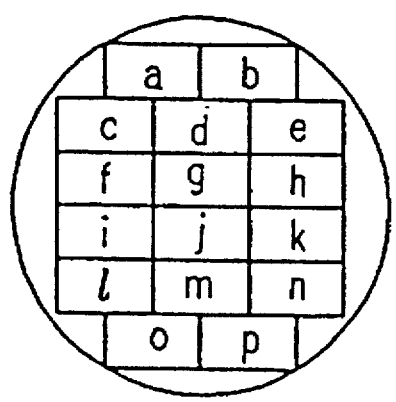
Figure 45B:
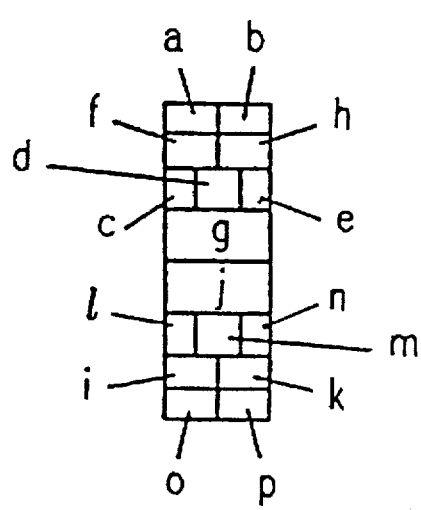
Figure 46A:
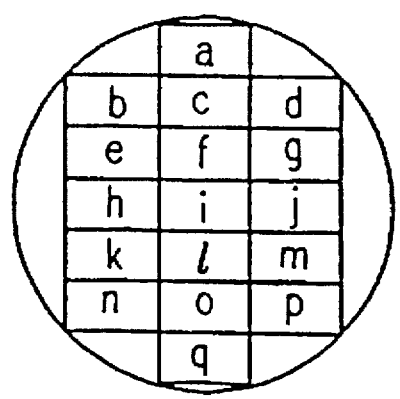
Figure 46B:
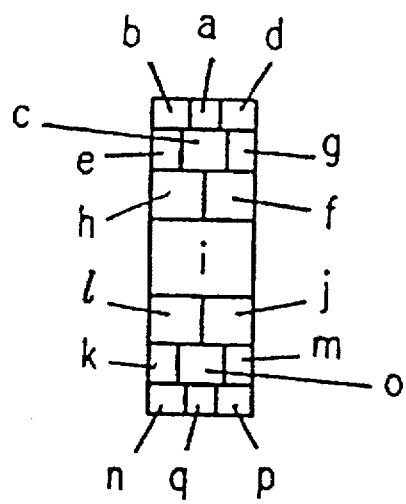
Figure 47A:
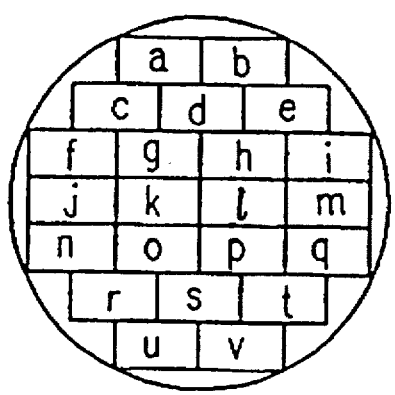
Figure 47B:
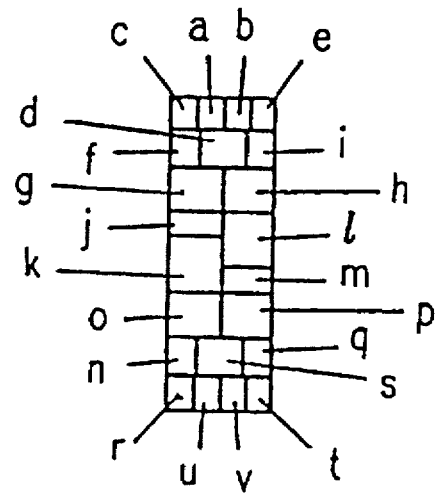

FIG. 27 shows the converging lens 231G and the related optical system, for example. Although the converging lens 231G and the first lens array 232G are illustrated as being separated from each other for simplicity, the lens 231G and the array 232G are closer in actuality.

The light emitted by the luminous element 65 is converged to a point in the vicinity of a focal point 235B of the ellipsoidal mirror 53' on the light-outgoing side. More strictly, the luminous element 65 is located to have a center of gravity thereof in the vicinity of the focal point 235a of the ellipsoidal mirror 53' included in the reflection area thereof, so that light rays 239 and 240 from the focal point 235A reach the focal point 235B of the ellipsoidal mirror 53' on the light-outgoing side.

The converging lens 231G is located to have a focal point on the light-incoming side in the vicinity of an apex 236 of the ellipsoidal mirror 53'. Seen from a point in the vicinity of the focal point 235B, the entire reflection surface of the ellipsoidal mirror 53' is a luminous surface. The center of gravity of the ellipsoidal mirror 53' is in the vicinity of the apex 236. Accordingly, the center of gravity of the outgoing pupil which reflects the light outgoing from the ellipsoidal mirror 53' can be regarded to be in the vicinity of the apex 236. Thus, the center of gravity of the outgoing pupil matches the focal point of the converging lens 231G on the light-incoming side. In such a structure, the chief ray of the light from the converging lens 231G can be incident on the first lens array 232G substantially parallel to the optical axis 66.

Preferably, the eccentricity of the ellipsoidal mirror 53' is appropriately selected to fulfill $D/W \approx F2/F1$ where W is the length of the luminous element 65 in the direction crossing the optical axis 66, D is the effective diameter of the converging lens 231G, F1 is the first focal distance of the converging lens 231G, and F2 is the second focal distance of the converging lens 231G. The first focal distance F1 is from the apex 236 to the focal point 235A, and the second focal distance is from the apex 236 to the focal point 235B. When the eccentricity of the ellipsoidal mirror 53' is selected to fulfill the above-described relationship, light rays 237 and 238 which are reflected at the apex 236 of the ellipsoidal mirror 53' reach the converging lens 231G within the effective diameter D thereof due to the length W of the luminous element 65. Thus, the light rays 237 and 238 are effectively used. The light rays 239 and 240 and light rays expanding in the vicinity of the light rays 239 and 240 are converged to a point in the vicinity of the center of the converging lens 231G. By setting the effective diameter D in consideration of the expansion of such light rays, the light condensed by the ellipsoidal mirror 53' mostly reaches the first lens array 232G effectively.

The red and blue light rays are treated in the same manner except that the optical paths of the red and blue light rays are bent by the dichroic mirrors 56 and 57. In the structure shown in FIG. 26, the optical paths of the red and blue light rays from the ellipsoidal mirror 53' to the first lens arrays 232R and 232B have a different length from that of the optical path from the ellipsoidal mirror 53' to the first lens array 232G. Under such circumstances, the relationship described with reference to FIG. 27 cannot be easily realized for the light rays of all the three primary colors. However, the above-described difference in length is negligibly small in the case where the second focal distance F2 is sufficiently long with respect to the expansion of the light around the focal point 235B. Utilizing this, the relationship described above with reference to FIG. 27 can be substantially realized for the light rays respectively of the three primary colors.

In the illumination apparatus 5, the optical paths from the ellipsoidal mirror 53' to the first lens arrays 232R, 232G and 232B can be increased without significantly reducing the light utilization efficiency. Accordingly, a sufficient space for the dichroic mirrors 56 and 57 and the flat mirrors 58 and 59 can be obtained.

In the illumination apparatus 5 shown in FIG. 26, the light emitted by the luminous element 65 is mostly guided to the optical surface 50', resulting in illumination which is highly uniform in brightness. Further, the light rays respectively of the three primary colors periodically form microscopic luminous surfaces which have a similar shape to that of the pixel apertures in a clearly separated manner. Thus, a very high level of light utilization efficiency is provided. Moreover, the microscopic luminous surfaces reflected in the pixel apertures 51R', 51G' and 51B' can be made uniform in size over the entire optical surface 50'.

(Display apparatus including any of the illumination apparatuses in the second through fifth examples)

A display apparatus including any of the illumination apparatuses 2 through 5 shown in FIGS. 14 through 27 displays a bright, high quality image. A liquid crystal panel having the above-described pixel structure can have the optical surface 50', for example. For displaying the optical image formed on the liquid crystal panel, any of the structure included in the display apparatuses 100, 200 and 300 shown in FIGS. 6, 7 and 8 can be used.

Exemplary preferable structures of the first lens array and the second lens array will be described, hereinafter.

For example, in the case where the optical surface is a monitor which displays an image represented by TV signals of the NTSC system and thus is rectangular with an aspect ratio of 4:3, the first lenses of the first lens array preferably have a rectangular aperture having an aspect ratio of 4:3 and are provided in the quantity of 4, 6, 7, 9, 10, 14, 16 or 18. Exemplary shapes of the aperture of the first lens array are shown in FIGS. 28A through 37A; and exemplary shapes of the aperture of the second lens array are shown in FIGS. 28B through 37B. In each of FIGS. 28A through 37A, a circle in which the entire aperture of the first lens array is inscribed is also illustrated.

For example, the optical surface is a rectangle having a longer side in the vertical direction. The letter "N" indicates the quantity of the lenses included in the lens array. Letters "a", "b", etc. are used to show the correspondence between the first lenses and the second lenses.

In the case where the optical surface is a monitor which displays an image represented by HDTV or wide TV signals and thus is rectangular with an aspect ratio of 16:9, the first lenses of the first lens array preferably have a rectangular aperture having an aspect ratio of 16:9 and are provided in the quantity of 4, 6, 9, 10, 12, 14, 16, 17 or 22. Exemplary shapes of the aperture of the first lens array are shown in FIGS. 38A through 47A; and exemplary shapes of the aperture of the second lens array are shown in FIGS. 38B through 47B. In each of FIGS. 38A through 47A, a circle in which the entire aperture of the first lens array is inscribed is also illustrated.

By using any of the above-mentioned quantities of the lenses, the light incident thereon can be used more effectively. The entire aperture of the first lens array in all the arrangements in FIGS. 28A through 47A is substantially inscribed in the shape of the cross section of the light ray incident thereon. Thus, the light can be utilized effectively with little loss. When a larger quantity of lenses are used, the designing procedure of the lens array becomes too complicated and makes the production difficult. Accordingly, the effect of using the lens arrays cannot be obtained sufficiently.

EXAMPLE 6

Figure 48:
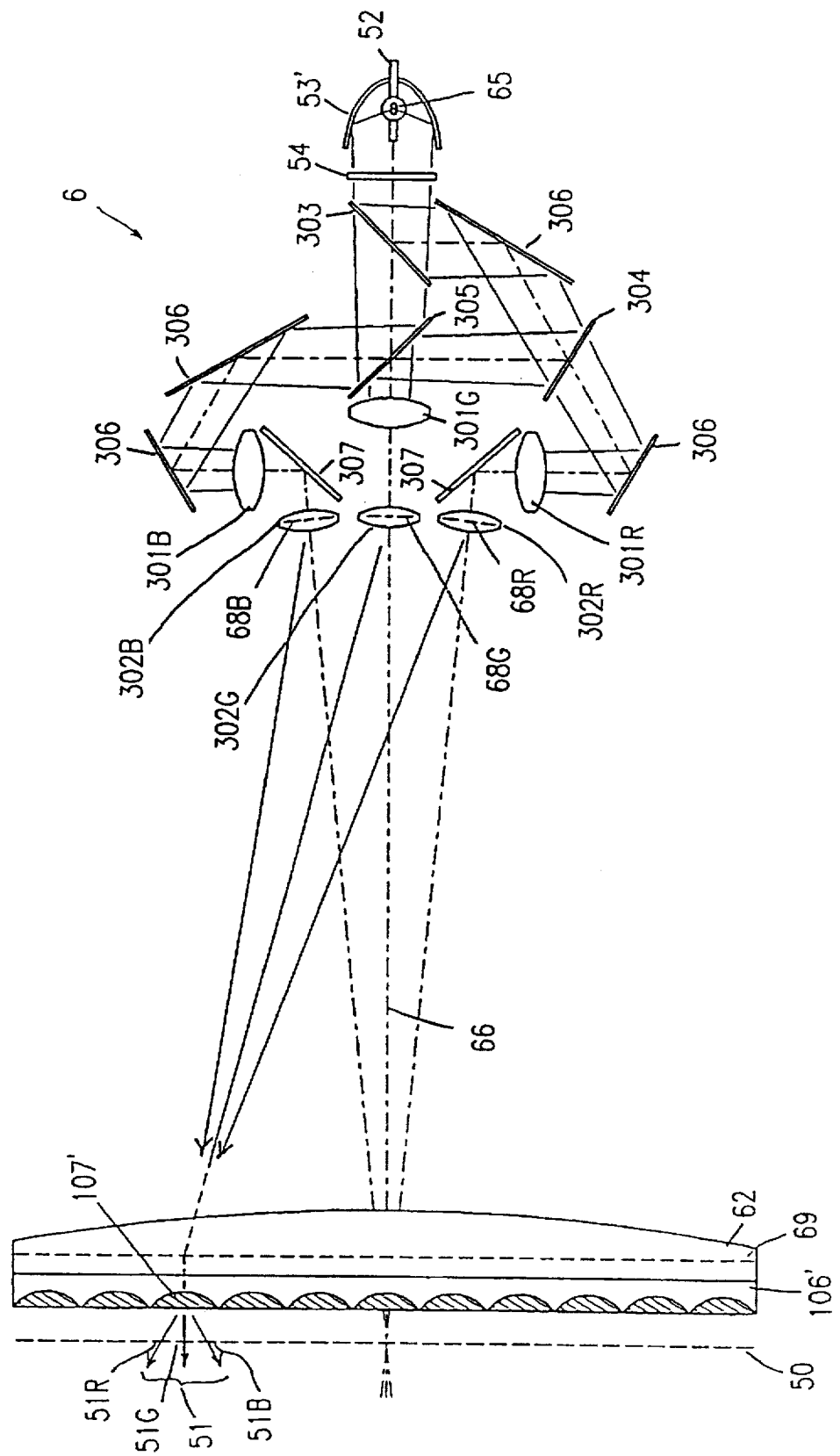
FIG. 48 is a schematic view of an illumination apparatus in a sixth example according to the present invention.

With reference to FIG. 48, an illumination apparatus 6 in a sixth example according to the present invention will be described. Identical elements as those in the previous examples will bear identical reference numerals therewith and descriptions thereof will be omitted. The illumination apparatus 6 is used for illuminating, for example, a color-display liquid crystal panel having the pixel structure shown in FIG. 2.

As is shown in FIG. 48, the illumination apparatus 6 includes a field lens 62 and a microlens array 106'. The microlens array 106' includes a plurality of hexagonal microlenses 107' arranged two-dimensionally in correspondence with the color pixel units 51 in the same manner as shown in FIG. 3. The microlens array 106' is located so that the focal points of the microlenses 107' on the light-outgoing side are in the vicinity of the respective pixel apertures.

The white light emitted by the luminous element 65 of the metal halide lamp 52 is mostly condensed by the ellipsoidal mirror 53' and converged to a point in the vicinity of the focal point of the ellipsoidal mirror 53' on the light-outgoing side. The UV-IR cut filter 54 is used for cutting unnecessary infrared radiation and ultraviolet radiation. Dichroic mirrors 303 and 304 and flat mirrors 305, 306 and 307 are appropriately located on the optical path from the ellipsoidal mirror 53' to the focal point thereof on the light-outgoing side for decomposing the white light into light rays respectively of the three primary colors.

For example, the dichroic mirror 303 reflects red and green light rays and allows blue light rays to transmit therethrough. The dichroic mirror 304 reflects green light rays and allows red light rays to transmit therethrough. The flat mirror 305 is reflective on two surfaces thereof, and the surface of the flat mirror 305 opposed to the metal halide lamp 52 bends the optical path of the blue light ray incident thereon at 90 degrees. The other surface of the flat mirror 305 bends the optical path of the green light ray incident thereon at 90 degrees. The four flat mirrors 306 reflect the light rays incident thereon at an appropriate angle.

On the optical paths of the light rays respectively of the three primary colors obtained in the above-described manner, first lenses 301R, 301G and 301B and second lenses 302R, 302G and 302B are located. The second lenses 302R, 302G and 302B are provided in the same quantity as that of the first lenses 301R, 301G and 301B to correspond thereto. On the optical paths of the red and blue light rays, two flat mirrors 307 are located. The first lenses 301R, 301G and 301B are located in the vicinity of the focal point of the ellipsoidal mirror 53' on the light-outgoing side, and actual images of the luminous element 65 are formed in apertures thereof. The first lenses 301R, 301G and 301B converge the light rays incident thereon to form luminous surfaces 68R, 68G and 68B in apertures of the corresponding second lenses 302R, 302G and 302B. For this purpose, each of the first lenses 301R, 301G and 301B forms an actual image of an object in the vicinity of the apex of the ellipsoidal mirror 53' in an area in the vicinity of the aperture of the corresponding second lens.

The second lenses 302R, 302G and 302B form actual images of objects in the vicinity of the corresponding first lenses 301R, 301G and 301B in an area in the vicinity of the principal plane 69 of the field' lens 62 at an appropriate magnification ratio. The appropriate magnification ratio refers to a ratio by which the actual images of the luminous element 65 formed in the apertures of the first lenses 301R, 301G and 301B sufficiently cover a necessary area of the optical surface 50. By the field lens 62, the light ray from the center of gravity of the green luminous surface 68G travels parallel to the optical axis 66. The light rays from the center of gravity of the red luminous surface 68R travel parallel to one another at a prescribed angle with respect to the optical axis 66. The light rays from the center of gravity of the blue luminous surface 68B also travel parallel to one another at a prescribed angle with respect to the optical axis 66. The light rays respectively of the three primary colors reach the microlens array 106'.

The microlens array 106' forms actual images of the luminous surfaces 68R, 68G and 68B in the vicinity of the corresponding pixel apertures 51R, 51G and 51B. The actual images respectively of the three primary colors are clearly separated from one another. At this point, the actual images of the luminous surfaces 68R, 68G and 68B are substantially inscribed in the pixel apertures 51R, 51G and 51B as is shown in FIG. 9.

As is described above, the illumination apparatus 5, which decompose the white light into light rays respectively of the three primary colors and guides the light rays to the pixel apertures for the corresponding colors, realize illumination at a high level of light utilization efficiency.

The illumination apparatus 5 operates in the following manner. The light emitted by the luminous element 65 is mostly condensed by the ellipsoidal mirror 53' and converged in the vicinity of the focal point thereof on the light-outgoing side. The converged light rays are mostly incident on the first lenses 301R, 301G and 301B located in the vicinity of the focal point of the ellipsoidal mirror 53'. The light rays are then converged to the apertures of the second lenses 302R, 302G and 302B to form the luminous surfaces 68R, 68G and 68B. The light rays from the luminous surfaces 68R, 68G and 68B are mostly guided to the field lens 62 effectively by the second lenses 302R, 302G and 302B.

The optical paths of the red, green and blue light rays from the ellipsoidal mirror 53' to the field lens 62 are equal to one another. In detail, the optical paths from the ellipsoidal mirror 53' to the first lenses 301R, 301G and 301B are equal due to the appropriate arrangement of the dichroic mirrors 303 and 304 and the flat mirrors 305 through 307. Due to the structure of the illumination apparatus 6, the optical paths from the first lenses 301R, 301G and 301B to the second lenses 302R, 302G and 302B are equal; and the optical paths from the second lenses 302R, 302G and 302B to the field lens 62 are also equal.

In the above-described structure, the light emitted by the luminous element 65 can mostly be guided to the optical surface 50 to provide a high level of light utilization efficiency in the case where the apertures of the first and the second lenses are larger than the effective cross section of the light rays incident thereon. Since the optical paths of the light rays respectively of the three primary colors are equal, a high level of light utilization efficiency can be realized for all the three primary colors. Moreover, such equal optical paths uniformize the brightness of the cross sections of the light rays respectively of the three primary colors on the optical surface 50, thus to restrict the non-uniformity in color.

EXAMPLE 7

Figure 49:
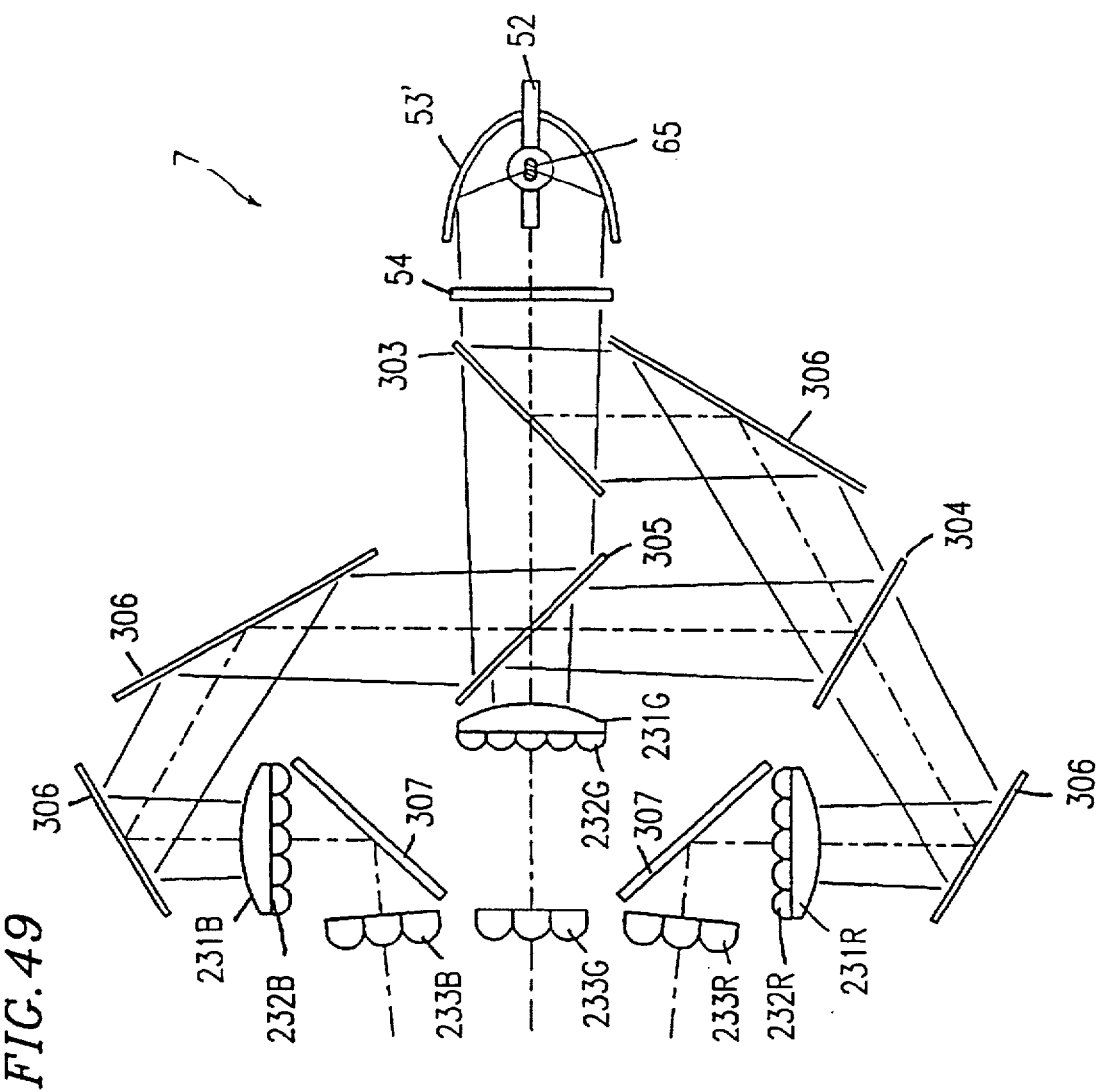
FIG. 49 is a partial schematic view of an illumination apparatus in a seventh example according to the present invention.

The illumination apparatus 6 shown in FIG. 48 can be structured for illuminating the color-display liquid crystal panel having the pixel structure shown in FIG. 13. In such a case, the optical system from the luminous element 65 to the luminous surfaces 68R, 68G and 68B is preferably structured as is shown in FIG. 49. An illumination apparatus including the optical system shown in FIG. 49 will be described as an illumination apparatus 7. Identical elements as those in the previous examples will bear identical reference numerals therewith and descriptions thereof will be omitted.

In FIG. 49, the dichroic mirrors 303 and 304, and the flat mirrors 305, 306 and 307 are the same as those in FIG. 48. The illumination apparatus 7 includes converging lenses 231R, 231G and 231B and first lens arrays 232R, 232G and 232B are used in lieu of the first lenses 301R, 301G and 301B. Second lens arrays 233R, 233G and 233B are used in lieu of the second lenses 302R, 302G and 302B. The converging lenses 231R, 231G and 231B, and the first lens arrays 232R, 232G and 232B, and the second lens arrays 233R, 233G and 233B are the same as those shown in FIG. 26. For example, the first lens array 232R has apertures shown in FIG. 16, and the second lens array 233R has apertures shown in FIG. 17. The ellipsoidal mirror 53' and the converging lens 231R are structured so as to fulfill the relationship described with reference to FIG. 27, namely, $D/W \approx F2/F1$ where W is the length of the luminous element 65 in the direction crossing the optical axis 66, D is the effective diameter of the converging lens 231R, F1 is the first focal distance of the converging lens 231R, and F2 is the second focal distance of the converging lens 231R.

In the above-described structure, the luminous surfaces having a rectangular effective shape which is longer in the vertical side are formed in the vicinity of the apertures of the second lens arrays 233R, 233G and 233B, and actual images of the luminous surfaces respectively of the three primary colors are formed in the respective pixel apertures 51R, 51G and 51B as microscopic luminous surfaces in a separated manner as is shown in FIG. 18.

Thus, the illumination apparatus 7 can enjoy the effects of the illumination apparatuses described in the previous examples combined to realize illumination having a high level of uniformity in brightness at a much improved level of light utilization efficiency. Further, the actual image of the luminous surfaces formed in the apertures of the pixel apertures are substantially inscribed therein. Thus, a display apparatus including such an illumination apparatus forms a bright image.

EXAMPLE 8

Figure 50:
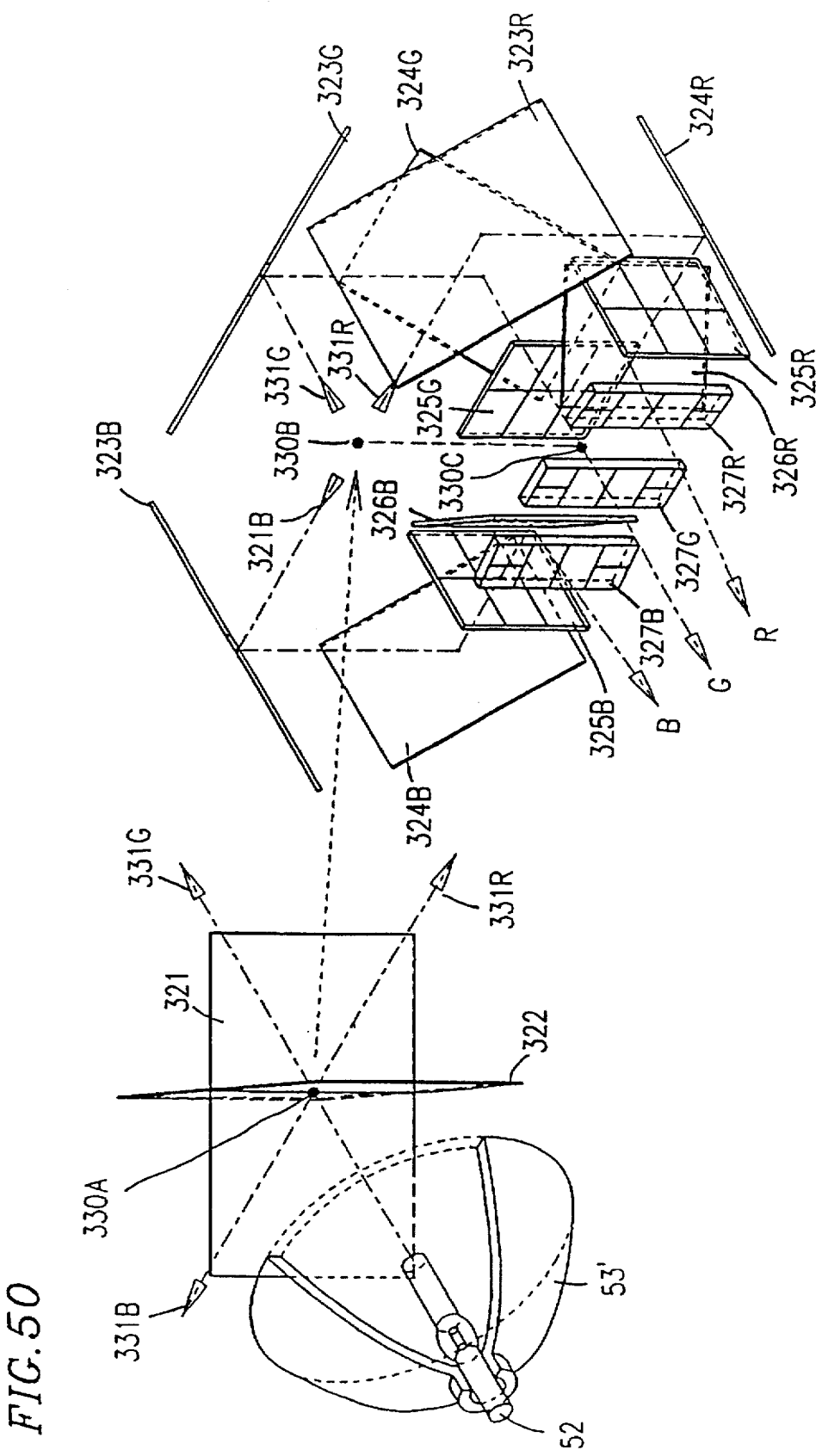
FIG. 50 is a partial schematic view of an illumination apparatus in an eighth example according to the present invention.

The illumination apparatuses 6 and 7 shown in FIGS. 48 and 49 each can have the structure shown in FIG. 50 to form a compact optical system. An illumination apparatus including the optical system shown in FIG. 50 will be described as the illumination apparatus 8. Identical elements as those in the previous examples will bear identical reference numerals therewith and descriptions thereof will be omitted. The illumination apparatus 8 is used for illuminating a color-display liquid crystal panel having the pixel structure shown in FIG. 13.

FIG. 50 is a perspective view of a light source of the illumination apparatus seen from the above. The light source includes a metal halide lamp 52, an ellipsoidal mirror 53', a dichroic mirror 321 for reflecting red light, a dichroic mirror 322 for reflecting blue light, first flat mirrors 323R, 323G and 323B, second flat mirrors 324R, 324G and 324B, first fresnel lens arrays 325R, 325G and 325B, third flat mirrors 326R and 326B, and second fresnel lens arrays 327R, 327G and 327B. In FIG. 50, the ellipsoidal mirror 53', the dichroic mirrors 321 and 322, and the elements in the vicinity thereof are illustrated separately for simplicity. In actuality, point 330A is at point 330B.

The dichroic mirrors 321 and 322 are provided in the state of crossing each other in the shape of letter "X" and decompose white light into light rays respectively of the three primary colors. A red light ray has an optical axis 331R, a green light ray has an optical axis 331G, and a blue light ray has an optical axis 331B. The optical paths of the light rays are bent by the respective first flat mirrors 323R, 323G and 323B at 90 degrees to travel vertically downward. The optical paths of the light rays are then bent again by the second flat mirrors 324R, 324G and 324B to travel on the same plane horizontally. The light rays cross one another at point 330C which is vertically below the point 330B. The optical paths of the red and blue light rays are further bent by the third flat mirrors 326R and 326B to travel substantially parallel to the green light ray. More strictly, the third flat mirrors 326R and 326B are positioned so that the optical axes 331R, 331G and 331B of the light rays cross one another at the center of gravity of the effective area of the optical surface to be illuminated.

In the above-described structure, the lengths of the optical paths from the ellipsoidal mirror 53' to the first fresnel lens arrays 325R, 325G and 325B can be individually controlled without affecting the other optical paths. In detail, the lengths of such optical paths can be longer or shorter by controlling the length of the optical path between the first flat mirror and the second flat mirror. As a result, the optical paths of the light rays respectively of the three primary colors can be uniformized more easily than the structure shown in FIG. 48, and such an optical system is more compact.

Figure 51:
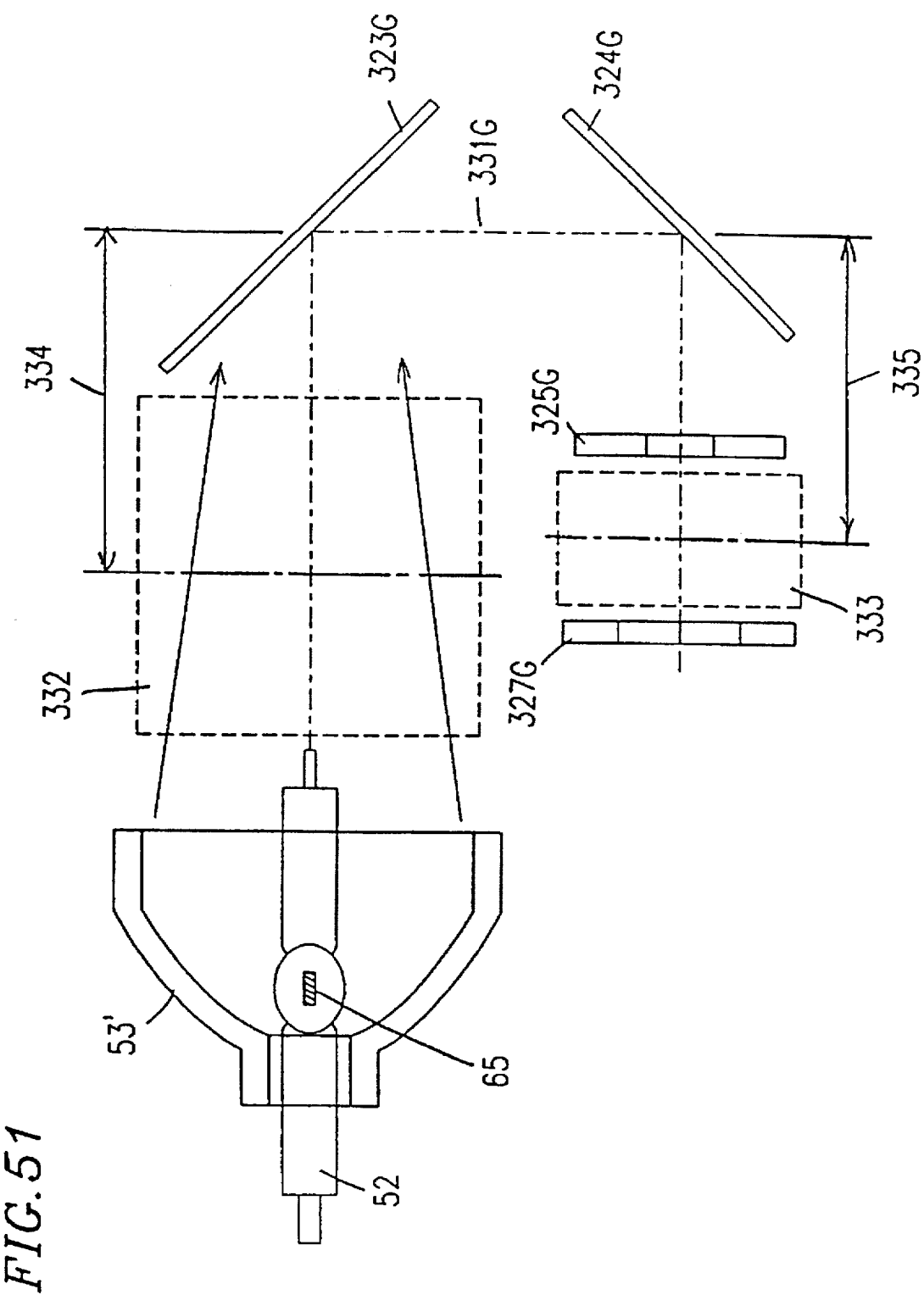
FIG. 51 is a schematic view illustrating the operation of the illumination apparatus shown in FIG. 50.

FIG. 51 shows elements of the optical system provided along the optical axis 331G of the green light ray. The dichroic mirrors 321 and 322 are omitted although they exist in a space 332 enclosed by a broken line. The red and blue light rays are treated by the same elements except that the optical paths of the red and blue light rays are bent by the dichroic mirrors 321 and 322 in the space 332 at 90 degrees and bent again at about 90 degrees by the third flat mirrors 326R and 326B in a space 333 enclosed by the broken line. Even though the lengths of the optical paths indicated by reference numerals 334 and 335 are different color by color as is shown in FIG. 50, the lengths of the optical paths from the ellipsoidal mirror 53' to the first fresnel lens array 325R, 325G and 325B are equal.

Figure 52:
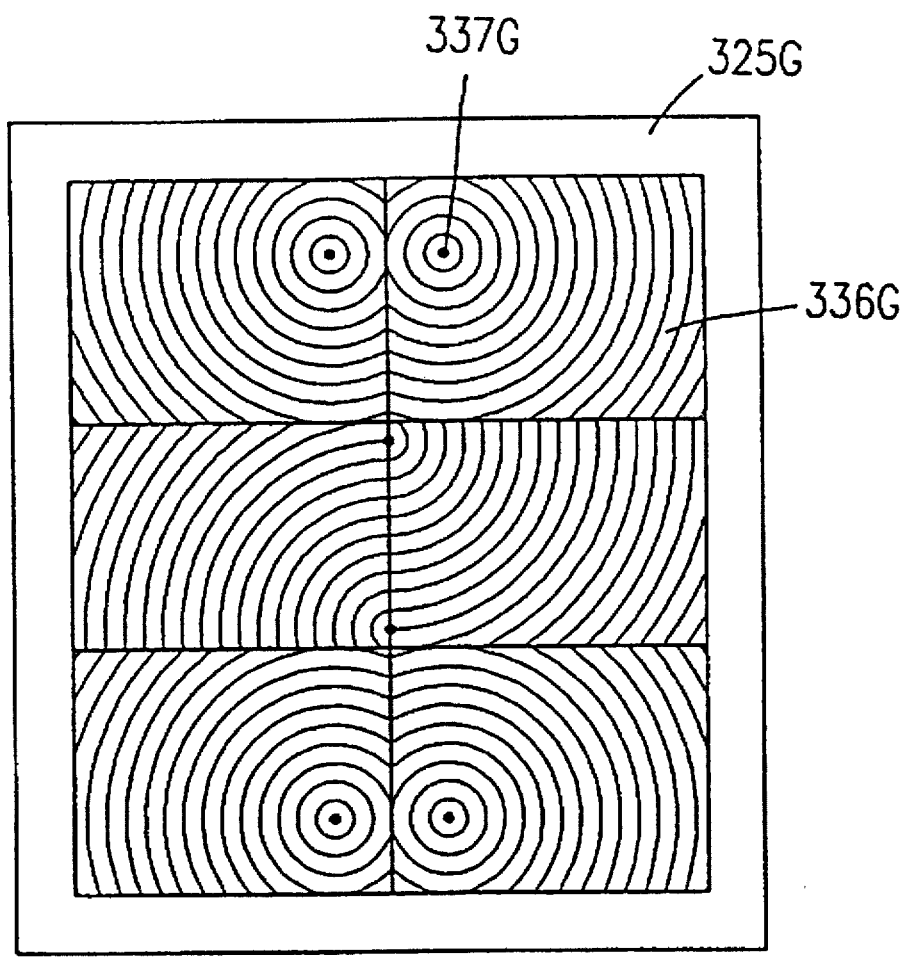
FIG. 52 is a schematic view illustrating a structure of still another first lens array according to the present invention.

For example, the first fresnel lens array 325G performs the function of the first lens array 232G shown in FIG. 49 and has a structure shown in, for example, FIG. 52. The second fresnel lens array 327G performs the function of the second lens array 233G shown in FIG. 49 and has a structure shown in, for example, FIG. 53. In this example, the first and the second fresnel lens arrays 325G and 327G each includes six fresnel lenses (first fresnel lenses 336G and second fresnel lenses 338G) having a prescribed aperture and being decentered to a prescribed extent.

For example, a first fresnel lens 336G has a center 337G. The light ray incident on the first fresnel lens 336G is converged in the aperture of a corresponding second fresnel lens 338G. The position of the center 337G of the first fresnel lens 336G is set so that the light ray is converged in the vicinity of the center of gravity of the aperture of the corresponding second fresnel lens 338G. The second fresnel lens 338G has a center 339G. The second fresnel lens 338G forms an actual image of the aperture of the corresponding first fresnel lens 336G in an area in the vicinity of the optical surface at a prescribed magnification ratio. The center 339G of the second fresnel lens 338G is appropriately positioned so that the actual images thus formed by the six second fresnel lenses 338G are superimposed on the optical surface. The red and the blue light rays are treated in the same manner.

Figure 53:
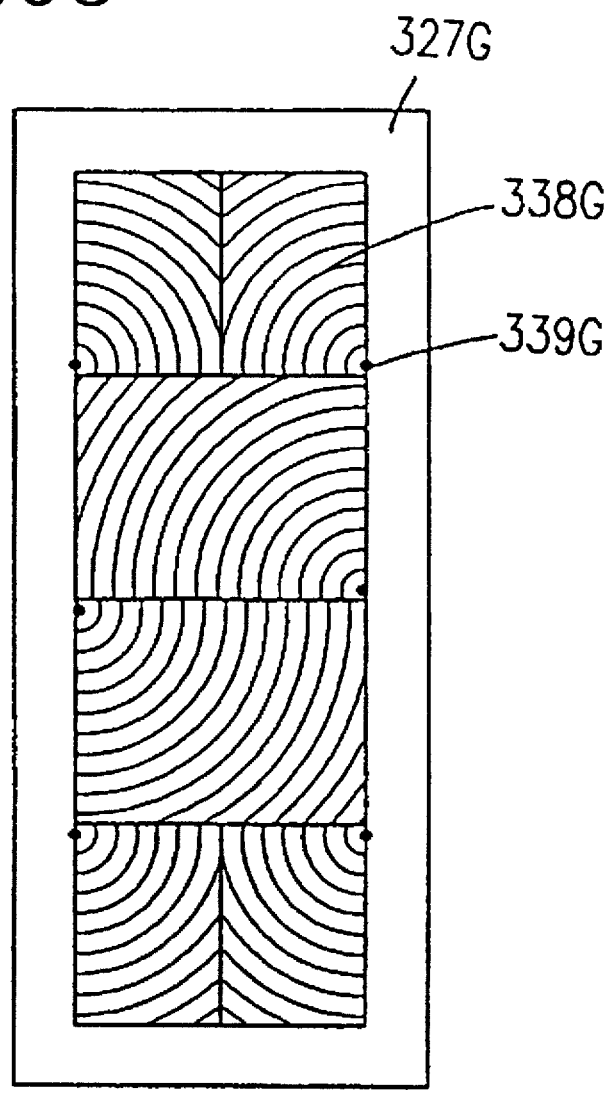
FIG. 53 is a schematic view illustrating a structure of still another second lens array according to the present invention.

In such a structure, the luminous surfaces respectively of the three primary colors proximate in shape to the effective generally rectangular aperture of the second fresnel lens array 327G shown, for example, in FIG. 53 are formed on substantially the same plane in the state of being separated from one another. Moreover, illumination having a high level of uniformity in brightness is formed at a very high level of light utilization efficiency.

The structure shown in FIG. 50 can still reduce the optical loss in the case where a converging lens is provided on the light-incoming side of each of the first fresnel lens arrays 325R, 325G and 325B and D/W≈F2/F1 (FIG. 27) is fulfilled. In this case, a fresnel lens acting as a converging lens can be combined with a fresnel lens having a shape shown in FIG. 52. The former fresnel lens is provided on the light-incoming side, and the latter fresnel lens is provided on the light-outgoing side. Such an optical element can be formed by pressing two surfaces of a PMMA resin plate. The second fresnel lens can be formed in a similar manner. The two types of fresnel lens arrays, which are far from the metal halide lamp 52, need not have high resistance against heat. Accordingly, a material which is relatively low in resistance against heat but is easy to deform, such as a PMMA resin, can be used.

Regarding the elements for the red light ray, the first fresnel lens array 325R, the third flat mirror 326R and the second fresnel lens array 327R are held together to provide a prescribed optical path. Regarding the elements for the green light ray, the first fresnel lens array 325G and the second fresnel lens array 327G are held together to provide a prescribed optical path. Regarding the elements for the blue light ray, the first fresnel lens array 325B, the third flat mirror 326B and the second fresnel lens array 327B are held together to provide a prescribed optical path. In such a structure, the optical system shown in FIG. 50 can be structured and adjusted more easily.

Especially, it is convenient to form a unit including the above-described elements regarding each of the red and blue light rays. By slightly moving the unit, the following two types of adjustment can be facilitated. First, the light rays respectively of the three primary colors need to be superimposed on the effective area of the optical surface to form white light. If an area to be illuminated by the light ray of a particular color is offset, the particular color is lost in a peripheral area of the optical surface to generate non-uniformity in color. Such an inconvenience can be solved by slightly moving the unit to superimpose the red or blue light ray on the green light ray. Second, the microscopic luminous surfaces respectively of the three primary colors need to be formed in the respective pixel apertures of the optical surface. This is realized by slightly moving the unit to adjust the position of the red or blue luminous surface with respect to the green luminous surface, namely, to adjust the gap between the pixel apertures.

(Display apparatus including any of the illumination apparatuses in the sixth through eighth examples)

A display apparatus including any of the illumination apparatuses 6 through 8 described above with reference to FIGS. 48 through 53 forms a bright, high quality image. For the optical surface 50, a liquid crystal panel having the pixel structure described in each example can be used. For displaying the optical image formed on the liquid crystal panel, any of the structure included in the display apparatuses 100, 200 and 300 shown in FIGS. 6, 7 and 8 can be used.

Figure 54:
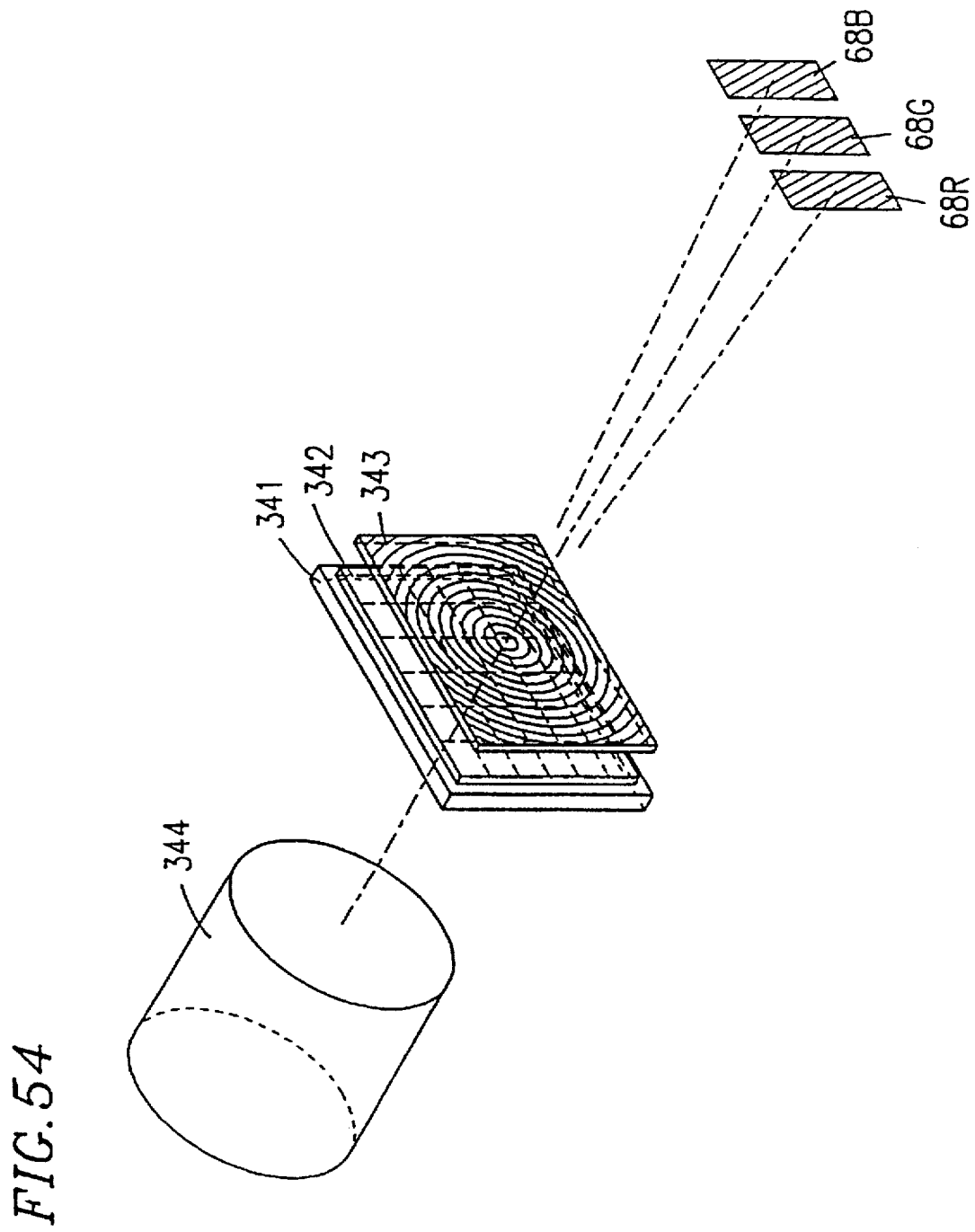
FIG. 54 is a schematic view of still another display apparatus according to the present invention.

A part of an exemplary preferable structure of such a display apparatus is shown in FIG. 54. A display apparatus including such a structure will be described as a display apparatus 400.

A transmission-type active-matrix driven liquid crystal panel 341 including a twisted nematic liquid crystal material has a pixel structure shown in, for example, FIG. 13. The liquid crystal panel 341 has a microlens array 342 applied on a surface thereof on the light-incoming side. The microlens array 342 has the structure shown in FIG. 20. Further, a field lens 343 including a fresnel lens is applied to the microlens array 342 on the light-incoming side.

The liquid crystal panel 341 is illuminated by generally rectangular luminous surfaces 68R, 68G and 68B respectively of the three primary colors. For example, the second lens arrays 327R, 327G and 327B shown in FIG. 50 can be used in the state where the apertures thereof correspond to the luminous surfaces 68R, 68G and 68B. Thus, the optical image on the liquid crystal panel 341 is projected on a screen (not shown) by a projection lens 344 in a magnified state.

In the display apparatus 400 having such a structure, the light emitted by a luminous element is guided to the pixel apertures for the three primary colors at a sufficiently high level of light utilization efficiency, and the light rays respectively of the three primary colors pass through the pixel apertures in the state of being clearly separated from one another. Accordingly, a bright image is displayed at a large luminous output. Especially in the case where the structure shown in FIG. 50 is used, the image displayed has a high level of uniformity in brightness and the light source can be compact.

Preferably, the first microlens array and the second microlens array shown in FIG. 1 are located on the light-incoming side of the liquid crystal panel 341 in lieu of the microlens array 342. The first microlens array shown in FIG. 1 acts as the microlens array 342. By the provision of the second microlens array, the chief rays respectively of the three primary colors passing through the respective pixel apertures travel parallel to one another. Thus, a projection lens having a relatively small converging angle can be used without significant optical loss.

(Experiment on an exemplary model of a display apparatus including any of the illumination apparatuses in the sixth through eighth examples)

The inventors of the present invention performed experiments of the display apparatus partially shown in FIG. 50. In detail, the luminous surfaces 68R, 68G and 68B formed by the optical system shown in FIG. 50 are projected by the display apparatus 400 shown in FIG. 54. As the liquid crystal panel 341, a panel compatible to a system of computer display referred to as VGA (video Graphic array) and having the pixel structure shown in FIG. 13 is used. The aspect ratio is 4:3, and an image represented by NTSC TV signals can also be displayed by signal conversion. The color pixel units are arranged in a matrix of 640 (horizontal)×480 (vertical), and one color pixel unit has a square area of 207 µm×207 µm.

Each color pixel unit is equally divided into three areas vertically. Each area has a rectangular area of 69 µm (horizontal)×207 µm (vertical). Each area has an aperture having a Generally rectangular shape. The aperture has a size of 44 µm (horizontal)×130 µm (vertical). The display area of the liquid crystal panel has a size of 132.48 mm (horizontal)×99.36 mm (vertical). The diagonal length is 165.6 mm, which is approximately 6.5 inches.

The metal halide lamp 52 has a lamp power of 250 W, and the effective shape of the luminous element 65 is Generally cylindrical. The axis of rotation symmetry of the luminous element 65 matches the optical axis of the ellipsoidal mirror 53'. The luminous element 65 has a length of about 3 mm in the direction of the optical axis and a diameter of about 2 mm. With reference to FIG. 27, the first focal distance F1 of the ellipsoidal mirror 53' is 10 mm, and the second focal distance F2 of the ellipsoidal mirror 53' is 210 mm. The opening of the ellipsoidal mirror 53' has a diameter of 68 mm to condense most of the light emitted by the luminous element 65. The luminous element 65 is located so that the center of gravity thereof matches the focal point of the ellipsoidal mirror 53'.

With reference to FIG. 52, the first fresnel lens array 325G includes six fresnel lenses each having an aperture of a size of 16 mm (horizontal)×12 mm (vertical). Such fresnel lenses are arranged in a matrix of 2 (horizontal)×3 (vertical). In this manner, the first fresnel lens array 325G has an entire aperture inscribed in a circle having a diameter of about 48 mm. The focal distance of each fresnel lens 336G is about 33 mm. Each fresnel lens 336G uses an aspherical surface as a base curved surface and is approximately decentered in order to restrict various aberrations.

A planoconvex lens is provided on the light-incoming side of the first fresnel lens array 325G in the state where the convex surface is opposed to the ellipsoidal mirror 53'. The flat surface of the planoconvex lens is proximate to the first fresnel lens array 325G. Such a planoconvex lens corresponds to the converging lens 231G shown in FIG. 27. The focal distance of the planoconvex lens is about 210 mm so that the focal point thereof on the light-incoming side matches the apex of the ellipsoidal mirror 53'. In this manner, as is shown in FIG. 51, the optical path from the opening of the ellipsoidal mirror 53' to the first fresnel lens array 325G can be sufficiently long to provide the space 332 for the two dichroic mirrors and another space for the first flat mirror 323G and the second flat mirror 324G. By the function of the planoconvex lens, the light which is to be incident on the first fresnel lens array 325G travel substantially parallel to the optical axis 331G. The effective diameter of such light is about 50 mm. Accordingly, the most of the light is incident on the first fresnel lens array 325G effectively.

The second fresnel lens array 327G has the structure shown in FIG. 53. The second fresnel lens array 327G includes six second fresnel lenses 338G. Each fresnel lens 338G has a focal distance of about 31 mm and a magnification ratio of about 8.7 in consideration of the field lens 343 which is located on the light-incoming side of the liquid crystal panel 341. With such a magnification ratio, the aperture of the first fresnel lens 336G is projected on the entire display area of the liquid crystal panel 341. The second fresnel lenses 338G each use an aspheric surface as the base curved surface and is appropriately decentered.

In such a structure, a light ray passing through each rectangular aperture having a diagonal length of about 20 mm of the first fresnel lens 336G is magnified to have a cross section with a diagonal length of about 174 mm. Such light rays are superimposed on the liquid crystal panel 341. The second fresnel lenses 338G each provide a sufficient aperture for the light ray passing therethrough. The total effective aperture of the second lens array 327G is about 12 mm in the horizontal direction and about 36 mm in the vertical direction.

With reference to FIG. 54, the field lens 343 located on the light-incoming side of the liquid crystal panel 341 has a focal distance of 300 mm, and thus the optical path from the luminous surface 68G to the field lens 343 is 300 mm. In other words, the optical path from the second fresnel lens array 327G to the field lens 343 is 300 mm. Thus, the optical path from the first fresnel lens array 325G to the second fresnel lens array 327G is about 33 mm. Since the focal distance of the first fresnel lens 325G is 33 mm, the light incident on the first fresnel lens 336G is converged to have a minimum possible diameter in the aperture of the corresponding second fresnel lens 338G.

In the above description, the structure for the green light ray has been described. The red and blue light rays are treated in the same manner except that the third flat mirror 326R is provided between the first fresnel lens array 325R and the second fresnel lens array 327R and that the third flat mirror 326B is provided between the first fresnel lens array 325B and the second fresnel lens array 327B. A space for locating the third flat mirrors 326R and 326B is provided by the above-described structure.

The microlens array 342 having the pixel structure shown in FIG. 20 is provided on the light-incoming side of the liquid crystal panel 341. Each of the microlenses in the microlens array 342 has a square aperture to correspond to the color pixel unit 51'. The microlens array 342 is located so that the optical axis thereof passes through the center of gravity of the green pixel aperture of the color pixel unit 51'. The focal distance of each microlens is about 1.1 mm.

In the above-described structure, the optical system existing on the optical path from the luminous surfaces 68R, 68G and 68B to the pixel apertures 51R', 51G' and 51B' conjugates each luminous surface and the corresponding pixel aperture at a magnification ratio of about 1/273 (1.1 mm/300 mm). As is described above, luminous surfaces respectively of the three primary colors each having a size of about 12 mm (horizontal)×36 mm (vertical) are formed in the vicinity of the second fresnel lens arrays 327R, 327G and 327B in the state of being clearly separated from one another. Such luminous surfaces are projected in the state of being reduced by 1/273. As a result, rectangular luminous surfaces having an effective area of about 44 μm (horizontal)×about 132 μm (vertical) are formed periodically and two-dimensionally in the pixel apertures in the state of being clearly separated from one another.

Such an effective area is approximately the same as the size of each of the pixel apertures 51R', 51G' and 51B'. Thus, the white light incident on the color pixel unit 51' can mostly pass through the pixel apertures 51R', 51G' and 51B' in the state of being separated into light rays respectively of the three primary colors. Such light rays are incident on the projection lens 344, resulting in a very bright image displayed on the screen. The projection lens 344 has a focal distance of about 150 mm and an effective F-number of 2.5. Although the liquid crystal panel 341 is not provided with color filters in the pixel apertures, the color image displayed on the screen is of high quality with a very high level of characteristic of color reproduction and also a very high level of color uniformity. The uniformity in brightness of the image is also high as is apparent from the fact that the ratio in illuminance of the darkest area with respect to the brightest area of a blank image is 60%. When the diagonal length is 40 inches, a central area of a blank image exhibits an illuminance of about 1200 lx.

Figure 60:
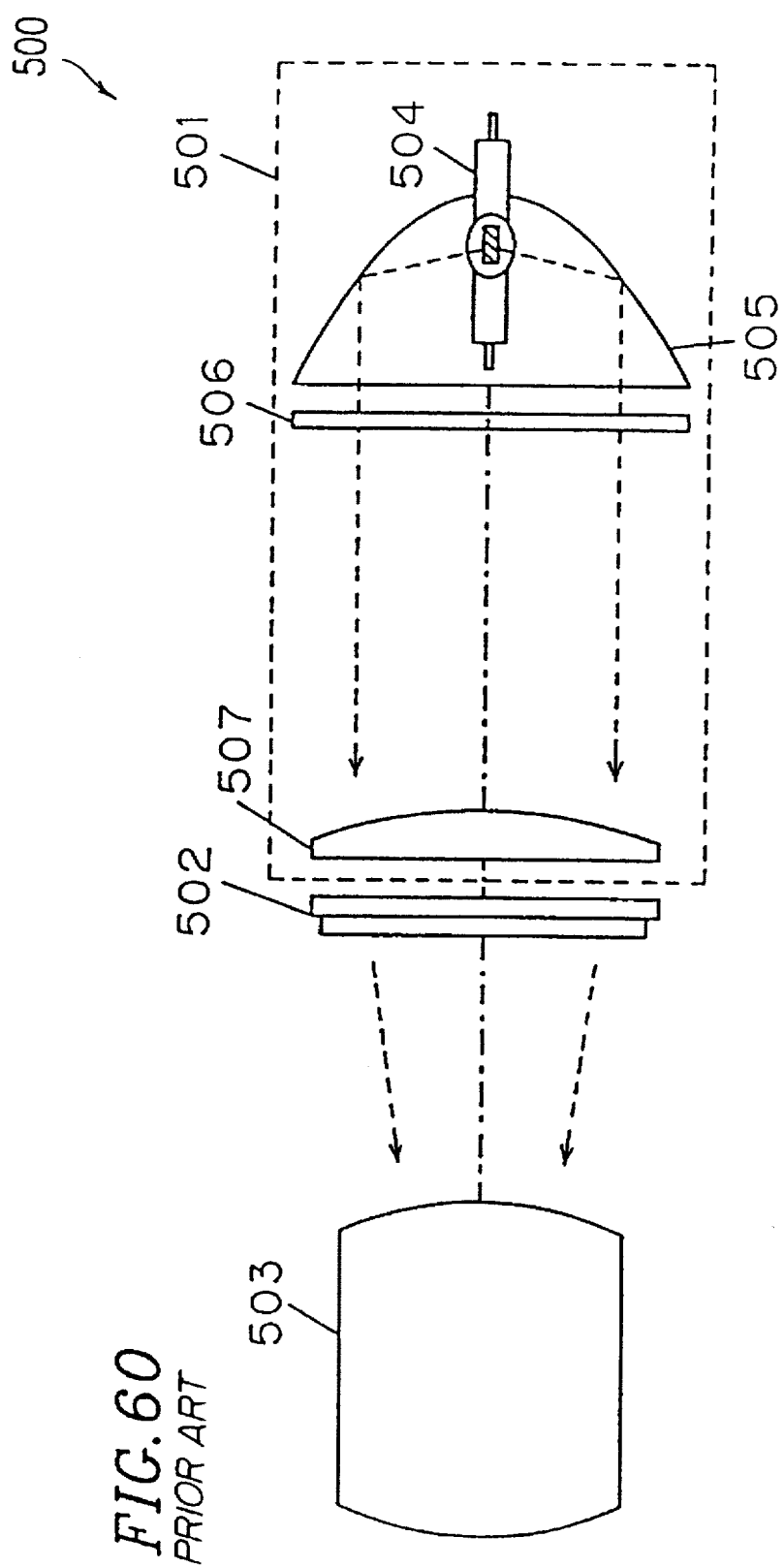
FIG. 60 is a schematic view illustrating a structure of a conventional projection display apparatus.

For comparison, a liquid crystal panel having the same structure as that of the liquid crystal panel 341 but including color filters is prepared. The color filters allow only light of the respective colors to transmit therethrough. Such a liquid crystal panel is incorporated in a display apparatus. The display apparatus basically has the conventional structure shown in FIG. 60 and is provided with two lens arrays shown in FIGS. 21 and 22 at appropriate positions on the optical path from the light source to the liquid crystal panel. The liquid crystal panel is illuminated using a 250 W metal halide lamp to obtain the highest possible brightness and the highest possible level of uniformity in brightness. The optical image on the liquid crystal panel is projected on a 40-inch screen using the projection lens 344.

Such a display apparatus is structured so that the optical loss on the optical path from the luminous element to the light-incoming side of the liquid crystal panel and the optical loss on the optical path from the light-outgoing side of the liquid crystal panel and the screen are not significantly larger than the optical loss generated in the above-described display apparatus used for the experiment. In the apparatus used for comparison, since no microlens array is provided on the light-incoming side of the liquid crystal panel to cause the white light to be incident directly on the color filters, the optical loss generated by the color filters is relatively large. Further, the optical loss caused by the black matrix is larger than in the above-described display apparatus without color filters.

A blank image projected on the 40-inch screen has an illuminance of about 250 lx in a central area thereof. The ratio in illuminance of the darkest area with respect to the brightest area of a blank image is 60%, which is the same as in the above-described display apparatus without color filters.

From the above comparative experiment, it is found that the above-described display apparatus without color filters improves the light utilization efficiency by about 4.8 times when compared with the display apparatus with color filters. Such an improvement is achieved mainly because an illumination apparatus according to the present invention forms microscopic luminous surfaces respectively of the three primary colors having a shape proximate to that of the pixel apertures for the respective colors at a high level of light utilization efficiency even when a liquid crystal panel having generally rectangular color pixel apertures which is used for computer data display is used. Further, the image displayed on the screen does not have any defect affecting the quality such as color blur or non-illuminated spot and has a high level of uniformity in brightness.

The optical system from the luminous element to the pixel apertures of the liquid crystal panel can be proportionally increased or reduced to achieve the same effect.

Other examples of the illumination apparatus and display apparatus

The illumination apparatuses and the display apparatuses according to the present invention are not limited to those described above. The illumination apparatuses and the display apparatuses can be combined in any workable manner.

The arrangement of the optical paths of the red, green and blue light rays can be arbitrarily determined in accordance with the arrangement of the color pixels.

Although a transmission-type liquid crystal panel is used for the optical surface in the above-described examples, any other light valve having a similar pixel structure can be used.

An illumination apparatus according to the present invention can be used in other fields of illumination. For example, such an illumination apparatus can be used for special effects since desired illumination spots respectively of the three primary colors can be formed periodically and two-dimensionally in the state of being clearly separated. In such a case, the microlens arrays can be replaced with an array of larger lenses to match the object to be illuminated.

(Projection lens)

A projection lens in an example according to the present invention will be described. In order to form a display apparatus using any of the illumination apparatuses described in the previous examples to display a bright, high quality video image on a large screen, a projection lens for projecting the optical image on the liquid crystal panel onto the screen is required. The projection lens according to the present invention is especially suitable for such use.

Figure 55:
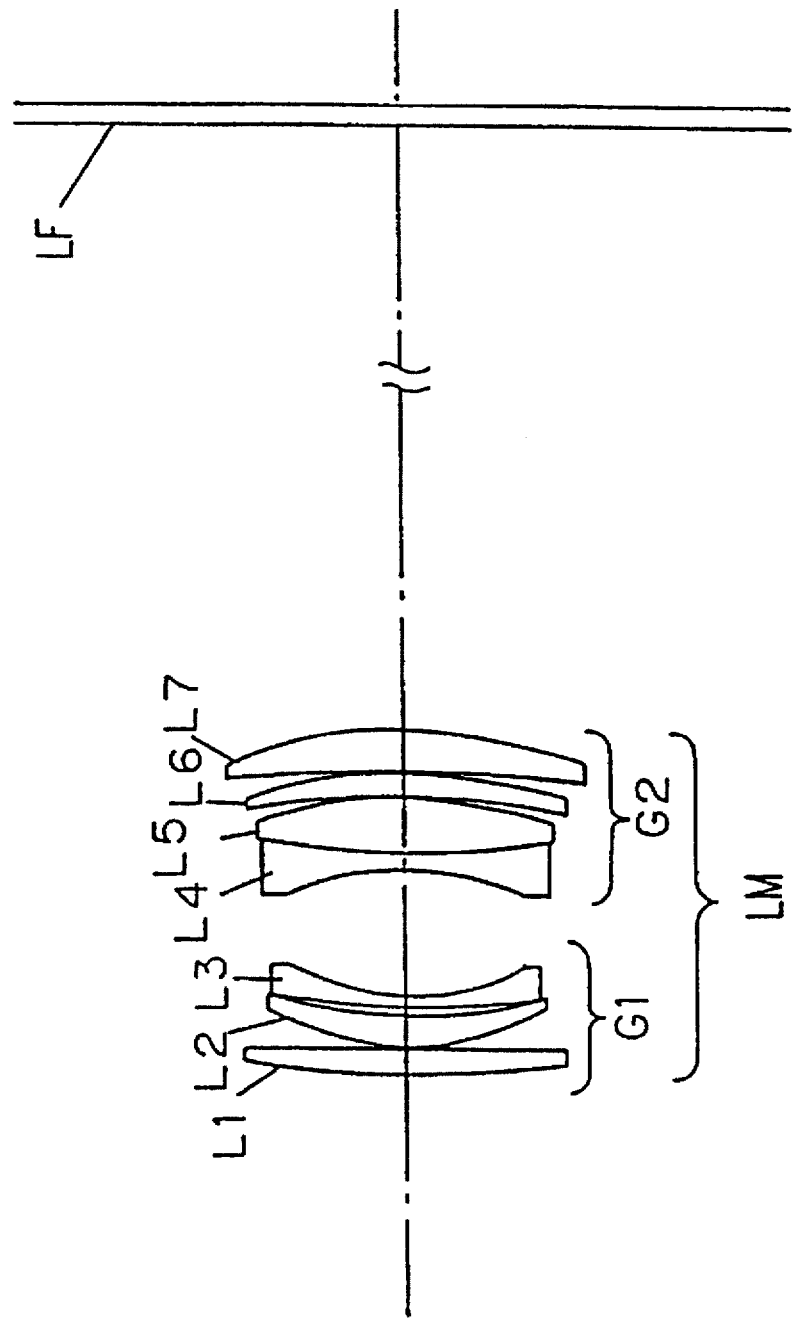
FIG. 55 is a schematic view of a projection lens according to the present invention.

FIG. 55 shows a structure of a projection lens 10 in an example according to the present invention. The projection lens 10 includes a principal lens group LM and a fresnel lens LF. The principal lens group LM includes a plurality of lenses ni (i=an integer).

The liquid crystal panel is located on the light-incoming side of the fresnel lens LF, and the optical image formed on the liquid crystal panel is projected on the screen (not shown) by the projection lens 10. The fresnel lens LF and the principal lens group LM has a space therebetween for flat mirrors for bending the optical path of the light rays. Such a structure is advantageous in raising the degree of freedom in designing the optical elements.

Table 1 shows numerical figures which express the structure of the lenses. In Table 1, rj is the radius of curvature of the "i"th lens; dj is the distance between the "j"th surface and the (j+1)th surface; ni and vi are respectively the refractive index and the Abbe constant of the "i"th lens on the e line; and ω is a half angle of view on the side of the screen. f is the focal distance; and F is the effective F-number of the lens on the optical axis. The surface of the lens marked with "*" is aspheric, and the shape thereof is given by expression 1. In expression 1, h is the height from the optical axis; S is the sag at height h from the optical axis of the lens; κj is the conic coefficient; and dj, ej, fj and gj are respectively 4th, 6th, 8th and 10th aspheric coefficient.

Expression 1

$$S = \frac{h^2/rj}{1 + \sqrt{1 - (1+kj)(h/rj)^2}} + djh^4 + ejh^6 + fjh^8 + gjh^{10}$$

TABLE 1

| | | | |
|---|---|---|---|
| f = 100 | F = 4.0 | ω = 28.9° | |
| $r_1$ = 77.683 | $d_1$ = 4.45 | $n_1$ = 1.76346 | $v_1$ = 47.7 |
| $r_2$ = ∞ | $d_2$ = 0.12 | | |
| $r_3$ = 39.815 | $d_3$ = 3.15 | $n_2$ = 1.70346 | $v_2$ = 47.7 |
| $r_4$ = 54.967 | $d_4$ = 2.76 | | |
| $r_5$ = 135.576 | $d_5$ = 1.18 | $n_3$ = 1.58482 | $v_3$ = 40.5 |
| $r_6$ = 34.969 | $d_6$ = 19.13 | | |
| $r_7$ = −23.176 | $d_7$ = 1.97 | $n_4$ = 1.67764 | $v_4$ = 32.0 |
| $r_8$ = −279.003 | $d_8$ = 7.09 | $n_5$ = 1.70346 | $v_5$ = 47.7 |
| $r_9$ = −31.680 | $d_9$ = 0.12 | | |
| $r_{10}$ = −97.437 | $d_{10}$ = 4.33 | $n_6$ = 1.59142 | $v_6$ = 61.0 |
| $r_{11}$ = −46.083 | $d_{11}$ = 0.12 | | |

TABLE 1-continued

| | | | |
|---|---|---|---|
| $r_{12} = -262.152$ | $d_{12} = 3.43$ | $n_7 = 1.51825$ | $v_7 = 63.8$ |
| $r_{13} = -78.130$ | $d_{13} = 90.63$ | | |
| $r_{14} = \infty$ | $d_{14} = 2.00$ | $n_8 = 1.49383$ | $v_8 = 57.2$ |
| *$r_{15} = -48.081$ (Fresnel plane) | | | |
| Aspheric coefficient | | | |
| $\kappa_{15} = -1.39801$ | $d_{15} = 3.79911 \times 10^{-7}$ | $e_{15} = -1.01929 \times 10^{-10}$ | |
| | $f_{15} = 9.27238 \times 10^{-15}$ | $g_{15} = 2.04571 \times 10^{-18}$ | |

As is shown in FIG. 55, the first lens L1 is a positive lens, the second lens L2 is a positive meniscus lens having the convex surface opposed to the screen, the third lens L3 is a negative meniscus lens having the convex surface opposed to the screen, the fourth lens L4 is a negative lens, the fifth lens L5 is a positive lens, the sixth lens L6 is a positive meniscus lens having the concave surface opposed to the screen, and the seventh lens L7 is a positive meniscus lens having the concave surface opposed to the screen. The fourth lens L4 and the fifth lens L5 are bonded together. The first through the third lenses L1 through L3 form a first lens group G1, and the fourth through the seventh lenses L4 through L7 form a second lens group G2.

The fresnel lens LF is provided with a relatively large air space from the principal lens group LM in order to obtain a characteristic of telecentric. The 14th surface from the side of the screen is flat, and the 15th surface is a fresnel surface. The fresnel surface is located far from the screen than the flat surface in order to facilitate restriction of various aberrations compared with the opposite case.

Generally, a fresnel lens is formed by dividing a base curved surface into a plurality of microscopic ring-shaped lens elements which are concentric around the optical axis used as the center and then moving the lens elements along the optical axis to be on the same plane. Accordingly, the sag of the surface of a fresnel lens does not increase even if the diameter of the lens is relatively large. The resultant lens is flat. In practice, such a fresnel lens is formed of a PMMA resin by press molding. By such a method, a large quantity of lenses having a relatively large diameter can be produced at relatively low cost.

Further, in the case of a fresnel lens, the base curved surface can be easily formed to be aspheric. Such easiness is advantageous in restricting various aberrations when being used as a part of the projection lens. Especially in the structure shown in FIG. 55, the fresnel lens is useful to compensate for a distortion aberration.

Figure 56C:
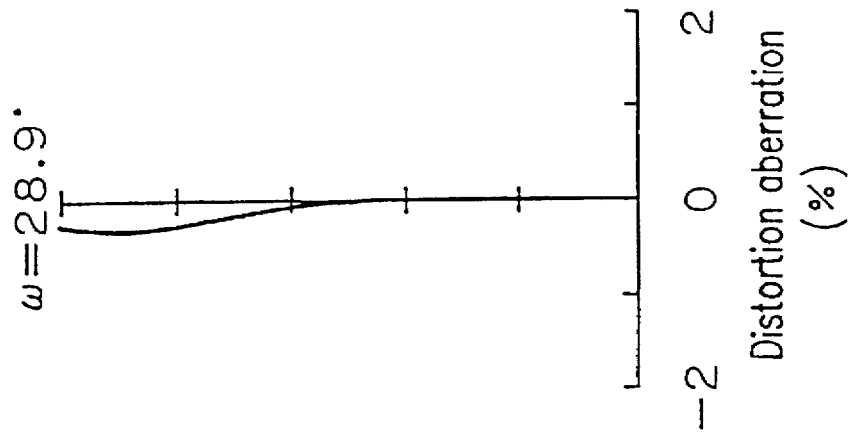
FIGS. 56A, 56B and 56C are graphs illustrating various aberrations of the projection lens shown in FIG. 55.
Figure 56B:
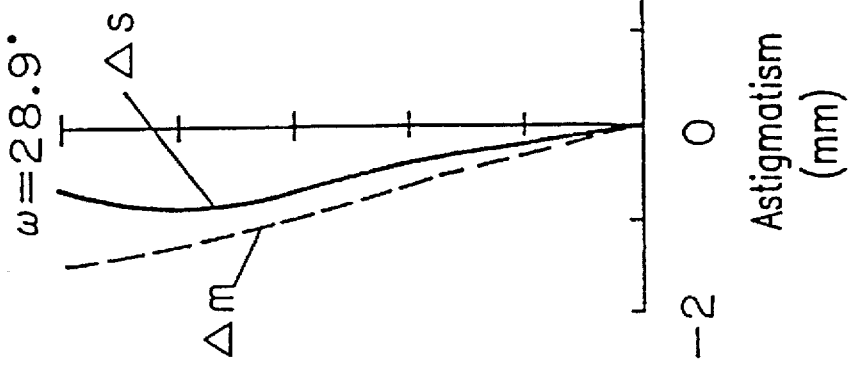
Figure 56A:
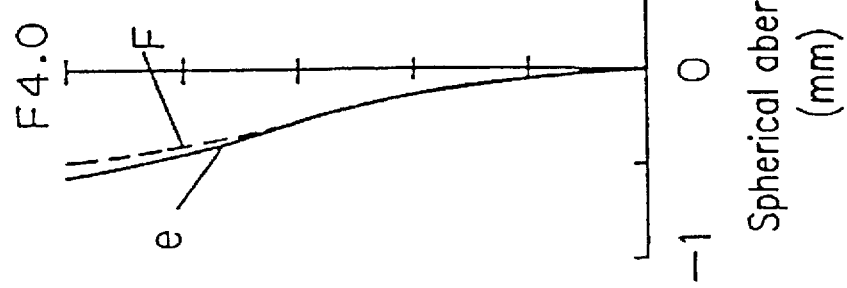

FIG. 56A through 56C respectively show the spherical aberration, astigmatism, and the distortion aberration of the projection lens shown in Table 1. In FIG. 56A, the vertical axis represents the height of the light ray on the pupil from the optical axis. The maximum height is 4.0 when being represented with F-number. The solid line represents the aspheric aberration at the e line (wavelength λ=546.1 nm), and the broken line represents the aspheric aberration at the F line (wavelength λ=486.1 nm).

In FIG. 56B, the vertical axis represents the angle of view. The maximum angle is 28.9 degrees when being represented with the half angle of view ω on the side of the screen. The solid line represents the astigmatism of the sagittal ray Δs, and the broken line represents the astigmatism of the meriodinal ray Δm.

In FIG. 56C, the vertical axis represents the angle of view.

The aspheric aberration and the astigmatism are obtained when the light ray is traced from the side of the screen toward the object on the liquid crystal panel to be projected.

The chief ray from the liquid crystal panel has a ±2° or less within the total angle of view with respect to the optical axis to achieve a satisfactory level of characteristic of telecentric. The effective F-number is 4.0 so that the light rays having an angle of ±7.2° or less with respect to the optical axis of the light from the liquid crystal panel are effectively condensed and reach the screen. With such a projection lens, a bright image having a high level of uniformity in black can be displayed by projection.

The above-described projection lens is used, for example, with a projection distance of 906 mm from the screen, for projecting an image on the liquid crystal panel having a display area having a diagonal length of about 125 mm onto the screen to have a diagonal length of 1 m. As is appreciated from the half angle of view e of as wide as 28.9° in this case, such a projection lens is advantageous in displaying a relatively large image with a relatively short projection distance. The projection lens is especially advantageous in reducing the size of a back projection display apparatus including a screen and a projector integrated in a cabinet. The distance between the principal lens group LM and the fresnel lens LF is about 90 mm, which is sufficiently long for accommodating flat mirrors for bending the optical paths.

In the above example, the fresnel lens LF needs to have an effective diameter larger than 125 mm to deal with the display area of the liquid crystal panel. However, fresnel lenses are easy to mass-produce at low cost even with a relatively large diameter. In contrast, a principal lens group, which is formed of glass lenses, becomes heavier and more costly as the total length or the diameter increases. The principal lens group LM in this example has a total length of about 48 mm, and a maximum effective diameter thereof can be only about 44 mm. Such a principal lens group LM is significantly compact in consideration of the diagonal length of the liquid crystal panel. The aperture efficiency is as high as 70% or more at the maximum angle of view. As is appreciated from these figures, the principal lens group LM has a sufficient marginal illumination ratio despite the compactness.

The projection lens in this example having a fresnel lens provided in the vicinity of the light-outgoing side of the liquid crystal panel and a principal lens group at the position where the light from the fresnel lens is converged is suitable for a projection display apparatus using a light valve because of ease in raising the characteristic of telecentric, reducing the effective F-number, and satisfactorily restricting various aberrations. Moreover, an increase in the size of the display area of the light valve requires only an increase in the size of the fresnel lens while keeping the principal lens group compact and production cost of the principal lens group low. Since the fresnel lens is provided in the vicinity of the image to be projected, the image formation quality of the projection lens is influenced very little by an error of the shape of the lens from the designed shape.

Some of the structural features of the fresnel lens LF in this example will be described with reference to FIG. 57.

Figure 57:
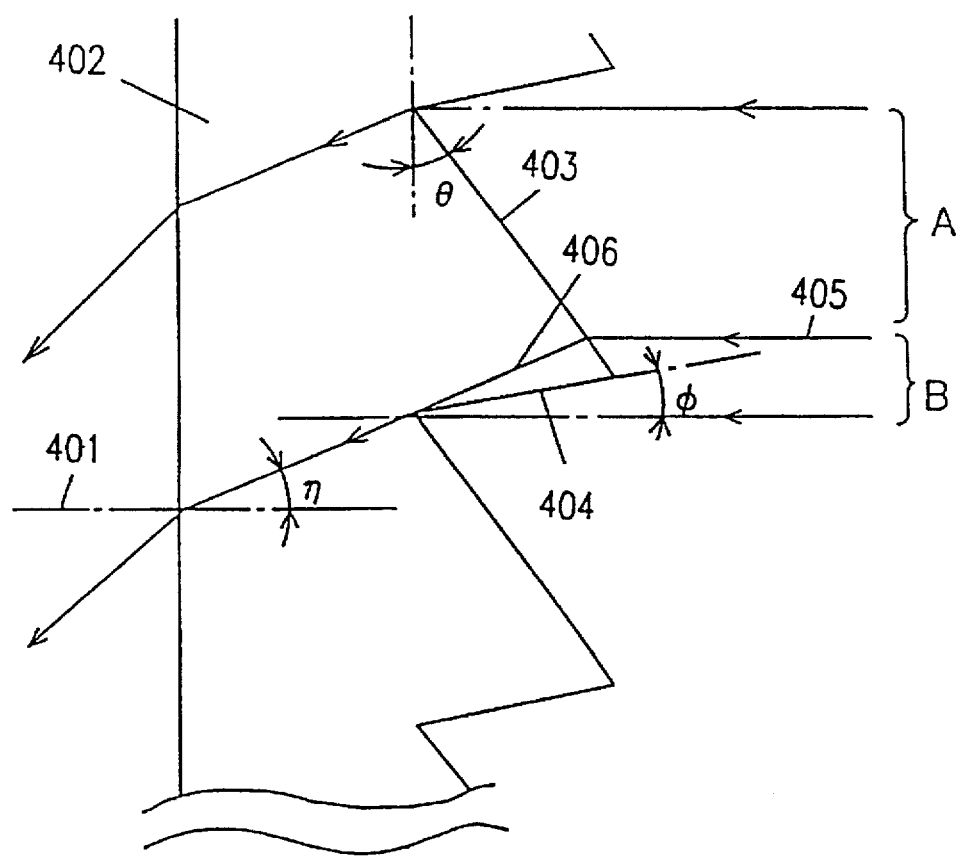
FIG. 57 is a schematic view illustrating the structure of the projection lens shown in FIG. 55.

In FIG. 57, the fresnel lens LF has a partial cross section indicated by reference numeral 402. Hereinafter, the fresnel lens LF is referred to as "fresnel lens 402". The fresnel lens 402 includes ring-shaped lens surfaces 403 having a microscopic width and steps 404 at which the lens surfaces 403 are joined. The steps 404, which do not act as lenses, are also referred to as "non-lens surfaces". The lens surfaces 403 and the non-lens surfaces 404 are alternately arranged continuously.

The lens surfaces 403 each have an angle of inclination θ, and the non-lens surfaces 404 each have an angle of inclination φ. The angle of inclination φ of the non-lens surfaces 404 fulfills expression 2. The angles of inclination θ and φ are not constant but change in accordance with the height from the optical axis. For simplicity, the angle of inclination θ is defined with respect to the plane perpendicularly crossing the optical axis, and the angle of inclination φ is defined with respect to the optical axis. In FIG. 57, a chain line 401 is a phantom line running parallel to the optical axis.

$$0<\phi\leq\eta \qquad \text{expression 2}$$

In expression 2, η is an angle of chief rays passing through the fresnel lens 402 in the vicinity of the non-lens surface 404 with respect to the optical axis. If the projection lens is completely telecentric, the chief rays are incident on the lens surfaces 403 and the non-lens surfaces 404 parallel to the optical axis. A light ray 405 is one of such chief rays. The light ray 405 is refracted by the lens surface 403 to be a light ray 406 and travels inside the fresnel lens 402. The angle η is the angle of the light ray 406 with respect to the optical axis.

The angle φ needs to fulfill expression 2 because of the following reason.

Figure 58:
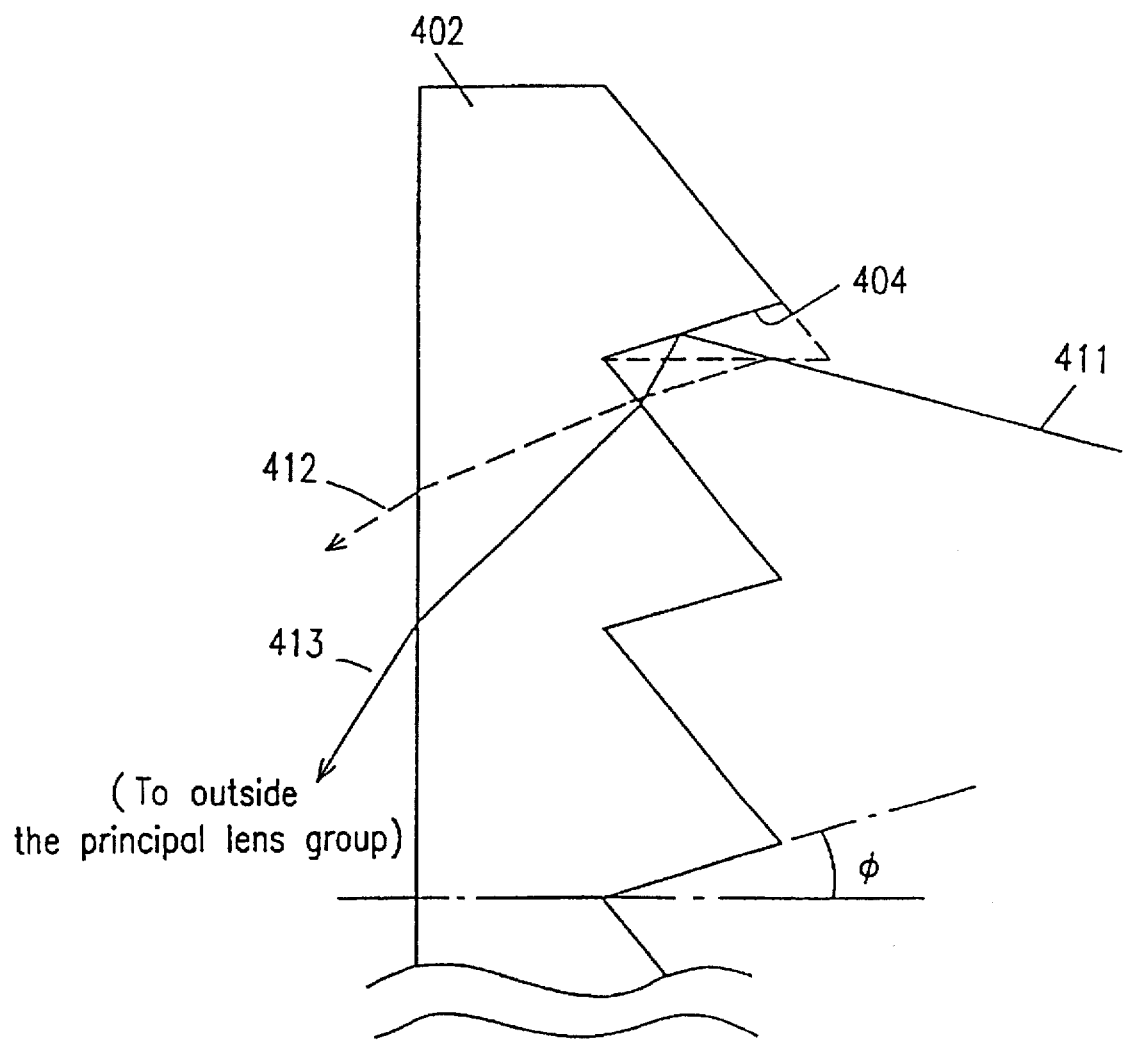
FIG. 58 is a schematic view illustrating stray light of a fresnel lens.

Among the light rays incident on the fresnel lens 402, the light rays incident on area A are effectively utilized, and the light rays incident on area B are not utilized. If the light rays incident on area B is reflected by the non-lens surface 404, such light rays behave as if being outgoing from a different position of the liquid crystal panel and are incident on the principal lens group LM, thereby being involved in the image formation on the screen. FIG. 58 illustrates such a state.

Among the light rays incident on the projection lens 10, a light ray 411 incident on the non-lens surface 404 is partially reflected to travel toward the principal lens group LM. Since the light ray 411 is incident on the non-lens surface 404 at a relatively large angle, a relatively high intensity of light is reflected by the interface. The travelling direction of such reflected light is not correct, and thus such light generates a ghost image in the image projected on the screen, thus lowering the image quality.

Figure 59:
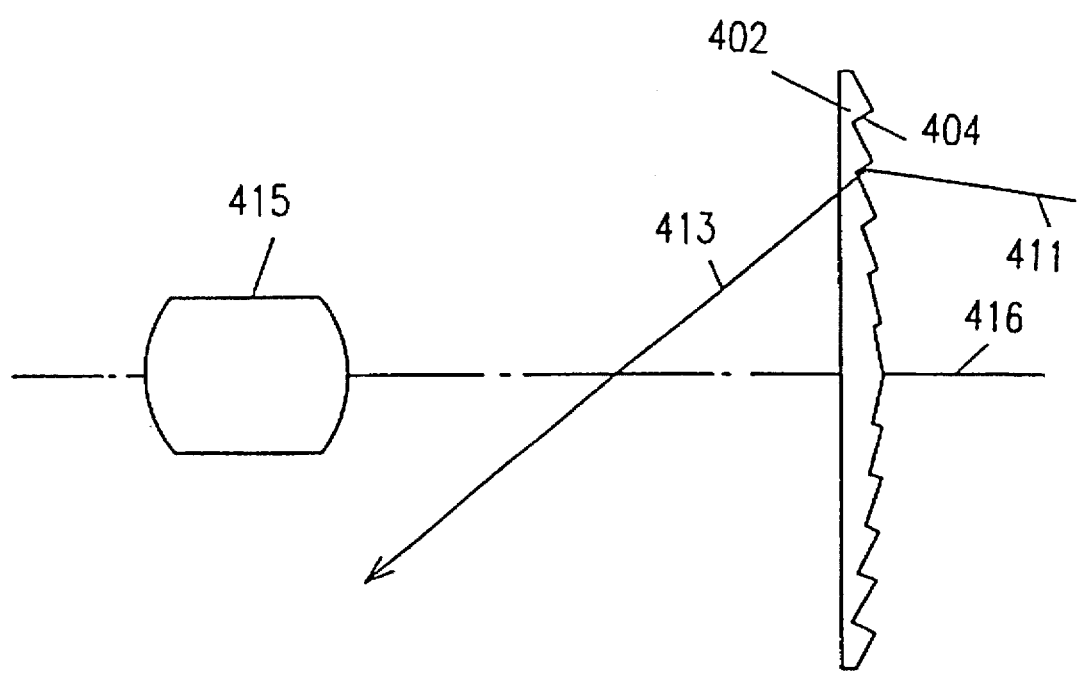
FIG. 59 is a schematic view illustrating the operation of the projection lens shown in FIG. 55.

The above-described problem is serious when the angle of inclination φ is 0°. In such a case, the light ray 411 travels as the light ray 412 indicated by the broken line and reaches the principal lens group LM to cause the above-described problem. When the angle of inclination φ is more than 0°, the light ray 411 travels as the light ray 413 indicated by the solid line and reaches outside the effective aperture of the principal lens group LM without reaching the screen. Thus, a high quality image can be displayed on the screen. FIG. 59 shows such a state. In FIG. 59, reference numeral 415 denotes the principal lens group, and reference numeral 416 denotes the optical axis.

If the angle of inclination φ of the non-lens surface 404 is excessively large, another problem occurs. Referring to FIG. 57, the light rays incident on area B are lost without being used. Since area B is usually significantly smaller than area A, the optical loss in area B does not cause any serious problem. However, if the angle of inclination φ is excessively large, area B becomes excessively large to increase the optical loss.

In consideration of these points, the angle of inclination φ is most preferably equal to the angle η in order to prevent generation of a ghost image without significantly increasing the optical loss.

Considering only the chief rays travelling parallel to the optical axis with reference to FIG. 57, even if the angle of inclination φ is less than the angle η, area B does not reduce in size. The reason is that: among the light rays incident on the lens surface 403, light rays incident on an end area close to the non-lens surface 404 are incident on the non-lens surface 404 inside the fresnel lens 402 and thus totally reflected to be invalid.

For the above-described reasons, the preferable range of the angle of inclination φ is determined by expression 2. The projection lens 10 according to the present invention fulfills such a condition. Referring to FIG. 55, the angles of inclination φ of the non-lens surfaces of the fresnel lens LF fulfill expression 2 in accordance with the angle η which changes in accordance with the height from the optical axis. (Display apparatus including a projection lens according to the present invention)

A projection display apparatus for displaying a bright, high quality image can be provided at relatively low cost using a projection lens according to the present invention in combination with a light valve and an illumination apparatus for illuminating the light valve. Any of the illumination apparatuses described in the previous examples can be preferably used.

Especially when a light valve having a periodical pixel structure such as a liquid crystal panel and a projection lens including a fresnel lens is used, expression 3 provides further advantages where PL is the pixel pitch in the light valve, PF is the lens pitch in the fresnel lens, and N is a positive integer.

$$N+0.25<PL/PF<N+0.75 \qquad \text{expression 3}$$

The pixel pitch in the light valve is a distance between the center of gravity of one pixel area to the center of gravity of an adjacent pixel area. The pixel pitch is generally defined for both the horizontal and vertical directions of the display area. When the pixel pitches in the two directions are different, both pixel pitches are set to fulfill expression 3 or a preferable one is set to fulfill expression 3. The lens pitch of the fresnel lens is a width of the periodical ring-shaped lens surfaces in the diameter direction.

It is generally known that, when two images having a periodical structure are superimposed, moiré fringes are formed by interference of the spatial frequency components of the pixel structures of the two images. When the fresnel lens is located close to a light valve having a pixel structure and the image on the light valve is projected by the projection lens, the periodical structures of the fresnel lens and the light valve interfere each other, resulting in formation of moiré fringes in the image displayed on the screen. Such moiré fringes significantly deteriorate the image quality. Expression 3, which is proposed in light of such a problem, provides a preferable condition to make moiré fringes least conspicuous. In expression 3, as N is larger, the modulation degree of the moiré fringes reduces to make the moiré fringes less conspicuous.

The inventors of the present invention have formed a projection display apparatus including a fresnel lens having a lens pitch PF of 250 μm in the vicinity of the light-outgoing side of a light valve having a pixel pitch PL of 150 μm. In such a structure, PL/PF=5/3. Expression 3 is fulfilled when N=1. The projection lens including the fresnel lens has the same structure as that of the projection lens 10. There is a space of about 5 mm between the light valve and the light-incoming surface of the fresnel lens. The effective F-number of the fresnel lens is 4.0 so that the optical image on the light valve is projected by the expanding light incident on the entire entrance pupil of the projection lens. The image displayed on the screen is of high quality with no recognizable moiré fringes. Provision of an appropriate air space between the light valve and the fresnel lens is advantageous in weakening the degree of interference between the frequency components of the periodical structures of the fresnel lens and the light valve and thus making the moiré fringes less conspicuous.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An illumination apparatus for illuminating a light valve including a plurality of color pixel units arranged two-dimensionally, each having pixels respectively for the three primary colors, the illumination apparatus comprising:
   a light source for emitting light including components of the three primary colors;
   condensing means for condensing light emitted by the light source;
   luminous surface formation means for converging the light from the condensing means and dividing the converged light into color light rays respectively of the three primary colors to form color luminous surfaces respectively of the three primary colors;
   relay lenses respectively located relative to the color luminous surfaces to receive the color light rays from the luminous surface formation means;
   a field lens for receiving the color light rays from the relay lenses;
   a first microlens array for receiving the color light rays from the field lens; and
   a second microlens array for receiving the color light rays from the first microlens array,
   wherein:
      the first microlens array includes a plurality of first microlenses arranged two-dimensionally, the second microlens array includes a plurality of second microlenses two-dimensionally in the same quantity as the first microlenses with each second microlens having a corresponding first microlens,
      the first microlenses arrange actual images of the color luminous surfaces two-dimensionally,
      the second microlenses respectively are located relative to the actual images of the color luminous surfaces to cause the color light rays from the corresponding first microlenses to travel substantially parallel to one another, and
      color microscopic luminous surfaces respectively of the three primary colors are formed separately and periodically in accordance with a predefined arrangement.

2. An illumination apparatus according to claim 1, wherein the first microlens array and the second microlens array are both flat microlens arrays formed on two surfaces of a plate by an ion exchange method.

3. A display apparatus, comprising:
   illumination means;
   a light valve to be illuminated by the illumination means: and
   image formation means for forming an image using the light spatially modulated by the light valve,
   wherein the light valve includes a plurality of color pixel units each having pixels respectively for the three primary colors to form an optical image,
   wherein the illumination means includes:
      a light source for emitting light including components of the three primary colors;
      condensing means for condensing light emitted by the light source;
      luminous surface formation means for converging the light from the condensing means and dividing the converged light into color light rays respectively of the three primary colors to form color luminous surfaces respectively of the three primary colors;
      relay lenses respectively located relative to the color luminous surfaces to receive the color light rays from the luminous surface formation means;
      a field lens for receiving the color light rays from the relay lenses;
      a first microlens array for receiving the color light rays from the field lens; and
      a second microlens array for receiving the color light rays from the first microlens array,
      wherein:
         the first microlens array includes a plurality of first microlenses arranged two-dimensionally,
         the second microlens array includes a plurality of second microlenses two-dimensionally provided in the same quantity as the first microlenses with each second microlens having a corresponding first microlens,
         the first microlens array arranges actual images of the color luminous surfaces two-dimensionally,
         the second microlenses respectively are located relative to the actual images of the color luminous surfaces to cause the color light rays from the corresponding first microlenses to travel substantially parallel to one another, and
         color microscopic luminous surfaces respectively of the three primary colors are formed separately and periodically in accordance with a predefined arrangement in in order to correspond optically with the pixels for the three primary colors.

4. A display apparatus according to claim 3, wherein the image formation means includes a projection lens, which forms an image by projecting the optical image on the light valve onto a screen.

5. A display apparatus according to claim 3, wherein the image formation means includes a microlens array provided on the light-outgoing side of the light valve and light scattering means provided on the light-outgoing side of the microlens array, wherein the microlens array includes a plurality of microlenses each having a corresponding pixel of the light valve, the microlenses respectively form actual images of the corresponding pixels in operative relationship to the light scattering means,
   whereby the light scattering means scatters the light incident thereon to form an image.

6. A display apparatus according to claim 3, wherein the color microscopic luminous surfaces each have a shape which is similar to the shape of the aperture of the corresponding pixel.

7. An illumination apparatus for illuminating a light valve including a plurality of pixels arranged two-dimensionally, the illumination apparatus comprising:

a light source;

condensing means for condensing light emitted by the light source:

a first lens array for receiving the light from the condensing means;

a second lens array for receiving the light from the first lens array; and a microlens array for receiving the light from the second lens array, wherein:

the first lens array includes a plurality of first lenses for dividing the light from the condensing means into a plurality of partial light rays, the second lens array includes a plurality of second lenses provided in the same quantity as the first lenses with each of the first lenses having corresponding one of the second lenses, the microlens array includes a plurality of microlenses arranged two-dimensionally, the first lenses each converge the partial light rays transmitting therethrough onto an aperture of the corresponding second lens, the second lenses respectively magnify the partial light rays at such magnification ratios as to illuminate an area of the microlens array in a superimposed state, the microlens array arranges actual images of an object located relative to the second lens array two-dimensionally to form microscopic luminous surfaces having a shape corresponding to an effective aperture of the second lens array periodically in accordance with a predefined arrangement.

8. An illumination apparatus according to claim 7, further comprising color separation means on an optical path from the condensing means to the microlens array, wherein the color separation means divides the light from the condensing means into color light rays respectively of the three primary colors, causes chief rays of the color light rays to be incident on the microlens array at different angles from one another, and forms color microscopic luminous surfaces each having a prescribed cross section separately and periodically in accordance with a predefined arrangement.

9. An illumination apparatus according to claim 8, further comprising relay optical means on an optical path from the second lens array to the microlens array, the relay means including:

an input lens system;

a central lens system; and an output lens system, wherein:

the input lens system forms an actual image of an object at approximately the aperture of the second lens array at approximately a position of an aperture of the central lens system to allow the central lens system to form an actual image of an object at approximately an aperture of the input lens system at approximately a position of an aperture of the output lens system, and the output lens system causes light rays from the center of gravities of luminous surfaces located approximately at the central lens system to travel substantially parallel to one another.

10. An illumination apparatus according to claim 7, wherein:

the condensing means has a focal point and converges the light emitted by the light source at approximately the focal point, the first lens array is provided at approximately the focal point of the condensing means and has a converging lens on the light-incoming side thereof, and the converging lens has a focal point on the light-incoming side at approximately a center of gravity of an outgoing pupil of the condensing means.

11. An illumination apparatus according to claim 7, wherein the second lenses have apertures having different shapes and different sizes from one another, the shape and size of each of the apertures being determined in accordance with a cross section of a light part transmitting therethrough.

12. An illumination apparatus according to claim 7, wherein the first lens array has an effective aperture which is proximate to a circle.

13. An illumination apparatus according to claim 7, wherein at least one of the first lens array and the second lens array includes a plurality of lenses which are decentered with respect to apertures thereof.

14. An illumination apparatus according to claim 7, wherein at least one of the first lens array and the second lens array includes a plurality of Fresnel lenses each having an aspheric surface as a base curved surface.

15. A display apparatus, comprising:

illumination means;

a light valve to be illuminated by the illumination means; and image formation means for forming an image using the light spatially modulated by the light valve, wherein:

the light valve includes a pixel structure for forming an optical image, and the illumination means includes:

a light source;

condensing means for condensing light emitted by the light source;

a first lens array for receiving the light from the condensing means;

a second lens array for receiving the light from the first lens array; and a microlens array for receiving the light from the second lens array, wherein:

the first lens array includes a plurality of first lenses for dividing the light from the condensing means into a plurality of partial light rays, the second lens array includes a plurality of second lenses provided in the same quantity as the first lenses with each of the second lenses having a corresponding one of the first lenses, the microlens array includes a plurality of microlenses arranged two-dimensionally, the first lenses each converge the partial light rays transmitting therethrough onto an aperture of the corresponding second lens, the second lenses respectively magnify the partial light rays at such magnification ratios as to illuminate an area of the microlens array in a superimposed state, the microlens array arranges actual images of an object located relative to the second lens array two-dimensionally to form microscopic luminous surfaces having a shape corresponding to an effective aperture of the second lens array periodically in accordance with a predefined arrangement, and the effective aperture of the second lens array is proximate in shape to pixels of the pixel structure, and the microscopic luminous surfaces are formed in optical correspondence with the pixels.

16. A display apparatus according to claim 15, wherein the image formation means includes a projection lens, which forms an image by projecting the optical image on the light valve onto a screen.

17. A display apparatus according to claim 15, wherein the image formation means includes a microlens array provided on the light-outgoing side of the light valve and light scattering means provided on the light-outgoing side of the microlens array, wherein the microlens array includes a plurality of microlenses corresponding to the pixels of the light valve, the microlenses respectively form actual images of the corresponding pixels in operative relationship to the light scattering means, whereby the light scattering means scatters the light incident thereon to form an image.

18. A display apparatus according to claim 15, wherein the light valve has a display area having an aspect ratio of 4:3; the first lenses of the first lens array are provided in the quantity of one of four, six, seven, nine, ten, fourteen, sixteen and eighteen; and the second lenses of the second lens array are provided in the quantity of one of four, six, seven, nine, ten, fourteen, sixteen and eighteen.

19. A display apparatus according to claim 15, wherein the light valve has a display area having an aspect ratio of 16:9; the first lenses of the first lens array are provided in the quantity of one of four, six, nine, ten, twelve, fourteen, sixteen, seventeen, and twenty-two; and the second lenses of the second lens array are provided in the quantity of one of four, six, nine, ten, twelve, fourteen, sixteen, seventeen, and twenty-two.

20. A display apparatus according to claim 15, wherein the illumination means includes a plurality of light sources, a plurality of condensing means, and a plurality of second lens arrays respectively provided on optical paths of light rays from the plurality of condensing means, the second lens arrays each having an entire aperture which is proximate in shape to each of the pixels of the pixel structure.

21. An illumination apparatus for illuminating a light valve including a plurality of color pixel units arranged two-dimensionally, each having pixels respectively for the three primary colors, the illumination apparatus comprising:

a light source for emitting light including components of the three primary colors;

condensing means for condensing the light emitted by the light source;

color separation means for dividing the light from the condensing means into color light rays respectively of the three primary colors;

a microlens array on which the color light rays are incident at different angles; and a plurality of relay optical means respectively provided on optical paths of the color light rays from the condensing means to the microlens array, wherein:

the plurality of relay optical means each converge the color light ray transmitting therethrough to form a color luminous surface for illuminating the microlens array, the optical paths of the color light rays from the condensing means to the color luminous surfaces of the three primary colors are substantially equal to one another, and the optical paths of the color light rays from the color luminous surfaces to the microlens array are substantially equal to one another, the microlens array arranges actual images of the color luminous surfaces two-dimensionally, and color microscopic luminous surfaces respectively of the three primary colors are formed separately and periodically in accordance with a prescribed arrangement.

22. An illumination apparatus according to claim 21, wherein the plurality of relay optical means each include:

a first lens;

a second lens; and a third lens;

wherein:

the first lens converges the light ray incident thereon to approximately a position of an aperture of the second lens to form a luminous surface to allow the second lens to form an actual image of an object located approximately at the first lens at approximately a position of an aperture of the third lens, and the third lens causes the light rays from the center of gravities of luminous surfaces to travel substantially parallel to one another.

23. An illumination apparatus according to claim 21, wherein the plurality of relay optical means each include:

a first lens array;

a second lens array; and a third lens, wherein:

the first lens array includes a plurality of first lenses, the second lens array includes a plurality of second lenses in the same quantity as the first lenses with each of the second lenses having a corresponding one of the first lenses, the first lenses each converge the light ray incident thereon to approximately a position of the corresponding second lens to form a luminous surface, the second lenses form actual images of objects located approximately at the corresponding first lenses to approximately a position of the third lens in a superimposed manner, and the third lens causes the light rays from positions approximately at center of gravities of the luminous surfaces located approximately at the second lenses to travel substantially parallel to one another.

24. An illumination apparatus according to claim 21, wherein:

the color separation means includes a first dichroic mirror and a second dichroic mirror crossing each other in the shape of X, the first dichroic mirror reflecting a first-color light ray having a first optical path, the second dichroic mirror reflecting a second-color light ray having a second optical path, and the first and the second dichroic mirrors allowing a third-color light ray to transmit therethrough having a third optical path, a first flat mirror, a second flat mirror, and a third flat mirror are provided on each of the first and the second optical paths, another first flat mirror and another second flat mirror are provided on the third optical path, the first, second and third optical paths from the color separation means are bent by the respective first flat mirrors at about 90 degrees to travel in substantially the same direction, and are bent by the respective second flat mirrors at about 90 degrees to cross one another at substantially one point, and the first and second optical paths from the second flat mirrors are bent by the respective third flat mirrors to cross the third optical path at prescribed angles at approximately a center of gravity of the microlens array.

25. A display apparatus, comprising:

illumination means;

a light valve to be illuminated by the illumination means; and image formation means for forming an image using the light spatially modulated by the light valve, wherein the light valve includes a plurality of color pixel units each having pixels respectively for the three primary colors to form an optical image, and wherein the illumination means includes:
- a light source for emitting light including components of the three primary colors;
- condensing means for condensing the light emitted by the light source;
- color separation means for dividing the light from the condensing means into color light rays respectively of the three primary colors;
- a microlens array on which the color light rays are incident at different angles; and
- a plurality of relay optical means respectively provided on optical paths of the color light rays from the condensing means to the microlens array, wherein:
- the plurality of relay optical means each converge the color light ray transmitting therethrough to form a color luminous surface for illuminating the microlens array,
- the optical paths of the color light rays from the condensing means to the color luminous surfaces of the three primary colors are substantially equal to one another, and the optical paths of the color light rays from the color luminous surfaces to the microlens array are substantially equal to one another,
- the microlens array arranges actual images of the color luminous surfaces two-dimensionally, and
- color microscopic luminous surfaces respectively of the three primary colors are formed separately and periodically in accordance with a predefined arrangement in optical correspondence with the pixels of the three primary colors.

26. A display apparatus according to claim 25, wherein the image formation means includes a projection lens, which forms an image by projecting the optical image on the light valve onto a screen.

27. A display apparatus according to claim 25, wherein the image formation means includes a microlens array provided on the light-outgoing side of the light valve and light scattering means provided on the light-outgoing side of the microlens array, wherein the microlens array includes a plurality of microlenses corresponding to the pixels of the light valve, the microlenses respectively form actual images of the corresponding pixels in operative relationship to the light scattering means, whereby the light scattering means scatters the light incident thereon to form an image.

28. A projection lens for projecting an optical image on a light valve onto a screen, the projection lens comprising:

a principal lens, and a Fresnel lens provided proximate an object to be projected, the Fresnel lens having microscopic ring-shaped lens surfaces periodically formed on a light-incoming surface of a plate, the Fresnel lens fulfilling $0<\phi \leq \eta$ where $\phi$ is the angle of inclination of a non-lens surface interposed between two adjacent lens surfaces in the direction of an optical axis of the Fresnel lens with respect to the optical axis, and $\eta$ is the angle of the direction of a chief ray incident on the lens surface proximate the non-lens surface travelling in the Fresnel lens after being refracted by the lens surface with respect to the optical axis.

29. A projection display apparatus for projecting an image onto a screen, the apparatus comprising:

illumination means;

a light valve to be illuminated by the illumination means; and a projection lens for projecting an image on the light valve, wherein:
- the projection lens includes a Fresnel lens provided proximate the light-outgoing side of the light valve and a principal lens group,
- the light valve has pixels arranged periodically at a pitch PL,
- the Fresnel lens includes microscopic lens surfaces arranged periodically at a pitch PF, and
- the projection lens fulfills $N+0.25<PL/PF<N+0.75$ where N is a positive integer.

* * * * *